United States Patent
Maag et al.

(10) Patent No.: US 10,937,034 B2
(45) Date of Patent: *Mar. 2, 2021

(54) SYSTEMS AND USER INTERFACES FOR DYNAMIC AND INTERACTIVE INVESTIGATION BASED ON AUTOMATIC MALFEASANCE CLUSTERING OF RELATED DATA IN VARIOUS DATA STRUCTURES

(71) Applicant: Palantir Technologies Inc., Palo Alto, CA (US)

(72) Inventors: Peter Maag, New York, NY (US); Tom O'Brien, New York, NY (US); Phil Cross, New York, NY (US); Sarun Peter Tosirisuk, Oakland, CA (US)

(73) Assignee: Palantir Technologies Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/297,028

(22) Filed: Mar. 8, 2019

(65) Prior Publication Data
US 2019/0205897 A1    Jul. 4, 2019

Related U.S. Application Data

(63) Continuation of application No. 14/984,505, filed on Dec. 30, 2015, now Pat. No. 10,275,778, which is a
(Continued)

(51) Int. Cl.
*G06Q 40/00* (2012.01)
*G06Q 30/00* (2012.01)
*G06Q 40/04* (2012.01)

(52) U.S. Cl.
CPC ......... *G06Q 30/0185* (2013.01); *G06Q 40/00* (2013.01); *G06Q 40/04* (2013.01)

(58) Field of Classification Search
CPC .... G06Q 40/00; G06Q 20/382; H04L 63/145; G06F 17/3059
See application file for complete search history.

(56) References Cited

U.S. PATENT DOCUMENTS 9,230,280 B1    1/2016 Maag et al.
10,275,778 B1   4/2019 Maag et al.
(Continued)

FOREIGN PATENT DOCUMENTS

WO    WO-2013126281 A1 *  8/2013

OTHER PUBLICATIONS

Big data showdown: Cassandra vs. HBase Grehan, Rick. InfoWorld.com; San Mateo (Apr. 2, 2014). (Year: 2014).*

*Primary Examiner* — Lalita M Hamilton
(74) *Attorney, Agent, or Firm* — Knobbe Martens Olson & Bear LLP

(57) ABSTRACT

In various embodiments, systems, methods, and techniques are disclosed for generating a collection of clusters of related data from a seed to assist in detection of financial malfeasance. Seeds may be generated based on seed generation strategies or rules. Clusters may be generated by, for example, retrieving a seed, adding the seed to a first cluster, retrieving a clustering strategy or rules, and adding related data (such as trades, emails or chat messages) and/or data entities to the cluster based on the clustering strategy. Various cluster scores may be generated based on attributes of data in a given cluster, and the clusters may be displayed and ranked based on their scores. Various embodiments may enable an analyst to review clusters of trades, emails and/or chat messages that are the most likely to reveal financial malfeasance.

20 Claims, 22 Drawing Sheets

Related U.S. Application Data continuation of application No. 14/278,963, filed on May 15, 2014, now Pat. No. 9,230,280.

(60) Provisional application No. 61/977,517, filed on Apr. 9, 2014.

(56) References Cited

U.S. PATENT DOCUMENTS

| | | |
|---|---|---|
| 2010/0125546 A1 | 5/2010 | Barrett et al. |
| 2010/0198684 A1 | 8/2010 | Eraker et al. |

\* cited by examiner

FIG. 10E

Collections ▶ | Go

Sort by: Score ▼ | SEARCH

| | |
|---|---|
| Malfeasance Risk 1 — Score .9 | Suspect GOOG Trade by Trader 1 — *1090* |
| Malfeasance Risk 2 — Score .8 | Email Thread 1 from Trader 1 — *1088* |
| Malfeasance Risk 3 — Score .6 | Side Conversation including Trader 1 |
| | Email Thread 2 from Trader 1 |

*1082*

*1084*

Email 1 from Trader 1 — *1086*

Score: .6

From: Trader 1
To: Google Employee
Subject: Thanks for the Gift

John,

Thank you for inviting us to your party, and for the great party favors. That bottle of wine will work well after a long day's work.

BTW, I'm happy your group at Google is going to launch their product soon. Sounds like you are getting great experience over there.

Let me know when you and Alice would like to go out to dinner sometime.

Thanks again,

Bob

SYSTEMS AND USER INTERFACES FOR DYNAMIC AND INTERACTIVE INVESTIGATION BASED ON AUTOMATIC MALFEASANCE CLUSTERING OF RELATED DATA IN VARIOUS DATA STRUCTURES

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

This application is a continuation of U.S. patent application Ser. No. 14/984,505, filed Dec. 30, 2015, which is a continuation of U.S. patent application Ser. No. 14/278,963, filed May 15, 2014, now U.S. Pat. No. 9,230,280, which claims the benefit of U.S. Provisional Patent Application No. 61/977,517, filed Apr. 9, 2014, titled "CLUSTERING DATA BASED ON INDICATIONS OF FINANCIAL MALFEASANCE." Each of these applications are hereby incorporated by reference herein in their entireties and for all purposes.

CROSS-REFERENCE TO RELATED APPLICATIONS

This application is related to but does not claim priority from U.S. patent application Ser. No. 14/139,628, filed Dec. 23, 2013, titled "TAX DATA CLUSTERING," U.S. patent application Ser. No. 13/968,265, filed Aug. 15, 2013, titled "GENERATING DATA CLUSTERS WITH CUSTOMIZABLE ANALYSIS STRATEGIES," U.S. patent application Ser. No. 13/968,213, filed Aug. 15, 2013, titled "PRIORITIZING DATA CLUSTERS WITH CUSTOMIZABLE SCORING STRATEGIES," and U.S. Provisional Patent Application No. 61/800,887, filed Mar. 15, 2013, titled "GENERATING PRIORITIZED DATA CLUSTERS WITH CUSTOMIZABLE ANALYSIS STRATEGIES," which are hereby incorporated by reference herein in their entireties and for all purposes.

TECHNICAL FIELD

Embodiments of the present disclosure generally relate to data analysis and, more specifically, to generating data clusters of related data entities with customizable analysis strategies indicating possible financial malfeasance.

BACKGROUND

In financial and security investigations, an analyst may have to make decisions regarding data entities within a collection of data. For instance, the analyst could have to decide whether financial malfeasance, such as insider trading or an improper use of confidential information, has occurred. However, an individual data item, for example, a single trade, oftentimes includes insufficient information for the analyst to make such decisions. Further, the volume of data items (e.g., 50-100 gigabytes a day of email, communication messages, and/or financial trades) often makes review by an investigator of all security transactions or communication messages an impossible task.

SUMMARY

The systems, methods, and devices described herein each have several aspects, no single one of which is solely responsible for its desirable attributes. Without limiting the scope of this disclosure, several non-limiting features will now be discussed briefly.

For example, large banks and financial firms generate large volumes of data (e.g., hundreds of gigabytes) during their day-to-day business. Although review of this data (e.g., email messages, trades, chat messages, etc.) may reveal certain improper financial malfeasance (e.g., fraud, misrepresentation, deceptive of unacceptable conduct, insider trading, disclosure of confidential information, disclosure of a customer/clients's trade secrets, etc.) occurring by the bank's or financial firm's employees, review of all the material is often an impossible task given the volume.

Thus, an analyst or investigator of such information needs a system and method that will indicate those trades and communications messages that represent the most likely candidates (e.g., a seed or initial data item) to find any financial malfeasance, while also gathering related data items (e.g., a "cluster" or "review collection") that may put the trade or email message in a better context for review. Solving these two problems may allow the analyst to make better decisions based upon a collection of related data items.

Identification of the seed values or initial data items may be performed by executing one or more of a number of initial financial risk identification strategies to identify one or more initial data items(s). These initial financial risk identification strategies may include identifying possible side conversations in email and chat messages that may represent secrets communicated between employees, identifying the disclosure of confidential information or customer information to entities outside a financial institution, identifying possible improper escalation of risk up the chain of command in the financial institution, identifying possible LIBOR manipulation, identifying suspect trades, and/or identifying other electronics communications that may indicate financial malfeasance.

Once an initial risk is identified, additional context (e.g., additional related data items) may be added to a review collection so that an analyst or investigator can review a complete picture of any financial malfeasance risk. For instance, a suspect stock trade for Google's stock may be identified. Associated with that trade may be a first trader who initiated the sell order that resulted in the trade. Around the time that the trade was executed, the first trader had email exchanges with a number of people that work at Google. Because the email sender of those messages match the trader on the trade, the time the email messages were sent were around the time of the trade, and the email messages were sent to and from Google (the email domain matches the company being traded), the computing system may add these email messages to the review collection. The analyst may then review the review collection and determine whether any financial malfeasance has occurred.

According to various embodiments, a computer system is disclosed that may include one or more computer readable storage devices configured to store one or more software modules including computer executable instructions, a plurality of financial transaction data items and properties associated with respective financial transaction data items, each of the properties including associated property values, a plurality of communication messages of financial traders, a plurality of financial transaction risk indicators, a plurality of financial transaction malfeasance cluster strategies, and at least one scoring criterion.

Various embodiments may additional include one or more hardware computer processors in communication with the one or more computer readable storage devices and configured to execute the one or more software modules in order to cause the computer system to: designate one or more seeds by accessing, from the one or more computer readable storage devices, the plurality of financial transaction risk indicators and at least one financial transaction data item of the plurality of financial transaction data items, comparing the plurality of financial transaction risk indicators to the at least one financial transaction data item and associated properties, and based on the comparison and in response to determining the at least one financial transaction data item is related to at least one financial transaction risk indicators, designating the at least one financial transaction data item as a seed. For each designated seed, the computer system may generate a cluster by adding the seed to the cluster, adding one or more communication messages of the plurality of communication messages of financial traders to the cluster based on a cluster strategy of the plurality of financial malfeasance cluster strategies, the cluster strategy matching one or more properties values of the seed to the one or more communication messages, score each generated cluster by accessing, from the one or more computer readable storage devices, the least one scoring criterion; and generating a cluster score by assessing the generated cluster based on the accessed at least one scoring criterion.

In one embodiment, the communication messages may comprise email messages or chat messages. In a particular embodiment, the financial transaction data items may represent trades and the seed is a seed trade. The cluster strategy may match at least two items selected from the group of: a time the seed trade was executed, a trader executing the seed trade, and a traded financial product of the seed trade. The at least one scoring criterion may comprise a first scoring criterion, and the first scoring criterion may score the cluster based on a volume of communication messages added to the cluster. The at least one scoring criterion may comprise a first scoring criterion, and the first scoring criterion may score the cluster based on a volume of communication messages added to the cluster that match a first common property of the seed trade, and the first common property of the seed trade may comprise a member selected from the group: a time the seed trade was executed, a trader executing the seed trade, and a traded financial product of the seed trade. The at least one scoring criterion may comprise a first scoring criterion, and the first scoring criterion may score the cluster based on the seed trade matching a prohibited time for trading by a trader executing the seed trade.

In various embodiments, the one or more hardware computer processors in communication with the one or more computer readable storage devices may be further configured to execute the one or more software modules in order to cause the computer system to compile each cluster into a collection of scored clusters sorted by the cluster scores for respective scored cluster, and provide at least a portion of the collection of scored clusters for display in a computer user interface on a display screen, wherein the computer user interface allows for inspection of each cluster by a user. The at least one scoring criterion may measure indications of possible financial malfeasance of financial traders associated with data items in a cluster.

According to various embodiments, a computer system for collecting financial malfeasance data for inspection may comprise one or more computer readable storage devices configured to store a plurality of electronic trade data items, each electronic trade data item associated with a trade of a financial instrument, each electronic trade data item comprising a trader property associating a trader identifier of a trader executing the trade, a plurality of chat messages of financial traders, each chat message associated with a plurality of financial trader identifiers sending or receiving the chat message, a plurality of email messages of financial traders, each email message associated with a plurality of financial trader identifiers sending or receiving the chat message, a plurality of review data correlation strategies, and a plurality of initial financial risk identification strategies, each financial risk identification strategy associated with a review data collection strategy.

Various embodiments may also include one or more hardware computer processors in communication with the one or more computer readable storage devices and configured to execute one or more software modules in order to cause the computer system to search a data collection to identify an initial data item based on a first initial financial risk identification strategy of the plurality of initial financial risk identification strategies, wherein the data collection comprises chat messages, email messages, and/or electronic trade data items, and in response to identifying the initial data item, correlate related data items into a first review collection based on a first review data collection strategy of the plurality of review data correlation strategies, the first review data collection strategy associated with the first initial financial risk identification strategy, the first review collection comprising the related data items and the initial data item, the first review collection comprising one or more chat messages, one or more email messages, and/or one or more electronic trade data items, and calculate a first score associated with the first review collection based on one or more scoring criterions, and, in response to the first score exceeding a threshold score value, generating user interface data for display on a computer display screen, the user interface data indicating at least a portion of the first review collection for inspection by a user.

In some embodiments, the one or more hardware computer processors in communication with the one or more computer readable storage devices is further configured to execute one or more software modules in order to cause the computer system to additionally search a second data collection to identify a second initial data item, distinct form the first initial data item, based on a second initial financial risk identification strategy of the plurality of initial financial risk identification strategies, wherein the second data collection comprises one or more chat messages, one or more email messages, and/or one or more electronic trade data items, in response to identifying the second initial data item, correlate second related data items into a second review collection based on a second review data collection strategy of the plurality of review data correlation strategies, the second review data collection strategy associated with the second initial financial risk identification strategy and distinct from the first review data collection strategy, the second review collection comprising the second related data items and the second initial data item, the second review collection comprising a second plurality of data items comprises one or more chat messages, one or more email messages, and/or one or more electronic trade data items, calculate a second score associated with the second review collection based on the one or more scoring criterions, and in response to the second score exceeding the threshold score value, generating user interface data for display on a computer display screen, the user interface data indicating at least a portion of the second review collection for inspection by a user.

In some embodiments, the data collection comprises the plurality of email messages, the first initial financial risk identification strategy comprises identifying, from the plurality of email messages an email message thread comprising a plurality of emails relating to an email subject, the email message thread comprises a side conversation, the side conversation comprising one or more email messages having fewer participants than an initial email in the email message thread, and the first review data collection strategy comprises identifying, as the related data items, at least one electronic trade data item having a trader identifier associated with a trader matching a participant of the side conversation.

In various embodiments, the data collection comprises the plurality of email messages and the plurality of chat messages, and the first initial financial risk identification strategy comprises identifying, from the data collection, a chat message or email message comprising the character string "LIBOR" and sent or received by a financial trader participant within a configurable time period associated with a LIBOR reporting deadline.

In particular embodiments, the data collection comprises the plurality of email messages, and the first initial financial risk identification strategy comprises identifying, from the data collection, an email message comprising an attachment, an employee sender email address associated with an employee, and a recipient email address at a personal email address associated with the employee.

In some embodiments, the data collection comprises the plurality of chat messages and the plurality of email messages, the first initial financial risk identification strategy comprises identifying, from the data collection, a chat message or email message comprising a name of an entity and receipt data, wherein the receipt data indicates that the message was not received by the entity, and, the entity comprises a financial institution or a manager of financial employees.

In various embodiments, the data collection comprises the plurality of email messages, and the first initial financial risk identification strategy comprises identifying, from the data collection, a first email message comprising an employee sender email address and a first manager recipient email address, and identifying a second email message comprising a portion of a body of the first email message and a second manager recipient email address corresponding to a manager of an individual receiving email at the first manager recipient email address.

In particular embodiments, the data collection comprises the plurality of email messages, the first initial financial risk identification strategy comprises identifying, from the data collection, an email message comprising text indicating an error, a subject comprising text associated with a first financial institution and not comprising text associated with a second distinct financial institution, and a trade statement or trade report attachment comprising a name, and the name comprises text associated with the second distinct financial institution and not comprising text associated with the first financial institution.

In some embodiments, the one or more computer readable storage devices are further configured to store a plurality of customers of a financial institution, the data collection comprises the plurality of email messages and the plurality of chat messages, and the first initial financial risk identification strategy comprises identifying, from the data collection, a message sent or received by a trader affiliated with the financial institution, the message sent or received by a party not affiliated with the financial institution, the message not received by a party affiliated with the customer, the message comprising text corresponding to a customer of the plurality of customers, the message further comprising a timestamp within a configurable time period of an executed trade associated with the trader affiliated with the financial institution.

In various embodiments, a method for collecting financial malfeasance data for inspection, may comprise, by one or more computer processors, searching a data collection to identify an initial data item based on a first initial financial risk identification strategy of a plurality of initial financial risk identification strategies, wherein the data collection comprises one or more selected from the group consisting of: a plurality of chat messages, a plurality of email messages, and a plurality of electronic trade data items, in response to identifying the initial data item, correlating related data items into a first review collection based on a first review data collection strategy of a plurality of review data correlation strategies, the first review data collection strategy associated with the first initial financial risk identification strategy, the first review collection comprising the related data items and the initial data item, the first review collection comprising a plurality of data items selected from the group consisting of the plurality of chat messages, the plurality of email messages, and the plurality of electronic trade data items, calculating a first score associated with the first review collection based on one or more scoring criterions; and in response to the first score exceeding a threshold score value, displaying on a computer display screen at least a portion of the first review collection for inspection by a user.

In various embodiments the data collection comprises the plurality of email messages, the first initial financial risk identification strategy comprises identifying, from the plurality of email messages an email message thread comprising a plurality of emails relating to an email subject, the email message thread comprises a side conversation, the side conversation comprising one or more email messages having fewer participants than an initial email in the email message thread, and the first review data collection strategy comprises identifying, as the related data items, at least one electronic trade data item, the at least one electronic trade data item's trader property associated with a participant of the side conversation.

BRIEF DESCRIPTION OF THE DRAWINGS

So that the manner in which the above recited features of the present invention may be understood in detail, a more particular description of various embodiments, briefly summarized above, may be had by reference to the appended drawings and detailed description. However, the appended drawings illustrate only certain embodiments of present disclosure and are therefore not to be considered limiting of its scope.

Example Application of the Data Analysis System to Assist in Financial Malfeasance Detection

FIG. 10E illustrates an example review collection user interface of the data analysis system as applied to financial malfeasance detection, according to an embodiment of the present disclosure.

DETAILED DESCRIPTION OF SPECIFIC EMBODIMENTS

I. Terms

Figure 1:
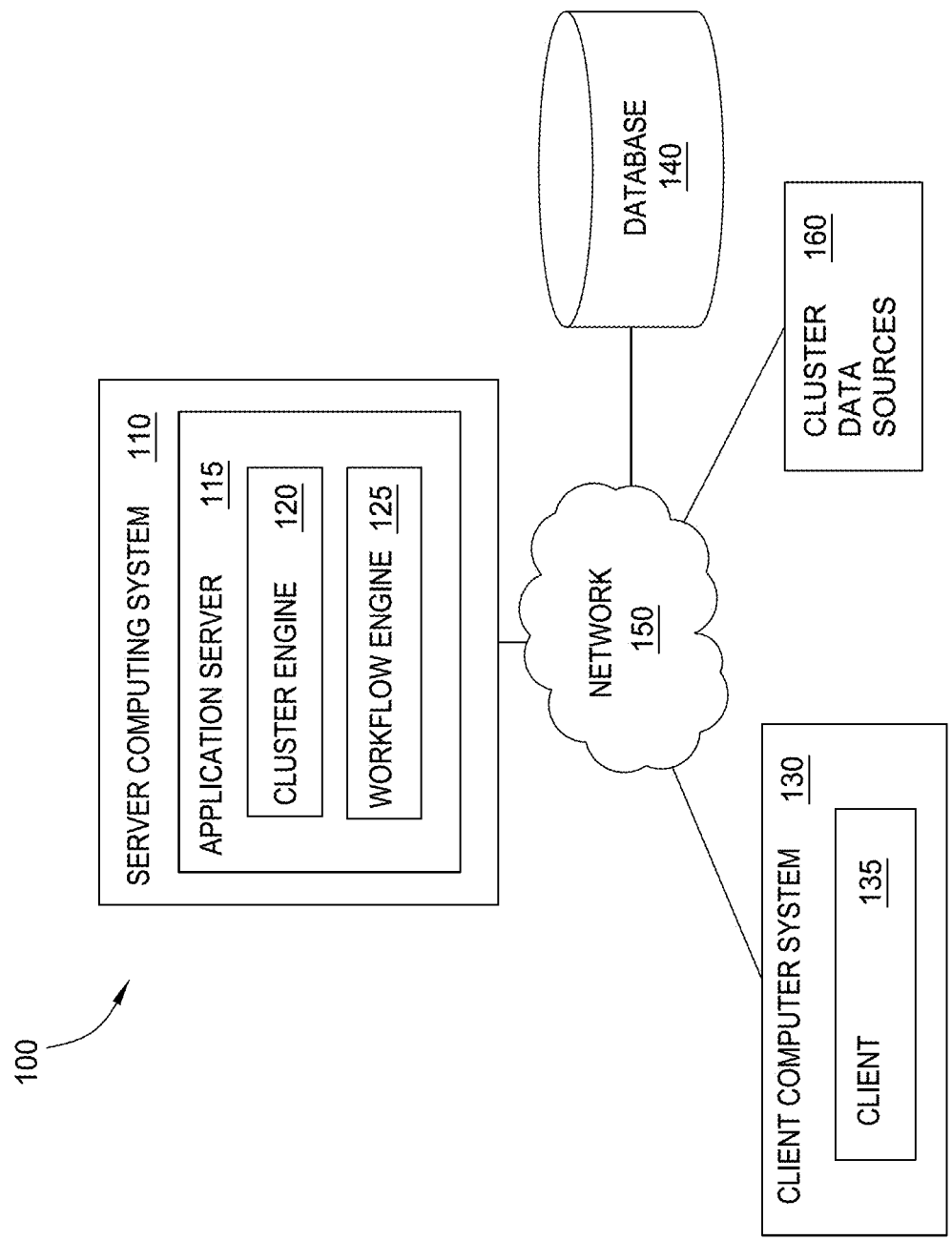
FIG. 1 is a block diagram illustrating an example data analysis system, according to an embodiment of the present disclosure.

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Ontology: Stored information that provides a data model for storage of data in one or more databases. For example, the stored data may comprise definitions for object types and property types for data in a database, and how objects and properties may be related.

Database: A broad term for any data structure for storing and/or organizing data, including, but not limited to, relational databases (for example, Oracle database, mySQL database, and the like), spreadsheets, XML files, and text file, among others. The various terms "database," "data store," and "data source" may be used interchangeably in the present disclosure.

Data Entity (Entity), Data Object (Object), or Data Item (Item): A data container for information representing specific things in the world that have a number of definable properties. For example, a data entity may represent an entity such as a person, a place, an organization, an account, a computer, an activity, a market instrument, a trade of a market instrument, an email message, an email thread, a chat message, a chat thread, or other noun. A data entity may represent an event that happens at a point in time or for a duration. A data entity may represent a document or other unstructured data source such as an e-mail message or thread, a chat message or thread, a news report, or a written paper or article. Each data entity may be associated with a unique identifier that uniquely identifies the data entity. The data entity's attributes (for example, metadata about the data entity) may be represented in one or more properties. The terms "data entity," "data object," and "data item" may be used interchangeably and/or synonymously in the present disclosure.

Entity (or Object or Item) Type: Type of a data entity (for example, Person, Event, or Document, Email Message, Chat Message, Trade, etc.). Data entity types may be defined by an ontology and may be modified or updated to include additional data entity types. A data entity definition (for example, in an ontology) may include how the data entity is related to other data entities, such as being a sub-data entity type of another data entity type (for example, an agent may be a sub-data entity of a person data entity type), and the properties the data entity type may have.

Properties: Also referred to as "metadata," includes attributes of a data entity that represent individual data items. At a minimum, each property of a data entity has a property type and a value or values. Properties/metadata associated with data entities may include any information relevant to that object. For example, properties associated with a person data entity may include a name (for example, John Doe), an address (for example, 123 S. Orange Street), and/or a phone number (for example, 800-0000), among other properties. In another example, metadata associated with a computer data entity may include a list of users (for example, user1, user 2, and the like), and/or an IP (internet protocol) address, among other properties. In another example, an email message may have email addresses (which themselves contain a username and a domain portion) in the TO, FROM, CC, and BCC fields, text entered in the SUBJECT field, and additional text in a BODY field. A trade of a financial instrument may have a TICKER SYMBOL, a buying trader and/or institution making the purchase, a selling trader and/or institution making the sale, a time traded, and certain other flags disclosed herein, among others.

Property Type: The type of data a property is, such as a string, an integer, or a double. Property types may include complex property types, such as a series data values associated with timed ticks (for example, a time series), and the like.

Property Value: The value associated with a property, which is of the type indicated in the property type associated with the property. A property may have multiple values.

Link: A connection between two data objects, based on, for example, a relationship, an event, and/or matching properties. Links may be directional, such as one representing a payment from person A to B, or bidirectional.

Link Set: Set of multiple links that are shared between two or more data objects.

Seed, Initial Data Item, Initial Financial Risk Identification Data Item: One or more data entities that may be used as a basis, or starting point, for generating a cluster/review collection. One or more seeds may be generated, determined, and/or selected from one or more sets of data entities according to a seed generation strategy/initial financial risk identification strategy. For example, seeds may be generated from data entities accessed from various databases and data sources including, for example, databases maintained by financial institutions, government entities, private entities, public entities, and/or publicly available data sources, including chat, trade and email message databases.

Cluster, Review Collection: A group or set of one or more related data entities/objects/items. A cluster may be generated, determined, and/or selected from one or more sets of data entities according to a cluster generation strategy. A cluster may further be generated, determined, and/or selected based on a seed. For example, a seed may comprise an initial data entity of a cluster. Data entities related to the seed may be determined and added to the cluster. Further, additional data entities related to any clustered data entity may also be added to the cluster iteratively as indicated by a cluster generation strategy, which may correspond to an initial financial risk identification strategy. Data entities may be related by any common and/or similar properties, metadata, types, relationships, and/or the like.

Seed/Cluster Generation Strategy (or Rule), Initial Financial Risk Identification Strategy, Review Data Collection Strategy: Seed and cluster generation strategies/rules indicate processes, methods, and/or strategies for generating seeds and generating clusters, respectively. For example, a seed generation strategy may indicate that data entities having a particular property (for example, data entities that are suspect trades) are to be designated as seeds. In another example, a cluster generation strategy may indicate that data entities having particular properties in common with (or similar to) a seed or other data entity in a cluster are to be added to the cluster (e.g., emails matching a trader on a suspect trade during a certain time period, or emails matching a trader on a suspect trade during a certain time period and also including the traded ticker symbol, or emails matching a trader on a suspect trade during a certain time period and are also detected as side conversations). Seed and/or cluster generation strategies may specify particular searches and/or rule matches to perform on one or more sets of data entities. Execution of a seed and/or cluster generation strategy may produce layers of related data entities. Additionally, a seed/cluster generation strategy/rule may include multiple strategies, sub-strategies, rules, and/or sub-rules.

II. Overview of Seed Generation and Cluster Generation

According to various embodiments, a data analysis system is disclosed in which clusters of related data entities may be generated from initial data entities, called "seeds." Seeds and related data entities may be accessed from various databases and data sources including, for example, databases maintained by financial institutions, government entities, private entities, public entities, and/or publicly available data sources. Such databases and data sources may include a variety of information and data, such as, for example, personal information, financial information, tax-related information, computer network-related data, and/or computer-related activity data, trades of financial instruments, employee data information, customer data information, email message of employees of an institution, chat messages of employees of an institution, among others. Further, the databases and data sources may include various relationships that link and/or associate data entities with one another. Various data entities and relationships may be stored across different systems controlled by different entities and/or institutions. According to various embodiments, the data analysis system may bring together data from multiple data sources in order to build clusters.

In various embodiments, the data analysis system may enable a user to efficiently perform analysis and investigations of various data entities and clusters of data entities. For example, the system may enable a user (also referred to herein as an "analyst") to perform various financial and security investigations related to a seed (for example, an initial data entity or data object). In such an investigation, the system may enable an analyst to search and/or investigate several layers of related data entities. For example, a credit card account may be a seed that is linked by the system to various data entities including, for example, customer identifiers and/or phone numbers associated with the credit card account. Further, the system may link, for example, various other credit card accounts related to the customer identifiers, to the seed credit card account. Accordingly, in various embodiments, the system may automatically determine and provide to a user or analyst various layers of data entities related to the seed credit card account. Such an investigation may, in an embodiment, enable the analyst to determine fraudulent activity. For example, if the seed credit card account was suspected to be fraudulent, then the analyst may determine that the additional credit card accounts may also be fraudulent. Further, if the seed credit card account was linked to other known fraudulent credit card accounts, the analyst may determine that the seed credit card account was likely to be fraudulent. As mentioned above, in such an investigation the analyst may discover relationships between the additional credit card accounts and the seed credit card account through several layers of related data entities. Such techniques, enabled by various embodiments of the data analysis system, may be particularly valuable for investigations in which relationships between data entities may include several layers, and in which such relationships may be otherwise very difficult or impossible to manually identify.

In various embodiments, the data analysis system may automatically generate, or determine, seeds based on a seed generation strategy (also referred to as "seed generation rules" or "initial financial risk identification strategy" and its variants). For example, for a particular set of data entities, the data analysis system may automatically generate, based on a seed generation strategy, seeds by designating particular data entities (or groups of data entities) as seeds. Examples of various seed generation strategies are described below.

Further, in various embodiments, the data analysis system may automatically discover data entities related to a seed, and store the resulting relationships and related data entities together in a "cluster." A cluster generation strategy (also referred to as "cluster generation rules" or "review data collection strategy" and its variants) may specify particular searches to perform at each step of an investigation, or cluster generation, process. Such searches may produce layers of related data entities to add to the cluster. Further, according to an embodiment, multiple cluster may be merged and/or collapsed into a single cluster when the multiple cluster share one or more common data entities and/or properties. Thus, according to an embodiment, an analyst may start an investigation with the resulting cluster, rather than the seed alone. Starting with the cluster, the analyst may form opinions regarding the related data entities, conduct further analysis of the related data entities, and/or may query for additional related data entities.

According to various embodiments, the data analysis system may further generate various "cluster scores." Cluster scores may include scores based on various characteristics and/or attributes associated with the cluster and/or the various data entities of the cluster. In various embodiments, the data analysis system may also generate "cluster metascores" which may include, for example, an overall cluster score. Cluster metascores may, for example, be based on a combination of cluster scores of a cluster associated with a seed.

Further, in various embodiments, for a particular set of data entities, multiple clusters may be generated by the data analysis system. For example, the data analysis system may generate multiple seeds according to a seed generation strategy, and then multiple clusters based on those seeds (and based on a cluster generation strategy). In such embodiments, the data analysis system may prioritize the multiple generated clusters based upon cluster scores and/or cluster metascores. In an embodiment, the data analysis system may provide a user interface including a display of summaries of the clusters, including cluster scores, cluster metascores, and/or various other cluster information. Such summaries may be displayed according to a prioritization of clusters. In various embodiments, cluster prioritization may assist an analyst in selecting particular clusters to investigate.

In various embodiments, the data analysis system may be used in various data analysis applications. Such applications may include, for example, financial fraud detection, tax fraud detection, beaconing malware detection, malware user-agent detection, activity trend detection, health insurance fraud detection, financial account fraud detection, detection of activity by networks of individuals, and/or criminal activity detection, detection of financial malfeasance, insider trading, disclosure of customer and/or confidential information, misrepresentation, collusion, among various others. In particular, FIGS. 9-16 illustrate how a seed and cluster analysis system can automatically generate seeds and review collections for assistance with detecting financial malfeasance, such as collusion, insider trading, disclosure of non-confidential information outside a company, disclosure of a client or customer's confidential information, etc.

In the following description, numerous specific details are set forth to provide a more thorough understanding of various embodiments of the present disclosure. However, it will be apparent to one of skill in the art that the systems and methods of the present disclosure may be practiced without one or more of these specific details.

III. Examples of Data Entities, Properties, and Links

In various embodiments, different types of data entities may have different property types. For example, a "Person" data entity may have an "Eye Color" property type and an "Event" data entity may have a "Date" property type. Each property as represented by data in a database may have a property type defined by an ontology used by the database. Further, data entities may be instantiated in a database in accordance with a corresponding object definition for the particular data entity in the ontology. For example, a specific monetary payment (for example, an entity of type "event") of US$30.00 (for example, a property of type "currency" having a property value of "US$30.00") taking place on Mar. 27, 2009 (for example, a property of type "date" having a property value of "Mar. 27, 2009") may be stored in the database as an event object with associated currency and date properties as defined within the ontology.

Data objects defined in an ontology may support property multiplicity. In particular, a data entity may be allowed to have more than one property of the same property type. For example, a "Person" data object might have multiple "Address" properties or multiple "Name" properties.

A link represents a connection between two data entities and may be through any of a relationship, an event, and/or matching properties. A link may be asymmetrical or symmetrical. For example, "Person" data entity A may be connected to "Person" data entity B by a "Child Of" relationship (where "Person" data entity B has an asymmetric "Parent Of" relationship to "Person" data entity A), a "Kin Of" symmetric relationship to "Person" data entity C, and an asymmetric "Member Of" relationship to "Organization" data entity X. The type of relationship between two data entities may vary depending on the types of the data entities. For example, "Person" data entity A may have an "Appears In" relationship with "Document" data entity Y or have a "Participate In" relationship with "Event" data entity E. As an example of an event connection, two "Person" data entities may be connected by an "Airline Flight" data entity representing a particular airline flight if they traveled together on that flight, or by a "Meeting" data entity representing a particular meeting if they both attended that meeting. In one embodiment, when two data entities are connected by an event, they are also connected by relationships, in which each data entity has a specific relationship to the event, such as, for example, an "Appears In" relationship.

As an example of a matching properties connection, two "Person" data entities representing a brother and a sister may both have an "Address" property that indicates where they live. If the brother and the sister live in the same home, then their "Address" properties likely contain similar, if not identical property values. In one embodiment, a link between two data entity may be established based on similar or matching properties (for example, property types and/or property values) of the data entity. These are just some examples of the types of connections that may be represented by a link and other types of connections may be represented; embodiments are not limited to any particular types of connections between data entities. For example, a document may contain references to two different entities. For example, a document may contain a reference to a payment (one data entity), and a person (a second data entity). A link between these two data entities may represent a connection between these two entities through their co-occurrence within the same document.

Each data entity may have multiple links with another data entity to form a link set. For example, two "Person" data entities representing a husband and a wife may be linked through a "Spouse Of" relationship, a matching "Address" property, and/or one or more matching "Event" properties (for example, a wedding). Each link, as represented by data in a database, may have a link type defined by the database ontology used by the database.

In various embodiments, the data analysis system may access various data entities and associated properties from various databases and data sources. Such databases and data sources may include a variety of information and data, such as, for example, personal information or employee personal information (for example, names, addresses, phone numbers, personal identifiers, and the like), financial information (for example, financial account information, transaction information, trade transactions, balance information, and the like), tax-related information (for example, tax return data, and the like), computer network-related data (for example, network traffic information, IP (Internet Protocol) addresses, user account information, domain information, network connection information, and the like), and/or computer-related activity data (for example, computer events, email messages, chat messages, user actions, and the like), among others.

IV. Description of the Figures

Embodiments of the disclosure will now be described with reference to the accompanying Figures, wherein like numerals refer to like elements throughout. The terminology used in the description presented herein is not intended to be interpreted in any limited or restrictive manner, simply because it is being utilized in conjunction with a detailed description of certain specific embodiments of the disclosure. Furthermore, embodiments of the disclosure may include several novel features, no single one of which is solely responsible for its desirable attributes or which is essential to practicing the embodiments of the disclosure herein described.

FIG. 1 is a block diagram illustrating an example data analysis system 100, according to one embodiment. As shown in the embodiment of FIG. 1, the data analysis system 100 includes an application server 115 running on a server computing system 110, a client 135 running on a client computer system 130, and at least one database 140. Further, the client 135, application server 115, and database 140 may communicate over a network 150, for example, to access cluster data sources 160.

The application server 115 may include a cluster engine 120 and a workflow engine 125. The cluster engine 120 and a workflow engine 125 may be software modules as described below in reference to FIG. 8. According to an embodiment, the cluster engine 120 is configured to build one or more clusters of related data entities, according to a defined cluster generation strategy. The cluster engine 120 may read data from a variety of cluster data sources 160 to generate clusters from seeds (also referred to as "seed data entities" or "initial data items"). Once created, the resulting clusters may be stored on the server computing system 110 and/or on the database 140. The operations of the cluster engine 120 are discussed in detail below in conjunction with FIGS. 2 and 3.

In an embodiment, the cluster engine 120 is configured to score the clusters, according to a defined scoring strategy. The score may indicate the importance of analyzing the cluster. For instance, the cluster engine 120 may execute a scoring strategy that aggregates the account balances of credit card accounts within the cluster. Because, for example, a large aggregated total balance may indicate a large liability for a financial institution, a cluster with such a large total balance may be considered to have a higher score relative to other clusters with lower aggregated total balances (and, therefore, lower scores). Thus, a cluster with a higher score relative to a cluster with a lower score may be considered more important to analyze.

In one embodiment, the cluster engine 120 organizes and presents the clusters according to the assigned scores. The cluster engine 120 may present summaries of the clusters and/or interactive representations of the clusters within the cluster analysis UI. For example, the representations may provide visual indications (e.g., graphs or other visualizations) of the related data entities within the clusters. The cluster engine 120 may generate a cluster analysis user interface (UI), such as a web application and/or a dynamic web page displayed within the client 135. The cluster engine 120 may also allow an analyst to create tasks associated with the clusters. Example operations of the cluster engine 120 are discussed in detail below in conjunction with FIGS. 4 and 5. In one embodiment, the cluster engine 120 generates clusters automatically, for example, for subsequent review by analysts.

Analysts may also assign tasks to themselves or one another via a workflow UI generated by the workflow engine, for example. The workflow engine 125 may consume scores generated by the cluster engine 120. For example, the workflow engine 125 may present an analyst with clusters generated, scored, and ordered by the cluster engine 120.

The client 135 may represent one or more software applications or modules configured to present data and translate input, from the analyst, into requests for data analyses by the application server 115. In one embodiment, the client 135 and the application server 115 may be embodied in the same software module and/or may be included in the same computing system. However, several clients 135 may execute on the client computer 130, and/or several clients 135 on several client computers 130 may interact with the application server 115. In one embodiment, the client 135 may be a browser accessing a web service.

While the client 135 and application server 115 are shown running on distinct computing systems, the client 135 and application server 115 may run on the same computing system. Further, the cluster engine 120 and the workflow engine 125 may run on separate applications servers 115, on separate server computing systems, or some combination thereof. Additionally, a history service may store the results generated by an analyst relative to a given cluster.

In one embodiment, the cluster data sources 160 provide data available to the cluster engine to create or generate seeds and/or to create or generate clusters from a seed or a set of seeds. Such data sources may include relational data sources, web services data, XML data, and the like. Further, such data sources may include a variety of information and data, for example, personal information, financial information, tax-related information, computer network-related data, and/or computer-related activity data, among others. For example, the data sources may be related to customer account records stored by a financial institution. In such a case, the data sources may include a credit card account data, bank account data, customer data, and transaction data. The data may include data attributes such as account numbers, account balances, phone numbers, addresses, and transaction amounts, and the like. Of course, cluster data sources 160 is included to be representative of a variety of data available to the server computer system 110 over network 150, as well as locally available data sources.

The database 140 may be a Relational Database Management System (RDBMS) that stores the data as rows in relational tables. The term "database," as used herein, may refer to a database (e.g., RDBMS or SQL database), or may refer to any other data structure, such as, for example a comma separated values (CSV), extensible markup language (XML), text (TXT) file, flat file, spreadsheet file, and/or any other widely used or proprietary format. While the database 140 is shown as a distinct computing system, the database 140 may operate on the same server computing system 110 as the application server 115.

Figure 2:
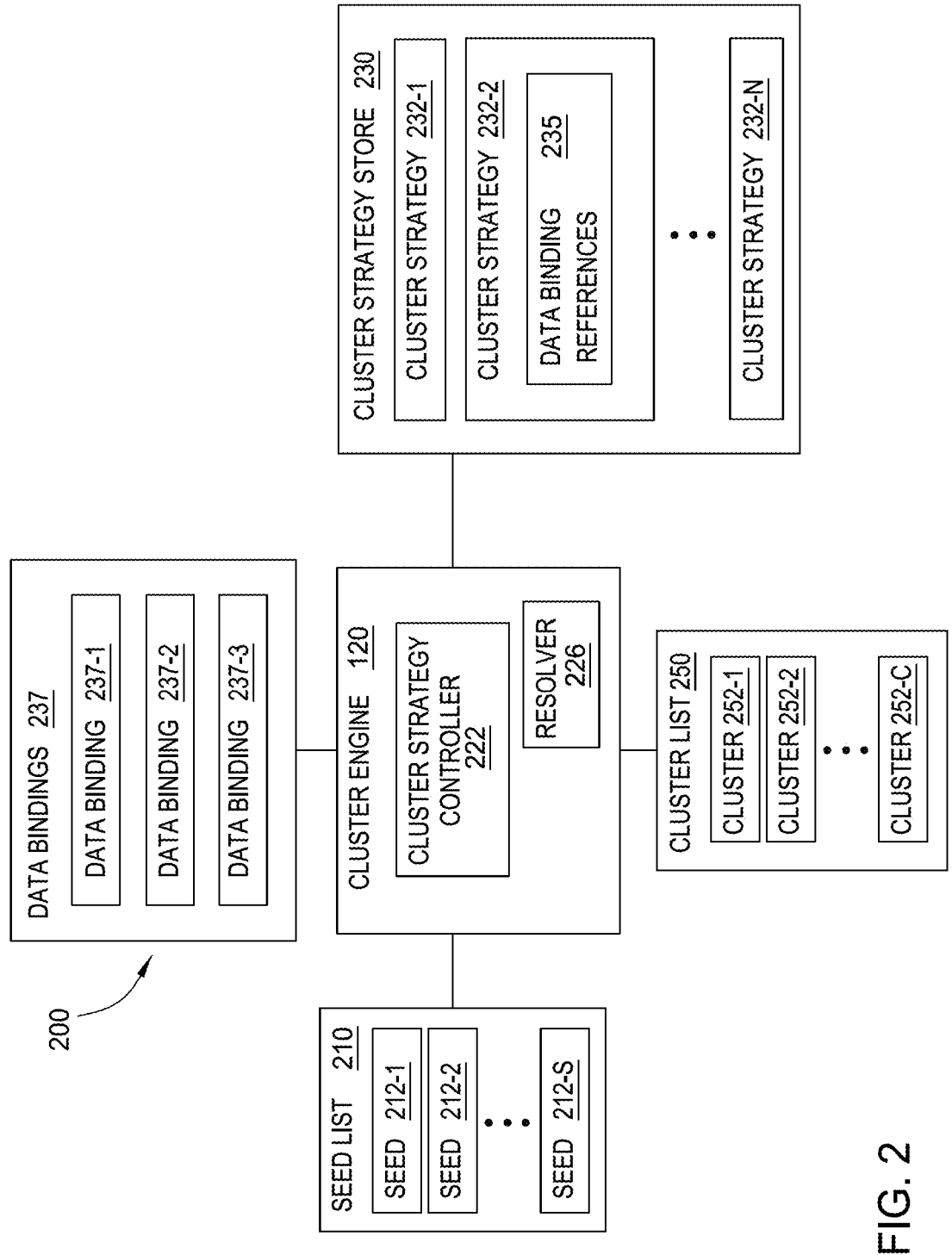
FIG. 2 is a block diagram illustrating an example generation of clusters by the data analysis system, according to an embodiment of the present disclosure.

FIG. 2 is a block diagram illustrating an example generation of clusters by data analysis system 200, according to an embodiment. As shown, in an embodiment the cluster engine 120 (FIG. 1) interacts with a seed list 210, a cluster list 250, a cluster strategy store 230, and data bindings 237. The seed list 210 may include seeds 212-1, 212-2 . . . 212-S, and the cluster list 250 may include clusters 252-1, 252-2 . . . 252-C. The cluster engine 120 may be configured as a software application, module, or thread that generates the clusters 252-1, 252-2 . . . 252-C from the seeds 212-1, 212-2 . . . 212-S.

Seeds 212 (including one, some, or all of seeds 212-1 through 212-S) may be generated by the cluster engine 120 according to various seed generation strategies/rules. Examples of seed generation are described below in reference to various example applications of the data analysis system. According to an embodiment, once generated, seeds 212 may be the starting point for generating a cluster 252. To generate a cluster, the cluster engine 120 may retrieve a given seed 212 from the seed list 210. The seed 212 may be a data entity or group of data entities within the database 140, such as a customer name, a customer social security number, an account number, and/or a customer telephone number.

The cluster engine 120 may generate the cluster 252 from the seed 212. In one embodiment, the cluster engine 120 generates the cluster 252 as a collection of data entities and the relationships between the various data entities. As noted above, the cluster strategy may execute data bindings in order to add each additional layer of data entities to the cluster. For example, the cluster engine 120 may generate the cluster 252-1 from a seed credit card account. The cluster engine 120 may first add the credit card account to the cluster 252-1. The cluster engine 120 may then add customers related to the credit card account to the cluster 252-1. The cluster engine 120 may complete the cluster 252-1 by adding additional credit card accounts related to those customers. As the cluster engine 120 generates the cluster 252-1, the cluster engine 120 may store the cluster 252-1 within the cluster list 250. The cluster 252-1 may be stored as a graph data structure or other appropriate data structure.

The cluster list 250 may be a collection of tables in the database 140. In such a case, there may be a table for the data entities of each cluster 252, such as those of example cluster 252-1 discussed above, a table for the relationships between the various data entities, a table for the attributes of the data entities, and a table for scores of the clusters. The cluster list 250 may include clusters 252 from multiple investigations. Note that the cluster engine 120 may store portions of clusters 252 in the cluster list 250 as the cluster engine 120 generates the clusters 252. Persons skilled in the art will recognize that many technically feasible techniques exist for creating and storing data structures that may be used to implement the systems and methods of the data analysis system.

The cluster strategy store 230 may include cluster strategies 232-1, 232-2 . . . 232-N. Each cluster strategy may include data binding references 235 to one or more data bindings 237. As noted, each data binding may be used to identify data that may grow a cluster (as determined by the given search strategy 232). For example, the cluster engine 120 may execute a cluster strategy 232-1 to generate the cluster 252-1. Specifically, the cluster engine 120 may execute the cluster strategy 232-1 in response to selection of that cluster strategy by an analyst. The analyst may submit a selection of one or more cluster strategies to perform on a seed or group of seeds to the cluster engine 120 through the client 135. Alternatively, the cluster engine 120 may automatically select one or more cluster strategies, such as based on user preferences or rules.

According to an embodiment, each cluster strategy 232 is configured so as to perform an investigation processes for generating a cluster 252. Again, for example, the cluster strategy 232-2 may include data binding references 235 to a collection of data bindings executed to add layer after layer of data to a cluster. The investigation process may include searches to retrieve data entities related to a seed 212 that is selected for clustering using cluster strategy 232-2. For example, the cluster strategy 232-2 may start with a possibly fraudulent credit card account as the seed 212-2. The cluster strategy 232-2 may search for customers related to the credit card account, and then additional credit card accounts related to those customers. A different cluster strategy 232-3 may search for customers related to the credit card account, phone numbers related to the customers, additional customers related to the phone numbers, and additional credit card accounts related to the additional customers, for example.

In an embodiment, cluster strategies 232 include references to at least one data binding 237 (such as data bindings 237-1 through 237-3). The cluster engine 120 may execute a search protocol specified by the data binding 237 to retrieve data, and the data returned by a given data binding may form a layer within the cluster 252. For instance, the data binding 237 (and/or the search protocol of the data binding 237) may retrieve sets of customers related to an account by an account owner attribute. The data binding 237 (and/or the search protocol of the data binding 237) may retrieve the set of related data entities from a data source. For instance, the data binding 237-1 may specify a database query to perform against a database. Likewise, the data binding 237-2 may define a connection and/or query to a remote relational database system and the data binding 237-3 may define a connection and/or query against a third-party web service. Once retrieved, the cluster strategy 232 may evaluate whether the returned data should be added to a cluster being grown from a given seed 212.

Multiple cluster strategies 232 may reference a given data binding 237. The analyst may update the data binding 237, but typically updates the data binding 237 only if the associated data source changes. A cluster strategy 232 may also include a given data binding 237 multiple times. For example, executing a data binding 237 using one seed 212 may generate additional seeds for that data binding 237 (or generate seeds for another data binding 237). More generally, different cluster strategies 232-1, 232-2 . . . 232-N may include different arrangements of various data bindings 237 to generate different types of clusters 252.

The cluster strategies 232 may specify that the cluster engine 120 use an attribute from the related data entities retrieved with one data binding 237, as input to a subsequent data binding 237. The cluster engine 120 may use the subsequent data binding 237 to retrieve a subsequent layer of related date entities for the cluster 252. For instance, a particular cluster strategy 232 may specify that the cluster engine 120 retrieve a set of credit card account data entities with a first data binding 237-1. That cluster strategy 232 may also specify that the cluster engine 120 then use the account number attribute from credit card account data entities as input to a subsequent data binding 237-2. The cluster strategy 232 may also specify filters for the cluster engine 120 to apply to the attributes before performing the subsequent data binding 237. For instance, if the first data binding 237-1 were to retrieve a set of credit card account data entities that included both personal and business credit card accounts, then the cluster engine 120 could filter out the business credit card accounts before performing the subsequent data binding 237-2.

In operation, according to an embodiment, the cluster engine 120 generates a cluster 252-1 from a seed 212-1 by first retrieving a cluster strategy 232. Assuming the analyst selected a cluster strategy 232-2, the cluster engine 120 would retrieve the cluster strategy 232-2 from the cluster strategy store 230. The cluster engine 120 may then retrieve the seed 212-1 as input to the cluster strategy 232-2. The cluster engine 120 may execute the cluster strategy 232-2 by retrieving sets of data by executing data bindings 237 referenced by the cluster strategy 232-2. For example, the cluster strategy 232-2 may execute data bindings 237-1, 237-2, and 237-3. Accordingly, the cluster engine 120 may evaluate data returned by each data binding 237 to determine whether to use that data to grow the cluster 252-1. The cluster engine 120 may then use elements of the returned data as input to the next data binding 237. Of course, a variety of execution paths are possible for the data bindings 237. For example, assume one data binding 237 returned a set of phone numbers. In such a case, another data binding 237 may evaluate each phone number individually. As another example, one data binding 237 may use input parameters obtained by executing multiple, other data bindings 237. More generally, the cluster engine 120 may retrieve data for each data binding referenced by the cluster strategy 232-2. The cluster engine 120 may then store the complete cluster 252-1 in the cluster list 250.

As the cluster engine 120 generates the clusters 252-1, 252-2 . . . 252-C from seeds 212-1, 212-2 . . . 212-S, the cluster list 250 may include overlapping clusters 252. For example, two clusters 252-1 and 252-C may overlap if both clusters 252-1 and 252-C include a common data entity. In an example, a larger cluster 252 formed by merging two smaller clusters 252-1 and 252-C may be a better investigation starting point than the smaller clusters 252-1 and 252-C individually. The larger cluster 252 may provide additional insight or relationships, which may not be available if the two clusters 252-1 and 252-C remain separate.

In an embodiment, the cluster engine 120 includes a resolver 226 that is configured to detect and merge two or more overlapping clusters 252 together. For example, the resolver 226 may compare the data entities within a cluster 252-1 to the data entities within each one of the other clusters 252-2 through 252-C. If the resolver 226 finds the same data entity within the cluster 252-1 and a second cluster 252-C, then the resolver 226 may merge the two clusters 252-1 and 252-C into a single larger cluster 252. For example, the cluster 252-1 and cluster 252-C may both include the same customer. The resolver 226 may compare the data entities of cluster 252-1 to the data entities of cluster 252-C and detect the same customer in both clusters 252. Upon detecting the same customer in both clusters 252, the resolver 226 may merge the cluster 252-1 with cluster 252-C. The resolver 226 may test each pair of clusters 252 to identify overlapping clusters 252. Although the larger clusters 252 may be better investigation starting points, an analyst may want to understand how the resolver 226 formed the larger clusters 252. Accordingly, the resolver 226, may store a history of each merge.

In an embodiment, cluster merging (for example, by resolver 226) may be optionally disabled for particular types of data entities, and/or particular data entities. For example, when a particular data entity, or type of data entity, is so common that it may be included in many different clusters (for example, an institutional entity such as a bank), merging of cluster based on that common entity (for example, the particular bank) or common type of entity (for example, banks in general) may be disabled. In another embodiment, cluster may be merged only when they share two or more common data entities and/or other properties. In an embodiment, when two clusters are determined to share a data entity that this very common (such that they cluster may not be merged based on that entity) the system may automatically determine whether the two clusters share one or more other data entities and/or properties such that they may be merged. In various embodiments, cluster merging may be disabled based on other criteria. For example, cluster merging between two related clusters may be disabled when one or both of the two clusters reach a particular size (for example, include a particular number of data entities).

After the cluster engine generates a group of clusters from a given collection of seeds (and after merging or resolving the cluster), the cluster engine 120 may score, rank, and/or otherwise order the clusters relative to a scoring strategy 442. In some embodiments, clusters are scored and provided to the analysis without resolving.

In one embodiment, the analysis system 100, and more specifically, the cluster engine 120, receives a request for cluster generation. In response to the request, a list of seeds may be generated, clusters may be generated based on those seeds, and the clusters may be ranked, ordered, and presented to analysts. In an embodiment, the cluster engine 120 may consume seeds generated by other systems. Alternatively, in other embodiments, cluster engine 120 may generate the seeds 212-1, 212-2 . . . 212-S. For instance, the cluster engine 120 may include a seed generation strategy (also referred to as a "lead generation strategy") that identifies data entities, or groups of data entities, as potential seeds 212. The seed generation (or lead generation) strategy may apply to a particular business type, such as credit cards, stock trading, or insurance claims, and may be run against a cluster data source 160 or an external source of information.

In an embodiment, the analysis system 100 may not include data bindings as described above. Rather, according to an embodiment, the analysis system 100 may include one or more interfaces and/or connections to various internal and/or external data stores of data entities and/or other information. According to an embodiment, the system may include a generic interface and/or connection to various internal and/or external data stores of data entities and/or other information. For example, the analysis system 100 may include a generic data interface through which the system may search, access, and/or filter various data entity information during seed and/or cluster generation. The generic interface may include various aspects that enable searching, accessing, and/or filtering of data. For example, the generic interface may access various data sources that each have differing data formats. The generic interface may accordingly covert and/or filter the accessed data to a common format. Alternatively, the data sources may include functionality through which stored data may be searched and/or converted to a standard format automatically. In an embodiment, the generic interface may enable Federated search of multiple data stores of data entity-related information. Accordingly, in various embodiments, the analysis system 100 may access various data sources for data entity clustering and seed generation.

V. Example Cluster Generation

Figure 3A:
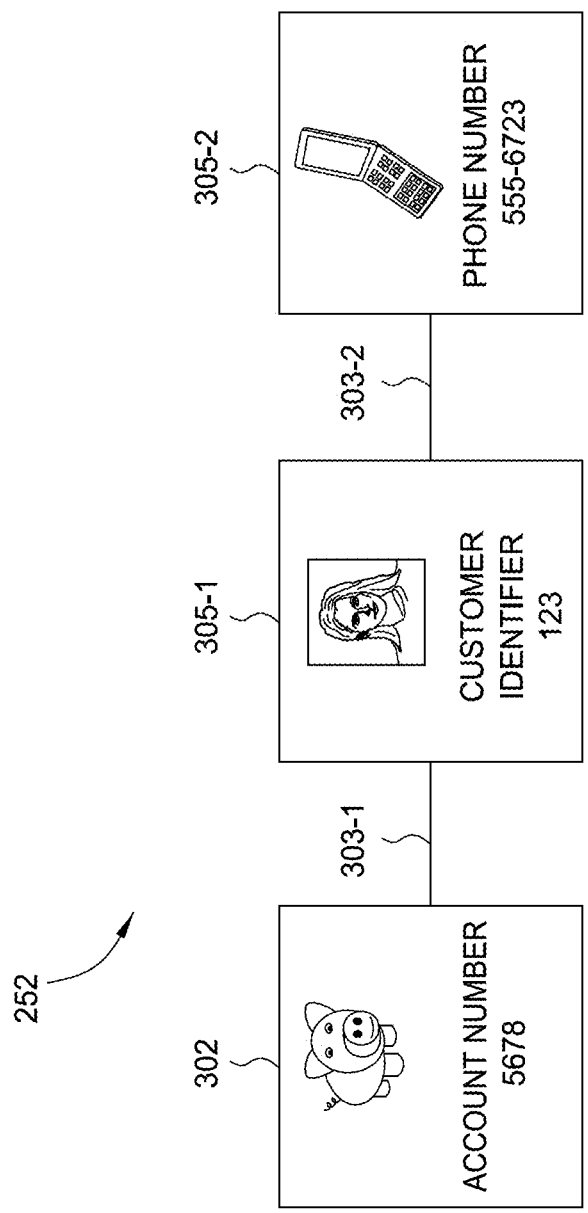
FIGS. 3A-3C illustrate an example growth of a cluster of related data entities, according to an embodiment of the present disclosure.
Figure 3B:
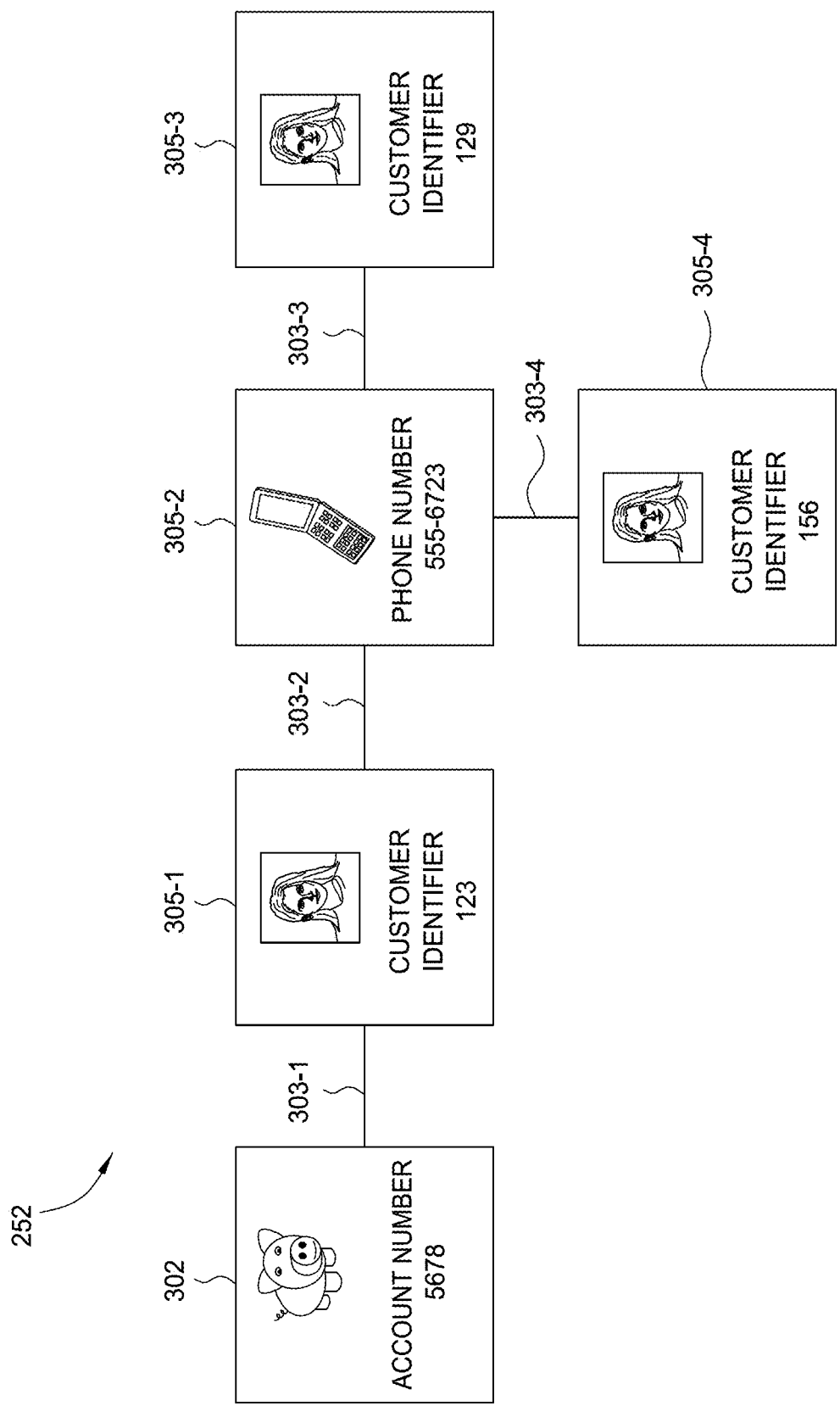
Figure 3C:
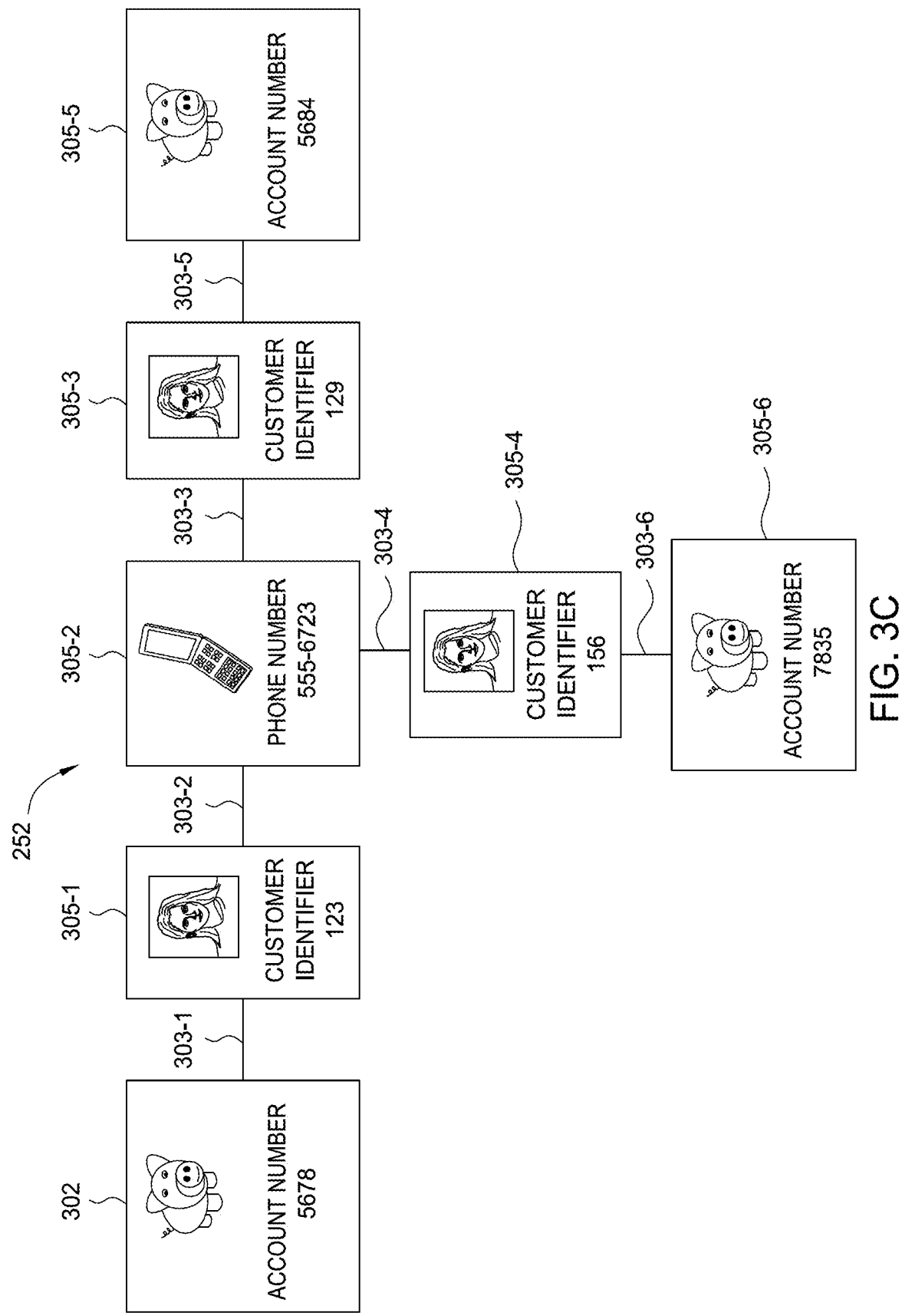

FIGS. 3A-3C illustrate an example growth of a cluster 252 of related data entities, according to an embodiment. As shown in FIG. 3A, an example cluster 252 may include a seed entity 302, links 303-1 and 303-2, and related data entities 305-1 and 305-2. The cluster 252 may be based upon a seed 212 (for example, data entity 302). The cluster engine 120 may build the cluster 252 by executing a cluster strategy 232 with the following searches:
 Find seed owner
 Find all phone numbers related to the seed owner
 Find all customers related to the phone numbers
 Find all accounts related to the customers
 Find all new customers related to the new accounts In the example, assuming the seed 212 is fraudulent credit card account, the cluster engine 120 would add the credit card account to the cluster 252 as the seed entity 302. The cluster engine 120 may then use the account owner attribute of the credit card account as input to a data binding 237. The cluster engine 120 may execute the search protocol of the data binding 237 to retrieve the customer data identifying the owner of the fraudulent credit card account. The cluster engine 120 would then add the customer data to the cluster 252 as the related data entity 305-1. The cluster engine 120 would also add the account owner attribute as the link 303-1 that relates the account number to the customer data of the owner. The cluster engine 120 would execute the next search of the cluster strategy 232 by inputting the customer identifier attribute of the customer data into a data binding 237 to retrieve a phone data. The cluster engine 120 would then add the phone data as the related data entity 305-2 and the customer identifier attribute as the link 303-2 between the customer data and the phone data. At this point in the investigation process, the cluster 252 would include the seed entity 302, two links 303-1 and 303-2, and two related data entities 305-1 and 305-2. That is, the cluster 252 would include the fraudulent credit card account, the customer data of the owner of the credit card, and the phone number of the owner. By carrying the investigation process further, the cluster engine 120 may reveal further related information, for example, additional customers and/or potentially fraudulent credit card accounts.

Turning to FIG. 3B, and continuing the example, the cluster engine 120 may continue executing the cluster strategy 232 by searching for additional account data entities related to the phone number of the owner of the fraudulent credit card account. As discussed, the phone number may be stored as related data entity 305-2. The cluster engine 120 would input the phone owner attribute of the phone number to a data binding 237. The cluster engine 120 would execute the search protocol of data binding 237 to retrieve the data of two additional customers, which the cluster engine 120 would store as related data entities 305-3 and 305-4. The cluster engine 120 would add the phone owner attribute as the links 303-3 and 304-4 between the additional customers and the phone number.

Continuing the example, FIG. 3C shows the cluster 252 after the cluster engine 120 performs the last step of the example cluster strategy 232. For example, the cluster engine 120 would use the customer identifier attribute of the related data entity 305-3 and 305-4 to retrieve and add additional account data entities as the related data entities 305-5 and 305-6. The cluster engine 120 would couple the related data entities 305-5 and 305-6 to the related data entities 305-3 and 305-4 with the customer identifier attributes stored as links 303-5 and 303-6. Thus, the cluster 252 would include six related data entities 305 related by six links 303, in addition to the seed entity 302.

In an embodiment, the analyst may identify and determine whether the additional data account entities, stored as related data entities 305-5 and 305-6, represent fraudulent credit card accounts more efficiently than if the analyst started an investigation with only the seed 302. As the foregoing example illustrates, according to various embodiments, the data analysis system may enable an analyst to advantageously start an investigation with a cluster including many related data entities (such as the example cluster 252 with the seed entity 302 and related data entities 305) rather than a single data entity.

VI. Example Cluster Scoring/Ranking

Figure 4:
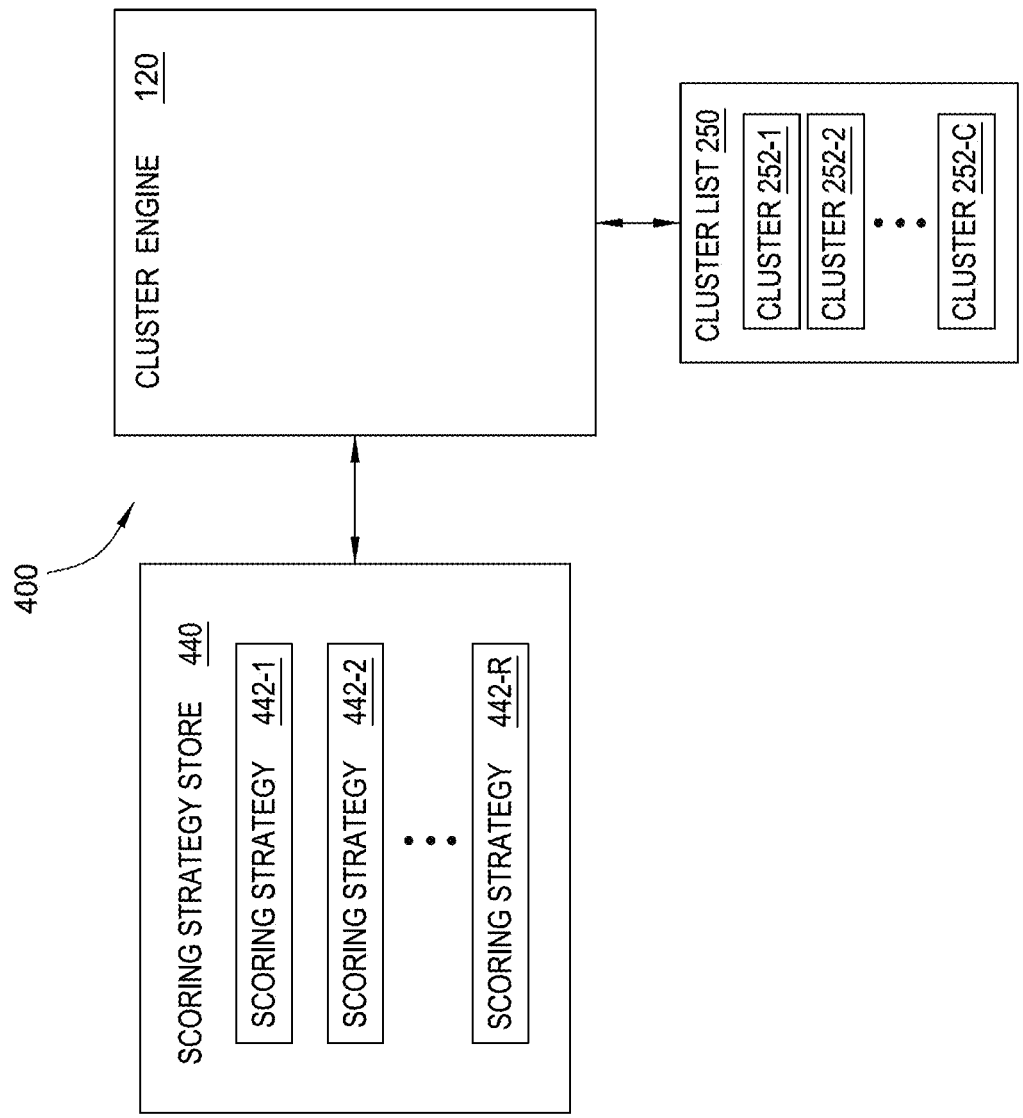
FIG. 4 illustrates an example ranking of clusters by the data analysis system, according to an embodiment of the present disclosure.

FIG. 4 illustrates an example ranking of clusters 252 by the data analysis system 100 shown in FIG. 1, according to an embodiment of the present disclosure. As shown, an example system 400 of FIG. 4 illustrates some of the same elements as shown in FIG. 1 and FIG. 2, including the cluster engine 120 in communication with the cluster list 250. In addition, FIG. 4 illustrates a scoring strategy store 440 in communication with the cluster engine 120. The scoring strategy store 440 includes scoring strategies 442-1, 442-2 . . . 442-R.

In an embodiment, the cluster engine 120 executes a scoring strategy 442 to score a cluster 252. For example, the cluster engine 120 may generate a cluster (for example, via a cluster strategy/data bindings) and attempt to resolve it with existing clusters. Thereafter, the cluster engine 120 may score the resulting cluster with any scoring strategies associated with a given cluster generation strategy. In an embodiment, the multiple scores may be generated for a given cluster. The multiple scores may be based on various aspects, metrics, or data associated with the cluster. In one embodiment, a cluster metascore may be generated based on a combination or aggregation of scores associated with a given cluster. Ordering for a group of clusters, (according to a given scoring strategy) may be performed on demand when requested by a client. Alternatively, the analyst may select a scoring strategy 442 through the client 135 and/or the analyst may include the selection within a script or configuration file. In another alternative, the data analysis system may automatically select a scoring strategy. In other embodiments, the cluster engine 120 may execute several scoring strategies 442 to determine a combined score for the cluster 252.

In an embodiment, a scoring strategy (such as scoring strategy 442) specifies an approach for scoring a cluster (such as cluster 252). A score may indicate a relative importance or significance of a given cluster. For example, the cluster engine 120 may execute a scoring strategy 442-1 to determine a score by counting the number of a particular data entity type that are included within the cluster 252. Assume, for example, a data entity corresponds with a credit account. In such a case, a cluster with a large number of accounts opened by a single individual (possibly within a short time) might correlate with a higher fraud risk. Of course, a cluster score may be related to a high risk of fraud based on the other data in the cluster, as appropriate for a given case. More generally, each scoring strategy 442 may be tailored based on the data in clusters created by a given cluster strategy 230 and a particular type of risk or fraud (or amounts at risk) of interest to an analyst.

According to an embodiment, the cluster engine 120 scores a cluster 252-1 by first retrieving a scoring strategy 442. For example, assume an analyst selects scoring strategy 442-1. In response, the cluster engine 120 may retrieve the scoring strategy 442-1. The cluster engine 120 may also retrieve the cluster 252-1 from the cluster list 250. After determining the score of the cluster 252-1, the cluster engine 120 may store the score with the cluster 252-1 in the cluster list 250.

The cluster engine 120 may score multiple clusters 252-1, 252-2 . . . 252-C in the cluster list 250. The cluster engine 120 may also rank the clusters 252-1, 252-2 . . . 252-C based upon the scores. For instance, the cluster engine 120 may rank the cluster 252-1, 252-2 . . . 252-C from highest score to lowest score. In various embodiment, cluster may be ranked according into multiple scores, combinations of scores, and/or metascores.

VII. Example User Interface

Figure 5:
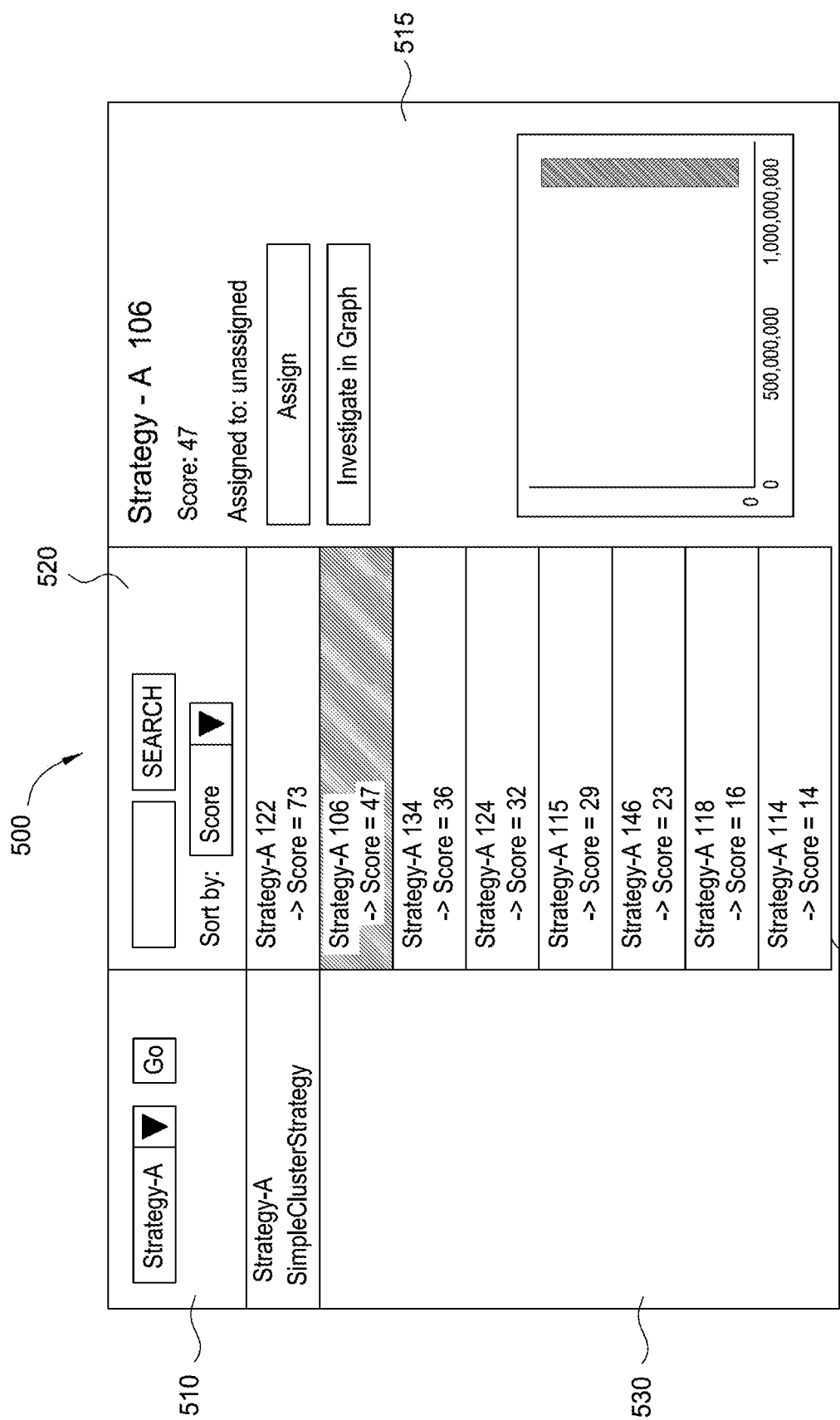
FIG. 5 illustrates an example cluster analysis user interface, according to an embodiment of the present disclosure.

FIG. 5 illustrates an example cluster analysis user interface (UI) 500, according to one embodiment. As described above, the workflow engine 125 may be configured to present the cluster analysis UI 500. As shown, the example cluster analysis UI 500 includes a selection box 510, a cluster strategy box 530, a cluster summary list 525, a cluster search box 520, and a cluster review window 515. The workflow engine 125 may generate the cluster analysis UI 500 as a web application or a dynamic web page displayed within the client 135.

In the example UI 500 of FIG. 5, the selection box 510 may allow the analyst to select, for example, a seed generation strategy and/or a previously generated seed or seed list (for example, seed list 210). The analyst may select the items (for example, a seed generation strategy) by, for example, entering a name of a particular item into a drop-down box (or other interface element) in the selection box 510 (for example, the dropdown box showing a selected strategy "Strategy-A") and selecting a "Go" button (or other interface element). Alternatively, the analyst may select a particular item by, for example, expanding the dropdown box and selecting an item from the expanded dropdown box, which may list various seed generation strategies and/or seed lists, for example. In various examples, seed lists and/or seed generation strategies may be selected by the analyst that correspond to likely fraudulent financial accounts, credit card account originating at a particular bank branch, savings accounts with balances above a particular amount, and/or any of the other seed generation strategies described below in reference to the various applications of the system.

For example, when the analyst selects a particular seed generation strategy, the system may generate a seed list (for example, seed list 210) and then may generate clusters based on seeds of the seed list. The seed list and/or clusters may, in an embodiment, be generated in response to a selection of a particular seed generation strategy. The seed generation strategy may generate a seed list (for example, seed list 210) and/or clusters (for example, clusters 252-1, 252-2, . . . 252-C of the cluster list 250) from the database 140 and/or an external source of information (for example, a cluster data source 160). Alternatively, when the analyst selects a previously generated seed or seed list (for example, seed list 210), the system may retrieve data related to the selected seed list (for example, the seed entities, clusters, and/or related clustered data entities) from, for example, database 140 and/or an external source of information (for example, a cluster data source 160). In an embodiment, clusters may be generated in response to a selection of a previously generated seed list (or seed). Alternatively, cluster may be been previously generated, and may be retrieved in response to selection of a previously generated seed list (or seed). In an embodiment, the analyst may select a particular cluster of interest via the selection box 510.

Further, in the example UI 500 the cluster strategy box 530 displays the cluster strategies 232 that the cluster engine 120 ran against the seed list 210. The cluster engine 120 may execute multiple cluster strategies 232 against the seed list 210, so there may be multiple cluster strategies 232 listed in the cluster strategy box 530. The analyst may click on the name of a given cluster strategy 232 in the cluster strategy box 530 to review the clusters 252 that the cluster strategy 232 generated.

In an embodiment, the workflow engine 125 generates for display in the UI 500 summaries of the clusters 252 in the cluster summary list 525. For example, the summaries may include characteristics of the clusters 252, such as identifiers, scores, and/or analysts assigned to analyze the clusters 252. The workflow engine 125 may select the clusters 252 for display in the cluster summary list 525 according to those or other characteristics. For instance, the workflow engine 125 may display the summaries in the order of the scores of the clusters 252, where a summary of the highest scoring cluster 252 is displayed first.

The workflow engine 125 may control the order and selection of the summaries within the cluster summary list 525 based upon an input from the analyst. The cluster search box 520 may include a search text box coupled to a search button and a pull-down control. The analyst may enter a characteristic of a cluster 252 in the search text box and then instruct the workflow engine 125 to search for and display clusters 252 that include the characteristic by pressing the search button. For example, the analyst may search for clusters with a particular score. The pull-down control may include a list of different characteristics of the clusters 252, such as score, size, assigned analyst, and/or date created. The analyst may select one of the characteristics to instruct the workflow engine 125 to present the summaries of the clusters 252 arranged by that characteristic.

In an embodiment, the workflow engine 125 is also configured to present details of a given cluster 252 within the cluster review window 515. The workflow engine 125 displays the details of the cluster 252, for example, the score, and/or average account balances within a cluster, when the analyst clicks a mouse pointer on the associated summary within the cluster summary list 525. The workflow engine 125 may present details of the cluster 252, such as the name of an analyst assigned to analyze the cluster 252, a score of the cluster 252, and/or statistics or graphs generated from the cluster 252. These details may allow the analyst to determine whether to investigate the cluster 252 further. The cluster review window 515 may also include a button which may be clicked to investigate a cluster 252 within a graph, and an assign button for assigning a cluster to an analyst.

An analyst may click a mouse pointer on an "Investigate in Graph" button representing a cluster to investigate the cluster within an interactive graph. The interactive representation may be a visual graph of the cluster 252, where icons represent the entities of the cluster 252 and lines between the icons represent the links between entities of the cluster 252. For example, the workflow engine 125 may display the interactive graph of the cluster 252 similar to the representation of the cluster 252 in FIG. 3C. The interactive representation may allow the analyst to review the attributes of the related data entities and/or perform queries for additional related data entities.

In an embodiment, an administrative user may click a mouse pointer on an assign button to assign the associated cluster 252 to an analyst. The workflow engine 125 may also allow the administrative user to create tasks associated with the clusters 252, while the administrative user assigns the cluster 252. For example, the administrative user may create a task for searching within the three highest scoring clusters 252 for fraudulent credit card accounts. The workflow engine 125 may display the summaries in the cluster summary list 525 according to the names of the analysts assigned to the clusters 252. Likewise, the workflow engine 125 may only display summaries for the subset of the clusters 252 assigned to an analyst.

The interface shown in FIG. 5 is included to illustrate one exemplary interface useful for navigating and reviewing clusters generated using the cluster engine 120 and the workflow engine 125. In other embodiments, other user interface constructs may be used to allow the analyst to select cluster strategies 232, scoring strategies 242, and/or seed generation strategies, initiate an investigation, and/or review and analyze the clusters 252. For example, the workflow engine 125 may display additional controls within the cluster analysis UI 500 for controlling the cluster generation process and selecting seed generation strategies, cluster strategies 232, and/or scoring strategies 242. Also, the UI 500 may be displayed without the selection box 510 or the options to select a seed generation strategy. In addition, although the workflow engine 125 generates the cluster analysis UI 500, in various embodiments the cluster analysis UI 500 may be generated by a software application distinct from the workflow engine 125. Further, in various embodiments, the cluster review window 515 may be configured to display a preview of the cluster 252 and/or additional statistics generated from the cluster 252. As such, an interactive representation of the cluster 252 may be presented in an additional UI and/or the cluster 252 may be exported to another software application for review by the analyst.

In an alternative embodiment, and as described below in reference to FIGS. 10E, 11E, 12E, and 13E, the cluster analysis user interface may include a list of clusters in a first column, a list of scores associated with a selected cluster in a middle column, and/or details associated with a selected score in a last column. Such an arrangement may advantageously enable an analyst to investigate various scores associated with a cluster. Additionally, clusters in such an interface may advantageously be prioritized according to any of multiple scores and/or metascores.

VIII. Example Operations

Figure 6:
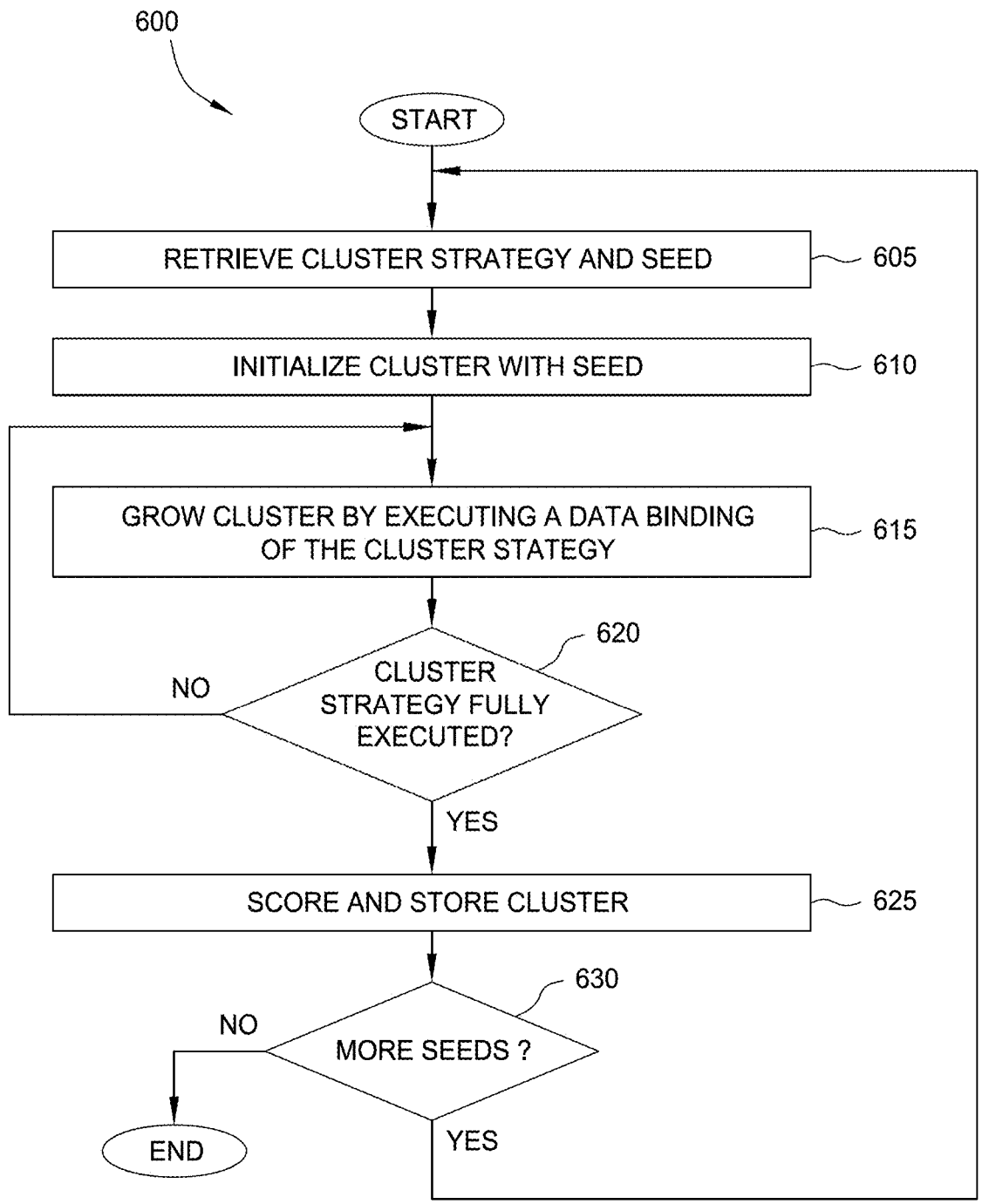
FIG. 6 is a flowchart of an example method of generating clusters, according to an embodiment of the present disclosure.

FIG. 6 is a flowchart of an example method of generating clusters, according to an embodiment. Although the method is described in conjunction with the systems of FIGS. 1 and 2, persons skilled in the art will understand that any system configured to perform the method, in any order, is within the scope of this disclosure. Further, the method 600 may be performed in conjunction with method 700 for scoring a cluster, described below.

As shown, example cluster generation method 600 begins at block 605, where the cluster engine 120 retrieves a cluster strategy (e.g., cluster strategy 232-2) and a seed 212. Once a cluster strategy is selected, the cluster engine 120 may identify a list of seeds from which to build clusters using the selected cluster strategy. At block 610, the cluster engine 120 initializes a cluster 252 with one of the seeds in the list. The cluster 252 may be stored as a graph data structure. The cluster engine 120 may initialize the graph data structure and then add the seed 212-1 to the graph data structure as the first data entity.

At block 615, the cluster engine 120 may grow the cluster 252 by executing the search protocol of a data binding 237 from the cluster strategy 232-2. The cluster strategy 232-2 may include a series of data bindings 237 that the cluster engine 120 executes to retrieve related data entities. A given data binding 237 may include queries to execute against a cluster data source 160 using the seed as an input parameter. For example, if the seed 212-1 is an account number, then the data binding 237 may retrieve the data identifying the owner of the account with the account number. After retrieving this information, the cluster engine 120 may add the customer data entity to the cluster as a related data entity and the account owner attribute as the link between the seed 212-1 and the related data entity. After retrieving the related data entities, the cluster engine 120 may add them to the cluster 252.

At block 620, the cluster engine 120 determines if the cluster strategy 232-2 is fully executed. If not the method 600 returns to block 615 to execute additional data bindings for a given seed. Alternatively, as described above, the cluster engine 120 may grow the cluster by searching for, accessing, and/or filtering various data entities through, for example, a generic interface to various internal and/or external data sources. Further, in an embodiment, the cluster engine 120 may determine whether the cluster being generated is to be merged with another cluster, as described above. Once the cluster strategy is executed for that seed, the cluster engine 120 may determine and assign a score (or multiple scores) to that cluster (relative to a specified scoring strategy). After generating clusters for a group of seeds, such clusters may be ordered or ranked based on the relative scores. Doing so may allow an analyst to rapidly identify and evaluate clusters determined to represent, for example, a high risk of fraud.

At block 625, the cluster engine 120 may store the cluster 252 in cluster list 250. As mentioned above, the cluster list 250 may be a collection of tables within a relational database, where a table may include the seed and related data entities of the cluster 252 and another table may include links between the related data entities of the cluster 252.

At block 630, the cluster engine 120 determines if there are more seeds 212 to analyze in the seed list 210. If so, the method 600 returns to block 605 to generate another cluster from the next seed. Otherwise, the method 600 ends. Note, while method 600 describes a single cluster being generated, one of skill in the art will recognize that multiple instances of the cluster generation process illustrated by method 600 may be performed in parallel.

Figure 7:
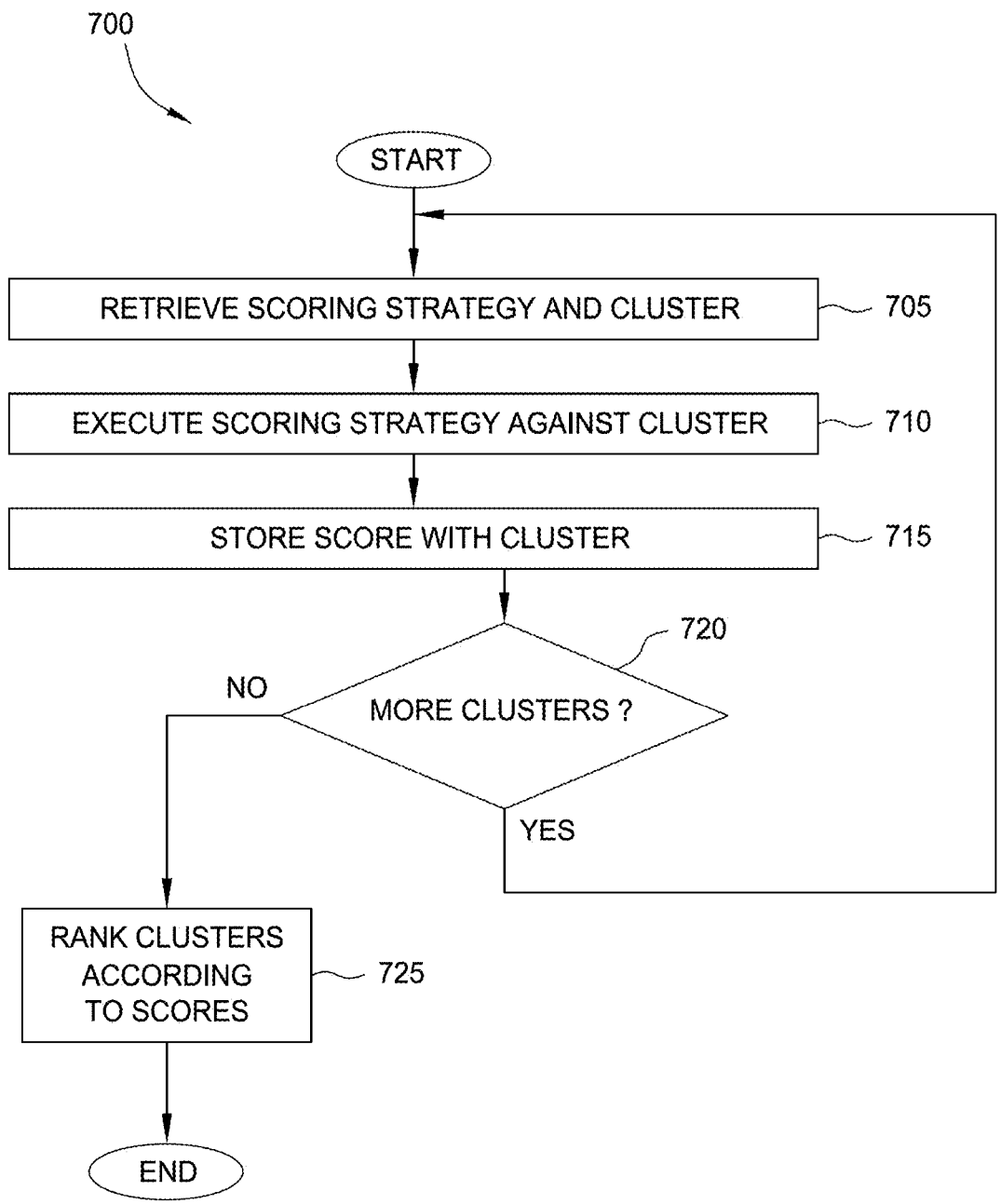
FIG. 7 is a flowchart of an example method of scoring clusters, according to an embodiment of the present disclosure.

FIG. 7 is a flowchart of an example method of scoring clusters, according to an embodiment. Although the method is described in conjunction with the systems of FIGS. 1 and 4, persons skilled in the art will understand that any system configured to perform the method steps, in any order, is within the scope of the present invention.

As shown, the example cluster scoring method 700 begins at block 705, where the cluster engine 120 retrieves a scoring strategy 442 and a cluster 252 (for example, a cluster just created using the method 600 of FIG. 6). In other cases, the cluster engine 120 may retrieve the scoring strategy 442 associated with a stored cluster. Other alternatives include an analyst selecting a scoring strategy 442 through the client 135, the cluster engine 120 via the cluster analysis UI 500, a script, or a configuration file. The cluster engine 120 may retrieve the selected scoring strategy 442 from the scoring strategy store 440, and the cluster 252 from the cluster list 250.

At block 710, the cluster engine 120 executes the scoring strategy 442 against the cluster 252. The scoring strategy 442 may specify characteristics of the related data entities within the cluster 252 to aggregate. The cluster engine 120 may execute the scoring strategy 442 by aggregating the specified characteristics together to determine a score. For instance, the cluster engine 120 may aggregate account balances of related data entities that are account data entities. In such a case, a total amount of dollars (or average dollars or any other aggregated, averaged, or normal attribute of the cluster) included within the balances of the account data entities of the cluster 252 may be the score of the cluster 252.

At block 715, the cluster engine 120 may store the score with the cluster 252 in the cluster list 250. At step 720, the cluster engine 120 determines if there are more clusters 252 to score. For example, in one embodiment, a set of clusters may be re-scored using an updated scoring strategy. In other cases, the cluster engine may score each cluster when it is created from a seed (based on a given cluster generation and corresponding scoring strategy). If more clusters remain to be scored (or re-scored), the method 700 returns to block 705.

At block 725, the cluster engine 120 may rank the clusters 252 according to the scores of the clusters 252. For example, after re-scoring a set of clusters (or after scoring a group of clusters generated from a set of seeds), the cluster engine 125 may rank the clusters 252 from highest score to lowest score. The ranking may be used to order a display of summaries of the clusters 252 presented to the analyst. The analyst may rely upon the ranking and scores to determine which clusters 252 to analyze first. The ranking and sorting may generally be performed on-demand when an analyst is looking for a cluster to investigate. Thus, the ranking need not happen at the same time as scoring. Further, the clusters may be scored (and later ranked) using different raking strategies.

In various embodiments, multiple scores for each cluster may be determined according to methods similar to the example method 700. Accordingly, clusters may be ranked according to any of multiple scores. Additionally, in various embodiments, multiple scores may be combined and/or aggregated into a metascore that may be used to rank the clusters. Various example score and metascore determinations are described below in reference to FIGS. 10C, 11C, 12C, and 13C.

IX. Example Implementation Mechanisms/Systems

Figure 8:
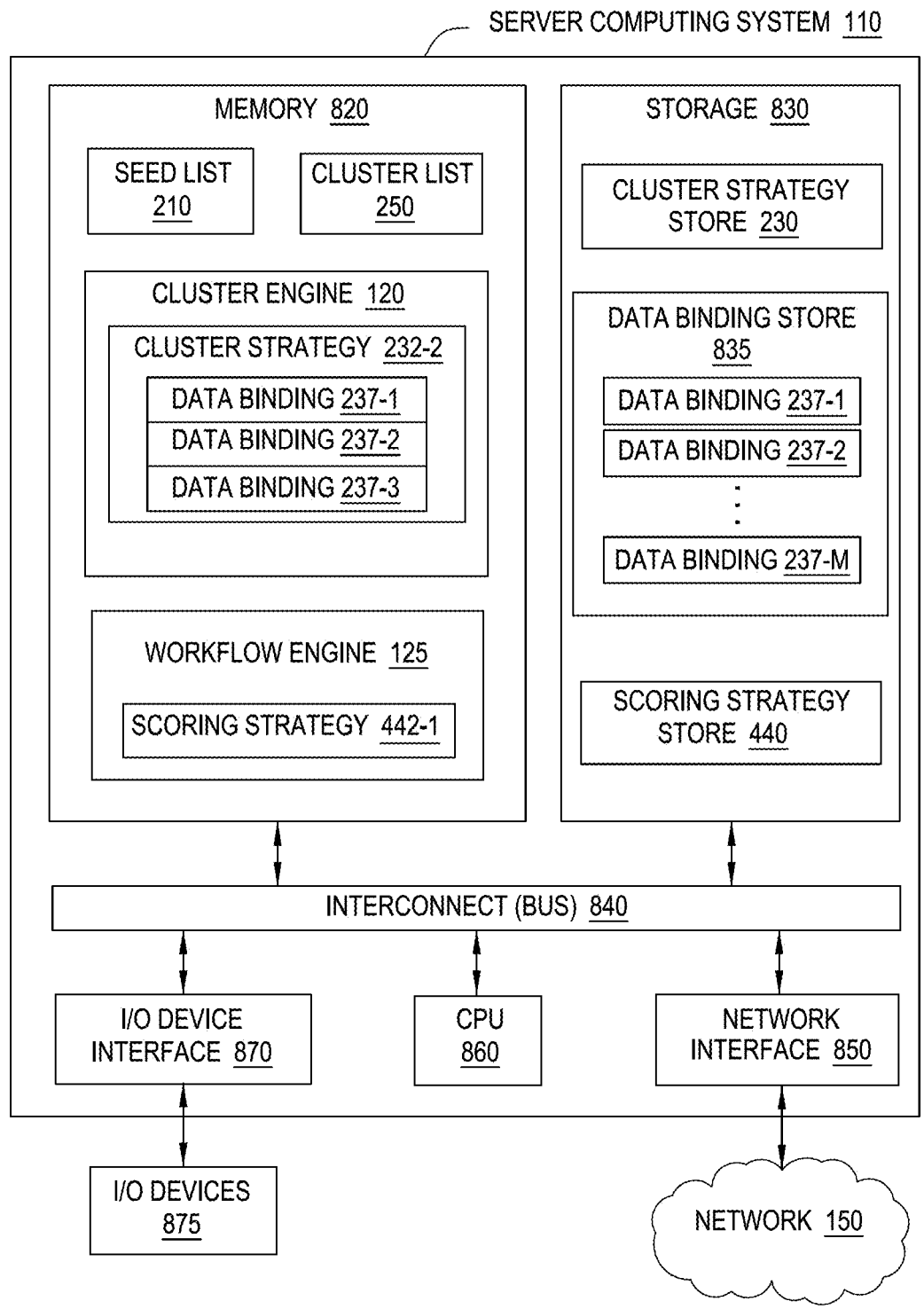
FIG. 8 illustrates components of an illustrative server computing system, according to an embodiment of the present disclosure.

FIG. 8 illustrates components of an illustrative server computing system 110, according to an embodiment. The server computing system 110 may comprise one or more computing devices that may perform a variety of tasks to implement the various operations of the data analysis system. As shown, the server computing system 110 may include, one or more central processing unit (CPU) 860, a network interface 850, a memory 820, and a storage 830, each connected to an interconnect (bus) 840. The server computing system 110 may also include an I/O device interface 870 connecting I/O devices 875 (for example, keyboard, display, mouse, and/or other input/output devices) to the computing system 110. Further, in context of this disclosure, the computing elements shown in server computing system 110 may correspond to a physical computing system (for example, a system in a data center, a computer server, a desktop computer, a laptop computer, and/or the like) and/or may be a virtual computing instance executing within a hosted computing environment.

The CPU 860 may retrieve and execute programming instructions stored in memory 820, as well as store and retrieve application data residing in memory 820. The bus 840 may be used to transmit programming instructions and application data between the CPU 860, I/O device interface 870, storage 830, network interface 850, and memory 820. Note that the CPU 860 is included to be representative of, for example, a single CPU, multiple CPUs, a single CPU having multiple processing cores, a CPU with an associate memory management unit, and the like.

The memory 820 is included to be representative of, for example, a random access memory (RAM), cache and/or other dynamic storage devices for storing information and instructions to be executed by CPU 860. Memory 820 also may be used for storing temporary variables or other intermediate information during execution of instructions to be executed by CPU 860. Such instructions, when stored in storage media accessible to CPU 860, render server computing system 110 into a special-purpose machine that is customized to perform the operations specified in the instructions.

The storage 830 may be a disk drive storage device, a read only memory (ROM), or other static, non-transitory, and/or computer-readable storage device or medium coupled to bus 840 for storing static information and instructions for CPU 860. Although shown as a single unit, the storage 830 may be a combination of fixed and/or removable storage devices, such as fixed disc drives, removable memory cards, and/or optical storage, network attached storage (NAS), and/or a storage area-network (SAN).

Programming instructions, such as the cluster engine 120 and/or the workflow engine 125, may be stored in the memory 820 and/or storage 830 in various software modules. The modules may be stored in a mass storage device (such as storage 830) as executable software codes that are executed by the server computing system 110. These and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

Illustratively, according to an embodiment, the memory 820 stores a seed list 210, a cluster engine 120, a cluster list 250, and a workflow engine 125 (as described with reference to the various figures above). The cluster engine 120 may include a cluster strategy 232-2. The particular cluster strategy 232-2 may include data bindings 237-1, 237-2, and 237-3, with which the cluster engine 120 may access the cluster data source 160. The workflow engine 125 may include a scoring strategy 442-1.

Illustratively, according to an embodiment, the storage 830 includes a cluster strategy store 230, data bindings store 835, and a scoring strategy store 440. As described above, the cluster strategy store 230 may include a collection of different cluster strategies 232, such as cluster strategy 232-2. For example, the cluster strategy store 230 may be a directory that includes the cluster strategies 232-1, 232-2 . . . . 232-N as distinct modules. The scoring strategy store 440 may include a collection of different scoring strategies 442, such as scoring strategy 442-2, and may also be a directory of distinct modules. The data binding store 835 may include data bindings 237-1, 237-2 . . . 237-M, which may also be stored as distinct modules within a directory.

Although shown in memory 820, the seed list 210, cluster engine 120, cluster list 250, and workflow engine 125, may be stored in memory 820, storage 830, and/or split between memory 820 and storage 830. Likewise, copies of the cluster strategy 232-2, data binding 237-1, 237-2, and 237-3, and scoring strategy 442-2 may be stored in memory 820, storage 830, and/or split between memory 820 and storage 830.

The network 150 may be any wired network, wireless network, or combination thereof. In addition, the network 150 may be a personal area network, local area network, wide area network, cable network, satellite network, cellular telephone network, or combination thereof. Protocols and components for communicating via the Internet or any of the other aforementioned types of communication networks are well known to those skilled in the art of computer communications and thus, need not be described in more detail herein.

As described above, in various embodiments the system may be accessible by an analyst (or other operator or user) through a web-based viewer, such as a web browser. In this embodiment, the user interface may be generated by the server computing system 110 and transmitted to the web browser of the analyst.

Alternatively, data necessary for generating the user interface may be provided by the server computing system 110 to the browser, where the user interface may be generated. The analyst/user may then interact with the user interface through the web-browser. In an embodiment, the user interface of the data analysis system may be accessible through a dedicated software application. In an embodiment, the client computing device 130 may be a mobile computing device, and the user interface of the data analysis system may be accessible through such a mobile computing device (for example, a smartphone and/or tablet). In this embodiment, the server computing system 110 may generate and transmit a user interface to the mobile computing device. Alternatively, the mobile computing device may include modules for generating the user interface, and the server computing system 110 may provide user interaction data to the mobile computing device. In an embodiment, the server computing system 110 comprises a mobile computing device. Additionally, in various embodiments any of the components and/or functionality described above with reference to the server computing system 110 (including, for example, memory, storage, CPU, network interface, I/O device interface, and the like), and/or similar or corresponding components and/or functionality, may be included in the client computing device 130.

According to various embodiments, the data analysis system and other methods and techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing devices of the data analysis system may generally be controlled and/or coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

In general, the word "module," as used herein, refers to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware devices (such as processors and CPUs) may be comprised of connected logic units, such as gates and flip-flops, and/or may be comprised of programmable units, such as programmable gate arrays or processors. The modules or computing device functionality described herein are preferably implemented as software modules, but may be represented in hardware devices. Generally, the modules described herein refer to software modules that may be combined with other modules or divided into sub-modules despite their physical organization or storage.

Server computing system 110 may implement various of the techniques and methods described herein using customized hard-wired logic, one or more ASICs or FPGAs, firmware and/or program logic which, in combination with various software modules, causes the server computing system 110 to be a special-purpose machine. According to one embodiment, the techniques herein are performed by server computing system 110 in response to CPU 860 executing one or more sequences of one or more modules and/or instructions contained in memory 820. Such instructions may be read into memory 820 from another storage medium, such as storage 830. Execution of the sequences of instructions contained in memory 820 may cause CPU 840 to perform the processes and methods described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage 830. Volatile media includes dynamic memory, such as memory 820. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 840. Transmission media may also take the form of acoustic or light waves, such as those generated during radio-wave and infra-red data communications.

Various forms of media may be involved in carrying one or more sequences of one or more instructions to CPU 860 for execution. For example, the instructions may initially be carried on a magnetic disk or solid-state drive of a remote computer. The remote computer may load the instructions and/or modules into its dynamic memory and send the instructions over a telephone or cable line using a modem. A modem local to server computing system 820 may receive the data on the telephone/cable line and use a converter device including the appropriate circuitry to place the data on bus 840. Bus 840 carries the data to memory 820, from which CPU 860 retrieves and executes the instructions. The instructions received by memory 820 may optionally be stored on storage 830 either before or after execution by CPU 860.

X. Automatic Detection of Possible Financial Malfeasance, Collection of Related Data into a Review Collection, and Display and Review of Same While financial fraud using credit card accounts is used as a primary reference example in the discussion above, the techniques described herein may be adapted for use with a variety of data sets and in various applications. For example, the detection of possible financial malfeasance (e.g., collusion between traders, insider trading, dissemination of customer or confidential material, or other fraud, misrepresentation, or inappropriate, deceptive, or unacceptable conduct that a financial firm, such as a bank, brokerage, investment bank, etc. may want to be aware of). For example, a financial institution may want to narrow down, from the daily gigabytes of data that they collect, the trades, email messages, and/or chat messages to review that have the highest chance of containing indications of financial malfeasance by its employees.

In such a case, a seed may be a suspect trade, a suspect email message or thread of email messages, a suspect chat message or chat message thread, and the like, that can automatically be generated, selected and/or detected by the data analysis system based on an initial financial risk identification strategy. From the seeds, related traders, trades, email messages and chat messages, as well as other server and database logs may be used to create clusters of activity related to the suspicions seeds. Further information is available on various embodiments to detect financial malfeasance, such as those illustrated in FIGS. 9-16.

Figure 9:
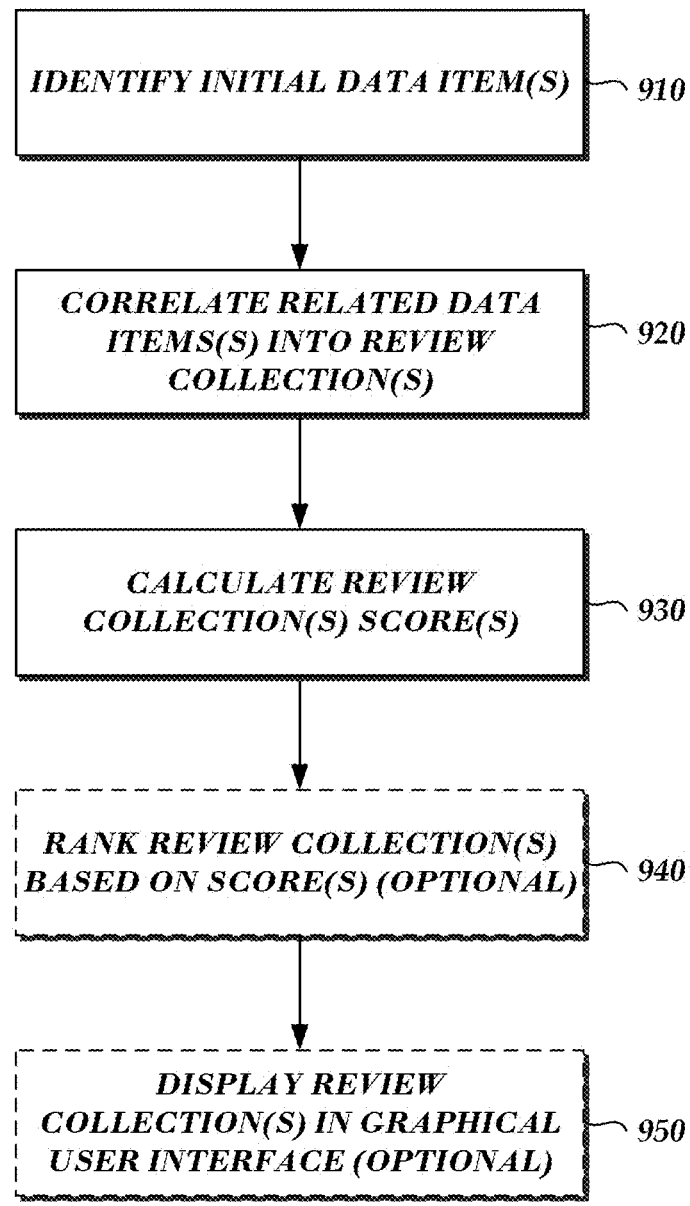
FIG. 9 is a flowchart of an example generalized method of the data analysis system, according to various embodiments of the present disclosure.

FIG. 9 depicts one method or process of determining a financial institution's risk to fraud, insider trading, or other abnormal business risk associated with trading or detecting business risk in the financial industry. The method or process shown in FIG. 9 correlates to the seed identification, cluster generation, and scoring methods described herein. For example, the blocks of FIG. 9, such as identify initial data items 910, may be performed by automatically identifying a seed, as described herein. Alternatively, a seed need not be identified as a "seed" per se. Instead, a more specific financial data approach may be used that only analyzes trades, email messages, chat messages, and/or other electronic communications and does not refer to these communications or objects as seeds (e.g., finding suspect email messages, trades, or chat messages using the strategies described herein). No matter the case, FIG. 9 describes the processes a computer program may take to identify trades and documents that are the most likely to indicate certain financial risks created by a financial firm's employees (or other personnel involved in the financial industry).

Financial institutions may wish to prevent fraud or insider trading or other financial risks associated with being a broker or handling confidential information. These financial institutions may wish to review their internal communication, such as chat messages and email messages, in order to identify where this type of fraud may occur. Unfortunately, many of these financial institutions may generate huge vast data stores of information to look through in order to detect financial malfeasance. For example, a large brokerage firm may generate in excess of 40 GB of email per day to analyze. A human attempting to analyze 40 GB per day of information will have little success, and likely could not even review one hundredth of the email generated in a day. Thus, computer implemented strategies can be used in order to identify those trades, chat messages, or email messages, or other data items, that are most likely to contain financial malfeasance, and therefore should be highlighted for review by an analyst or investigator.

In block 910, the system may identify initial data items that may be suspect based on an identification strategy (see discussion of FIGS. 11-16 for example embodiments of identification strategies for initial data items). For example, a trade database may contain transactions for certain financial instruments (e.g., stock trades, each having associated stock ticker symbols for the stock traded). These financial instruments may have detectable abnormalities that, by themselves, do not invalidate the trade, but do make them a suspect trade (more information and embodiments concerning suspect trades can be found under discussion of FIG. 16).

No matter how the initial data item in block 910 is identified, in most cases a seed, email, chat message or trade may be identified as possibly suspect. This identification process may be performed by executing the initial financial risk indication strategies disclosed herein.

In block 920, based on the data items found during identification of the initial data items, data item properties may be used to find information related to the initial data items. For example, if a trade could be considered a suspect trade and identified based on the initial financial risk identification strategies, then any other trade that contains similar information (such as a trade having the same stock ticker symbol, a trade performed on the same stock by other brokers or customers related to the trader, or any chat messages or email messages sent or received by the trader around the time period of the trade) may be considered related data, and may be added to the review collection.

As described herein, data related to the initial data item may be found by accessing a data binding for search of a remote or local database based on linking information, such as a trader identity property of a trade, or the stock ticker symbol property of a trade. The search results may then be correlated into a review collection. The review collection may be a set of data items: e.g., documents such as the initial trade and email/chat messages for an analyst or investigator to review further in order to determine if any fraudulent or financial malfeasance is occurring.

The review collections may also be collected on more sophisticated review data collection strategies. A system may have more than one review data collection strategies that are associated with a particular type of seed and/or type of initial financial risk identification strategy used to generate the seed. For example, one particular review collection strategy may be to find related side conversations, as disclosed herein, which may identify all communications between two traders who are having the side conversation regarding a suspect trade, and to add those to the review collection.

As a separate example, there may be a different seed where the seed is based on an initial strategy type that finds confidential information sent to an email address outside of the financial institution. The review collection strategy for this different type of generated seed may collect all emails and chat messages with the external entity to whom the confidential information was sent. Thus, there may be different ways of compiling the related information together into a review collection based on different strategies (including one or more strategies being used for each individual review collection) that may be associated with how the initial data items were identified.

The review collections themselves may consist of a number of documents, trades, emails, chat messages or any other electronic data information that could be related to the initially identified data items identified by the initial financial risk strategies. For example, they could also be stock shares, mutual fund shares, trader phone calls (or phone call metadata), contracts, deeds of trust, tax information, mortgage information, information about mutual funds, or any other data item that could be related to the initial identified information and accessible via a data binding or searchable in a database.

In block 930, once a review collection has been put together, scoring criteria may be used to score that review collection (e.g., assign a value to the review collection for ranking). In some embodiments, the scoring criteria used, (e.g., a "scoring strategy"), may score the review collection differently based upon the type of initial financial risk strategy used to generate the seed. For example, one scoring criteria may simply score a review collection based on the volume of trades made by a specific trader on a specific traded instrument that was initially identified in the initial financial risk identification strategy.

As another example, a scoring strategy may, based on the type of financial risk identification strategy used to generate the initial data item (such as detecting confidential information), score the review collection based on how many email messages were sent to an entity not related with the trader's financial institution. For example, if a review collection had five email messages from a trader to entities that are not affiliated with the trader's financial institution, then in that case, the scoring strategy may indicate that each matching email message in the review collection is given a score of 1, and that the score for the whole review collection may be the sum of all scores (5 in this example).

After a review collection has been scored by the data analysis system, then the review collection may be ranked based on comparing the review collections score to other review collections. For example, all of the review collections generated for a given day can be sorted and displayed in a user interface in a specific order so that the review collections with the highest score appear at the top of a list, and the review collections with the lowest score would be at the bottom. This helps to alleviate the analyst's job by having the review take place in a graphical user interface that displays or allows selection of each review collection in the order sorted by rank so that the review collections with the highest risk may be reviewed first by the analyst. This also allows the investigator or analyst to decide not to investigate further review collections falling beneath a threshold score, either based on settings within a computer client the analysts are using to investigate, or based on their own determination of when to stop reviewing review collections (e.g., the analyst decides not to review collections past the third page of the ranked review collections).

In block 950, these ranked review collections may be displayed in a graphical user interface for selection by an investigator or analyst. Not all of the scored review collections need appear on the screen at once. Instead a subset may appear on the screen where an analyst or investigator could possibly browse to further subsets a review collection with lower scores (e.g., the next page of review collections, or scroll down to additional review collections using a slider, etc.).

In some embodiments, a single initial data item may have multiple review collections associated with it. In such an embodiment, an initial data item may be associated with multiple review collections scores. As described herein, a metascore may be used to calculate a single score over multiple related review collections having the same initial data item. For example, an average score could be calculated for all of the review collections associated with the same seeds/initial data item(s). In this way, an analyst or investigator could, through the use of the graphical user interface, get a sense of all the review collections available under an initial data item and the weight of those review collection scores in summary form. This may assist the analyst to quickly make a determination about whether to investigate the review collections associated with those data items without investigating each review collection associated with that data item.

Figure 10A:
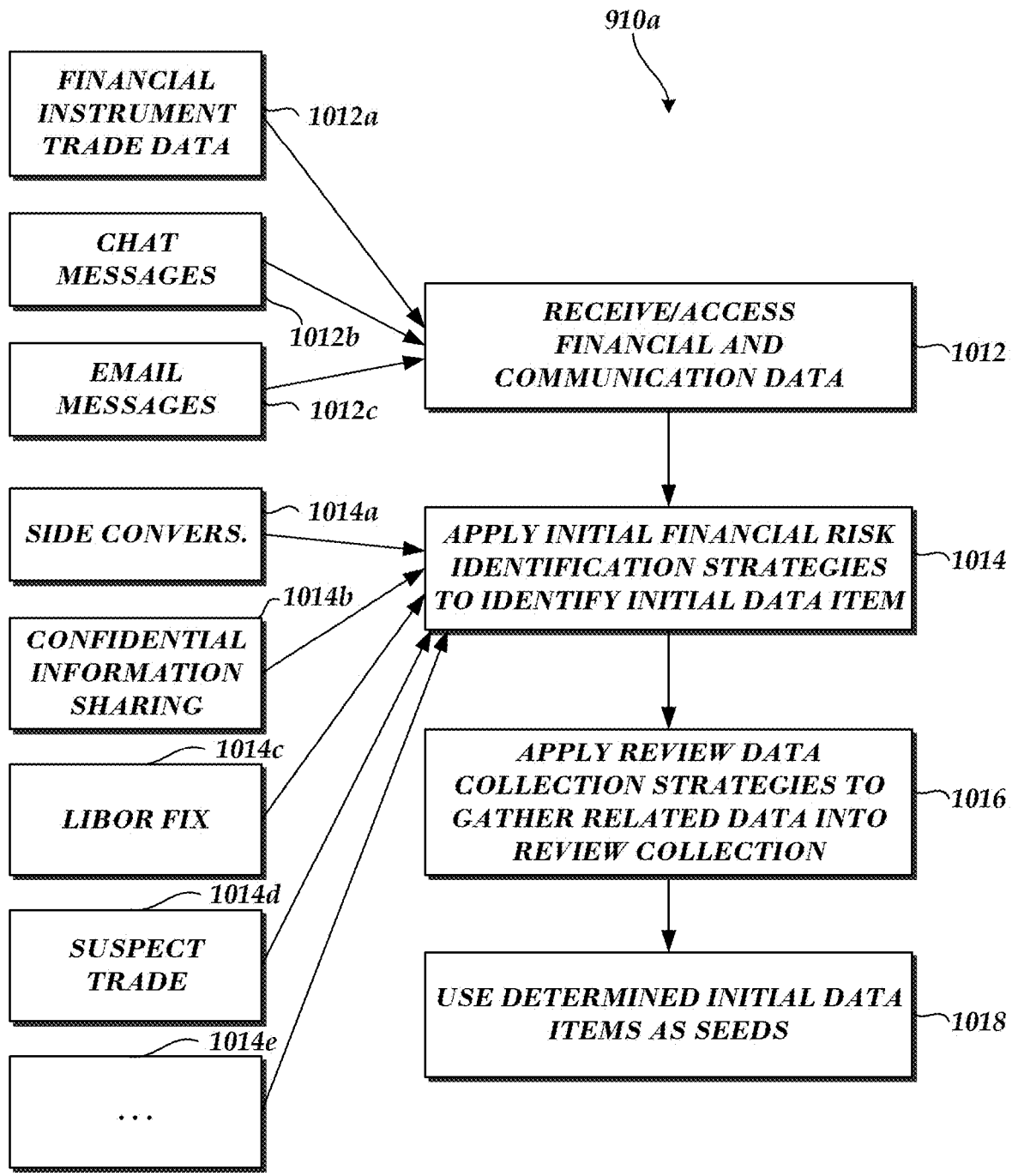
FIG. 10A is a flowchart of an example automatic seed generation method of the data analysis system as applied to financial malfeasance detection, according to various embodiments of the present disclosure.

FIG. 10A illustrates an example of how the various initial financial risk identification strategies may be used to identify an initial data item or seed as a start of a review collection.

For example, in block 1012, the data analysis system may access financial and communication databases (e.g., usually trades, chat messages, and email messages for a particular financial institution) that are to be searched based on the strategies described herein. For example, financial instrument trade data 1012A may include a database having trades on a particular exchange, for example, the New York Stock Exchange, NASDAQ, etc., any mutual fund trades, any mortgage trades, or any information about transactions for a tradable financial instrument.

Another set of data that may be used by the data analysis system in order to determine financial malfeasance may include one or more databases of chat messages 1012B or email messages 1012C. For example, in some embodiments, these databases may contain the emails and chat messages for employees of major financial institutions such as Lehman Brothers, Citi Bank or Goldman Sachs. Each of these financial institutions may have employees who trade in financial instruments ("traders"), and these traders may have access to email messages at work and have email accounts at their firm.

Also, in some situations, these traders may have the capability to chat either within the firm or with clients/customers or with others in the financial industry. Both the email messages and the chat messages may be correlated by user name, for example, a trader may have a user name that is linked in an employee directory at their work. The directory may be an SQL database, or an LDAP directory (or any other type of database with user information mappings), that can be used to create a mapping of the trader's chat user name to their email address, or any other information (such as a trader's personal identification information (full name, social security number, age, address, phone number, etc.)) or any other information linked to an identifier of the trader/employee. In addition, a trader may have one or more trading accounts that may be used to perform trades, and these accounts may be linked to trades performed by that trader.

For example, a specific trade in the financial instruction trade database 1012A, may have as associated metadata the trader who participated in that trade. This may involve more than one trader, for example, a selling trader and a buying trader. This type of metadata can then be used to determine the employee who made the trade, and to link other affiliated information of that employee (e.g., emails sent/received, chat messages sent/received, etc.).

Similarly, chat message information may have similar metadata, for example, the name of the chat room, the times a particular chat message was posted to an associated chat room, the sender of the chat message, the receivers of the chat message, the times that a particular sender or receiver entered or left a chat room, etc.

The chat messages in a chat room can be represented in a database as individual chat messages, for example, a message going from a sender to many receivers as a part of a chat room. In some embodiments, a chat message can be represented in the database as part of a series of chats messages (e.g., a chat thread or room discussion) where the data object is a chat room containing multiple chats and events happening to that chat room, such as chat personas entering or leaving the chat room or a message being sent. This type of data structure may contain who the receivers of each message are based on a list of chartroom members at the time. No matter how chat messages are digitally represented, one or more chat messages may be accessible by the system.

Email messages, like chat messages, may be sent from a sender to multiple receivers. The addresses of the multiple receivers may be written in the headers of the email message along with the sender. Email messages, like chat messages, may be associated with certain users at the financial institution or certain users who are outside the financial institution. For example, email messages may have a domain component such as JohnDoe@google.com, where google.com is the domain component. This domain component may signify some association with Google, and this type of metadata for an email address may be used by a strategy to determine if a particular email address corresponds to a user at Google. In other examples, Acme Bank may be a domain, for example, acmebank.com, that may indicate an association of a person having an email address at acmebank.com as an employee with Acme Bank.

In some embodiments, if a user has an email address that is at gmail.com, then it can be assumed that that user's email address is not associated with Acme Bank. These distinctions, based on the domain, can have an effect when analyzing and determining the initial strategies. For example, as will be discussed, the disclosure of confidential information is a serious risk that financial institutions face. To detect disclosure of confidential information, a message being sent to an email address that is not affiliated with the financial institution sending the information may be a flag detectable by a strategy designed to protect confidential information.

Thus, in block 1012 the system may have access to and the ability to search and query, for example, using data bindings as described above, a financial institution's financial instrument trade data 1012A, chat messages 1012B, and email messages 1012C, as representative examples.

In block 1014, the system may have access to and be configured to execute various financial risk identification strategies that when applied, identify initial data items. For example, block 1014 applies initial financial risk identification strategies to identify one or more initial data items. These initial data items may be used as a seed to prepare review collections (e.g., clusters as described herein).

A data analysis system may have multiple strategies available to automatically find initial data items. For example, side conversation strategy 1014a comprises an initial financial risk identification strategy to detect side conversations, a confidential information sharing strategy 1014b comprises an initial financial risk identification strategy to detect possible confidential information sharing, a LIBOR (London Interbank Offered Rate) fix strategy 1014c comprises an initial final risk identification strategy to detect possible malfeasance related to LIBOR announcements, and a suspect trade strategy 1014d comprises an initial financial risk identification strategy to detect trades that may be indicative of malfeasance. This list is not exhaustive, but the list shows that various strategies (e.g. rule(s) or filter(s) or combination thereof) may be used on the trade, email message, and chat message information to determine initial data items via the initial financial risk identification strategies.

In block 1016, once the initial data items are gathered as described above, the review data collection strategies may be executed in order to gather related data based on the initial data items. Data bindings may be used to find email messages and chat messages based, for example, on the initial data item's properties. For example, for a suspect trade initial data item, a search for email messages may return a set of email messages that reference a user or trader of the suspect trade.

In other embodiments, a time stamp may be used as part of the query parameters to determine the related data for the review collection. For example, not all email messages for a trader may be useful for review. Instead, only those email messages and chat messages that were sent or received by the trader during or in a configurable time period near to the trade may be useful for adding to the review collection. Thus, a time-based parameter may be useful for narrowing down the amount of data to be entered into the review collection.

In block 1018, this process may reoccur many times, for example, a chat message or email message that was added to the review collection may then be treated as a seed for a new review collection to be created. For example, if a suspect trade indicated an email message that was related, that email message may now then be treated as an initial data item or seed for the process to begin again for another review collection or to add to the current review collection. Thus, an email message related to a suspect trade may itself give lead to finding other trades that may be pertinent for review in their own review collection (or as additional added objects to the current review collection). Any newly identified trades can again be treated as a seed or initial data item for this process to repeat.

Figure 10B:
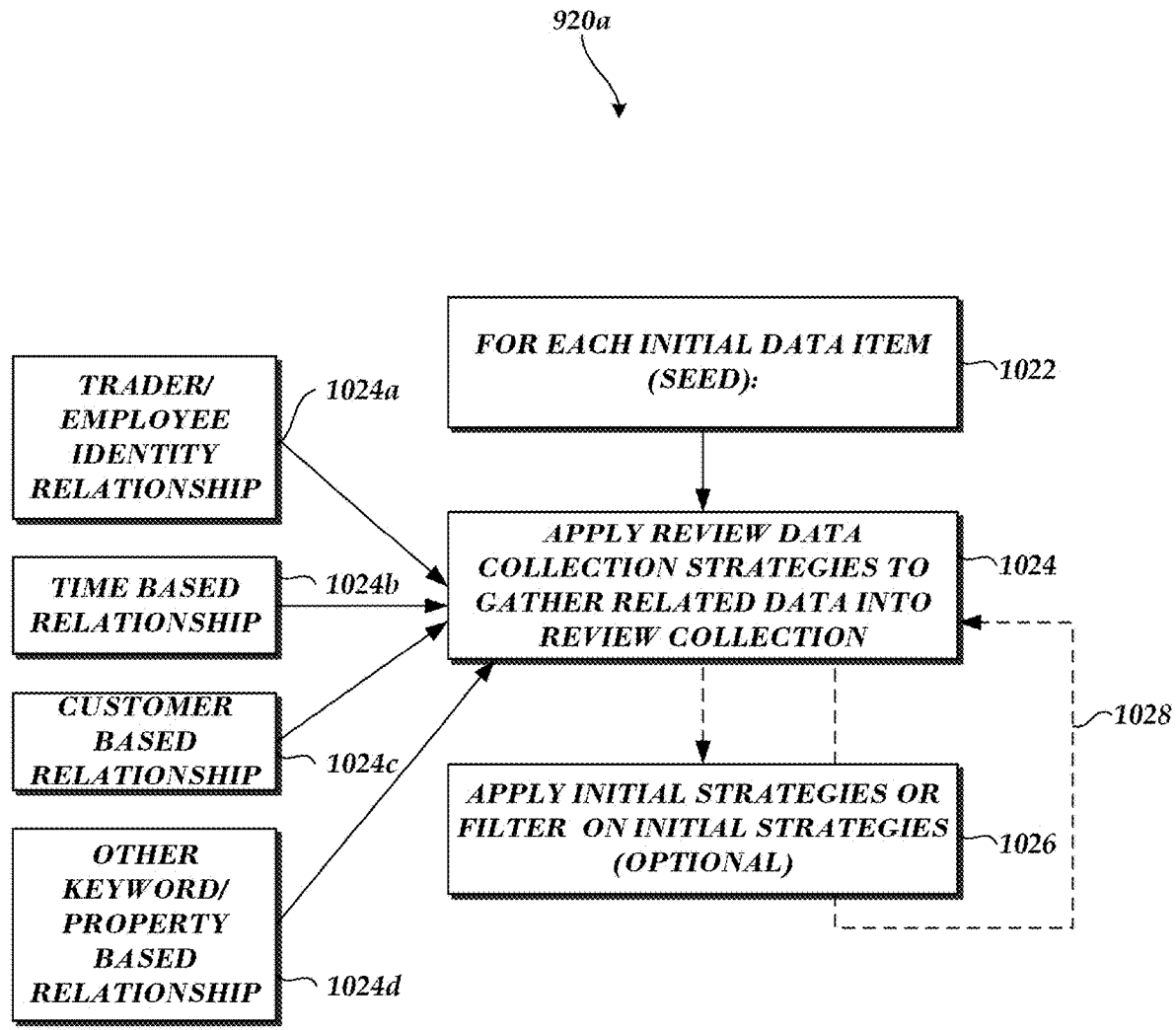
FIG. 10B is a flowchart of an example of a clustering method of the data analysis system as applied to financial malfeasance detection, according to various embodiments of the present disclosure.

FIG. 10B illustrates in more detail a sample process a data analysis system may perform for determining items to include in a review collection. In some embodiments, the review collection process may be run for each identified initial data item (e.g., for each suspect trade identified, each email identified, etc.).

In block 1022, once you have a suspect trade (or other data item), you may apply the review data collection strategies that apply to that type of data item (or that apply based on how the seed was generated) to gather related data into the review collection or multiple review collections. For example, one review collection strategy may be to find a trader/employee identity relationship 1024a between the suspect trade and one or more chat or email messages (e.g., based on a mapping of identifiers such as the ID of the trader making the trade and the sender email address of a trader sending an email message, there may be a match between an email message and a trade). Each strategy can be used alone or in combination with other strategies.

Another review collection strategy may search for related data using a time-based relationship 1024b to determine the data items to include in the review collection. For example, a trade could be executed at 3 o'clock Eastern time on January 27th. The system in block 1024 could search using the data bindings for related email messages or chat messages from the trader that occurred around 3 p.m. Eastern time on January 27th (thus, this is an example of using both a time-based relationship 1024b and a Trader/Employee identity relationship 1024a, but these strategies need not always be used together). By using a time-based strategy in addition to an employee or trader ID based strategy, the amount of emails that are associated in the review collection with the trader may be reduced, while increasing the chances the emails within the review collection relate to the trade because the emails are within a set time period of the trade.

In some embodiments, trades, email messages, and chat message databases may also be searched on other factors, such as whether an email is related to a particular customer 1024c, where the customer stock has been traded. For example, if a trader traded in the Google stock at 10:34 a.m. and on the same day the trader, not at 10:34 a.m. but say 5 p.m. in the afternoon, emailed a person at Google, then the email to the person at Google, although not at exactly the same time, may still be selected to be put into the review collection because it was from a customer of the trader and may indicate a possible leak of confidential information centered around the customer. In some embodiments, an email may be selected based on a mapping of a trader's customers. For example, if a trader's trade is identified as a suspect trade, then emails to all of that trader's customer's around the same time period as the trade may be selected to include in a review collection.

In another example, if the person that the trader knew at Google was a customer or Google itself was a customer (e.g., say Google was using the financial institution as an investment bank to gather investment for joint ventures), then trading on the Google stock after receiving information from Google may be an indicator of financial malfeasance (e.g., insider trading).

Other criteria 1024d may also be used (alone or in combination with other review collection strategies) to add related information to the review collection, such as a key word search in a trader's email or chat messages for messages that are related to a trade. For example, a review collection strategy, based on a seed indicating a possible disclosure of confidential information, could search around the time period when the confidential information was sent, for other emails of the sender that use the term "confidential".

It must be noted that the strategies/relationships identified in 1024a, 1024b, 1024c, and 1024d are not exhaustive. In some embodiments, initial strategies 1026 such as those discussed under FIGS. 11-16, may also be used to add data to a review collection. The initial strategies may be applied as a stand-alone review collection strategy, or in combination with other review collection strategies (e.g., side conversations occurring at 5 p.m.).

In some embodiments, multiple review collections may be created and/or multiple review collection strategies may be used to create a single review collection. For example, line 1028 indicates that the process may repeat, and a review collection could be added to multiple times by applying multiple review collection strategies to broaden the review collection.

In some embodiments, additional review collection strategies may be used to filter/reduce the review collection. For example, once other related email messages and chat messages that are related to a suspect trader are identified to add to a review collection, each email message or chat message in the review collection may be looked at to see whether any of the indicia of an initial strategies are present. For example, each email message may be analyzed to determine whether a side conversation has taken place. If so, that email message may then be identified as a new seed and a further review collection may be compiled based on that initial seed. Alternatively, that email message may be kept in the review collection while others are filtered out of the review collection.

In some embodiments, data items added to a review collection may be in turn used as new seeds to identify additional review collections based on that seed following the process described in FIG. 10B.

Figure 10C:
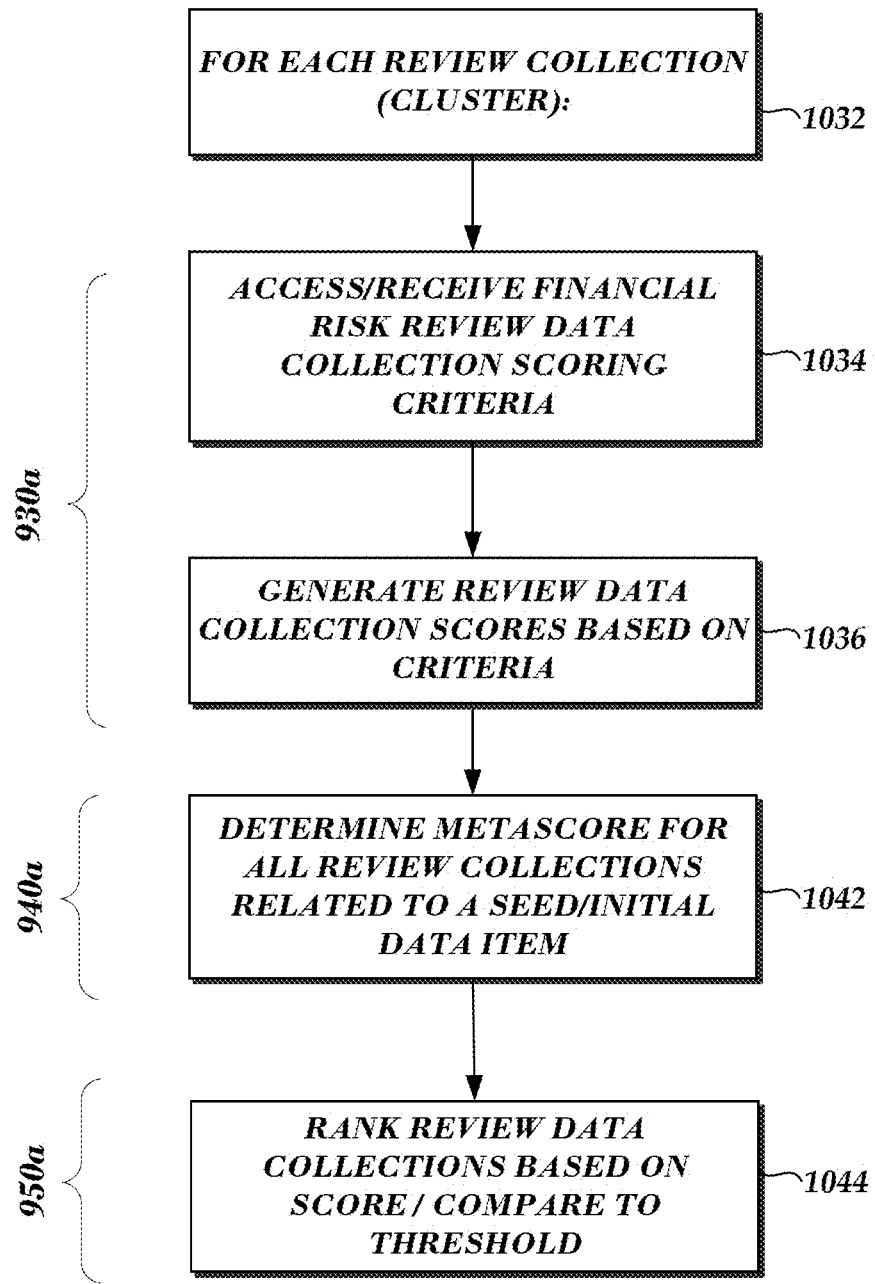
FIG. 10C is a flowchart of example cluster scoring methods of the data analysis system as applied to financial malfeasance detection, according to various embodiments of the present disclosure.

FIG. 10C illustrates an example or process a data analysis system may take to score and rank each cluster or set of clusters. For example, in block 1032 each cluster or review collection may be scored based on one or more scoring strategies containing scoring rules/criteria. In block 1034, the computer system may access a scoring criteria to apply based on the type of seed associated with the review collection in some embodiments. For example, if the review collection is based on the identification of a suspect trade, then the scoring criteria may score the review collection based on how many mentions of the suspect trade have been sent to users outside of a financial institution. Such a score may be determined by analyzing the review collection for emails and chat messages that were sent from inside the financial institution to outside the financial institution (e.g., by looking at the domain names of recipients of email messages or chat messages). If each of these emails counted as 1 point and they were summed, then if you had 10 such emails and 10 such chat messages, a review collection would get a score of 20. This is but one example of a possible scoring scheme.

In some embodiments, the selection of scoring criteria may be done based on the type of initial financial risk identification strategy that was used to select the seed (e.g., a side conversation strategy, a LIBOR fix detection strategy, etc.), or based on the type of data item selected as the seed (e.g., email, trade, chat message). In some embodiments, the scoring criteria may be selected by an administrator, or be based on feedback received from analysts looking at the review collections.

In some embodiments, a scoring strategy may score a review collection using one or more factors, such as volume. For example, a scoring strategy may allocate score to a review collection based on the number of data items in the review collection (e.g., 1 point for each item, etc., or different weighted values for each type of item). A scoring strategy may also allocate score based on the amount of trades and/or communications, or frequency of trades/communications within the review collection. For example, if ten trades are included in a review collection, the scoring strategy may allocate each trade a score equal to the volume of the financial instrument in each trade (e.g., if a trade traded 50 shares, the scoring strategy may allocate 50 points, or a point value scaled to the amount of money a trade was worth).

Other examples of scoring strategies may not depend on the volume of items in the review collection, but instead may depend on the quality of the data in the review collection. For example, a review collection may be scored based on the number of mentions within a certain email in the review collection, for example, the email with the highest number of mentions of the term "confidential." This could be determined based on the number of times the key term "confidential" is mentioned within an email. Another possible scoring criteria could be the amount of interconnectedness of the data within a review collection. For example, if there is a suspect trade, and the buyer trader and seller trader are also mentioned within an email, or appear as senders or receivers of an email within the review collection, that review collection may be scored higher than a review collection where both the buyer and seller of a suspect trade were not mentioned in the same email. An additional possible scoring criteria might allocate more points to a trade or communication based on their position within a financial organization. For example, if an email was sent by a senior VP, that email might contribute a larger score to the review collection than an email sent by a junior analyst.

After accessing the scoring criteria, the system may generate review data collection scores for each review data collection based on the appropriately selected scoring criteria. Once these scores have been generated, the scores for review collections may be ranked or sorted in block 1042 based on a score or may be compared to a threshold in order to eliminate review collections that do not meet the threshold score.

For example, analysts may not be able to review all review collections based on identified initial data items. Thus, the system may make a decision based on a configurable threshold value to eliminate certain review collections from review because the review collections scored below the threshold.

Alternatively, or in combination, the review collections can be ordered from high score to lowest, thus allowing the analyst or investigator to review from top to bottom the review collections considered most pertinent by the system and the analyst may make his own determination on when to stop analyzing based on the score values.

In block 1042, metascores may optionally be generated. A metascore of a plurality of related review collections may be applied to all the review collections that are related to a given seed or contain the same data item (such as a trade, an email message or chat message) within all the review collections. The metascore may represent the overall score (e.g., an average score or some other aggregated score) for related review collections that may be helpful for an analyst or investigator. For example, if multiple review collections were based on a single suspect trade, but each review collection contained different information because each was generated using a different review collection strategy, then the average score could be used as the metascore for all review data collections related to the suspect trade. The use of an average is but one example to calculate the metascore over all the scores of each review collection. The metascore could also be a weighted average based on the volume or amount of data in a review collection, or it may be based on indicators of quality within each review collection. For example, one indicator of quality may be whether any email messages or chat messages within a review collection indicate certain forbidden terms such as "insider trading".

Figure 10D:
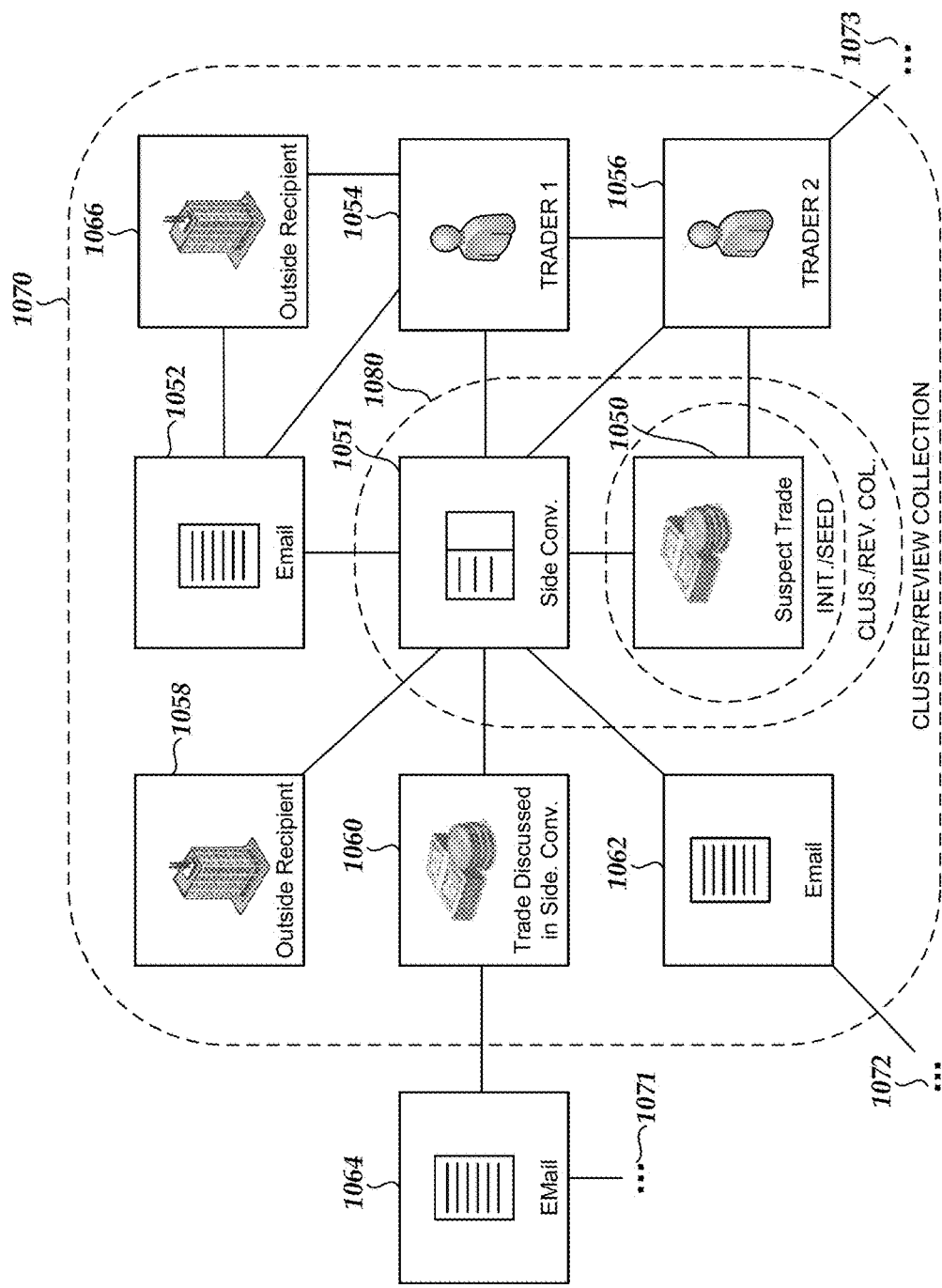
FIG. 10D illustrates an example growth of a cluster of related data entities in a financial malfeasance detection application, according to an embodiment of the present disclosure.

FIG. 10D illustrates one or more review collections that were generated off of an initial data item that can act as a seed. The data items in the review collection each relate to one another based on properties of each data item, and the data analysis system can find related data items based on the review collection strategies selected for execution. The review collection strategies can use data bindings to search/query the other database based on related properties. To start the review collection, the data analysis system may determine an initial seed as suspect trade 1050.

For example, as described above, a trade of a stock or other asset as part of the metadata may have information that indicates it is a suspect trade. In this example, the suspect trade could be an after-hours trade or a trade made internal to a financial institution. Once the suspect trade is identified based on a suspect trade initial financial risk identification strategy, the suspect trade may be used as a seed to generate review collection.

For example, the first review collection strategy (e.g., which may be selected automatically based upon the seed involved) may be to collect side conversations that correspond to the suspect trade. The system may determine the timeframe that the suspect trade occurred, and by calculating a time window around the suspect trade, query/search for email messages and/or chat messages for the trader associated with the suspect trade within the time window. The search results may return a side conversation (or multiple side conversations) within the time period by the trader and one or more other traders may be determined and added to the review collection.

For example, in FIG. 10D, side conversation 1051 may be in the cluster or review collection. Once this initial review collection 1080 is identified, side conversation 1051 may be used as an additional seed to further expand the review collection or create a new review collection. For example, the outside dotted line 1070 indicates an expanded review collection or additional review collection. In the example in FIG. 10D, the side conversation 1051 is related to many other data objects, including trader 1, who is a member of the side conversation as indicated in block 1054, as well as trader 2 who is also a member of the side conversation as indicated in block 1056.

Email 1052, which may have been sent by Trader 1 during or around the time of the side conversation may also be added to the collection. As shown, an outside recipient of email 1052 was also added to the review collection as indicated by block 1058. Also shown is a trade detected by the data analysis system executing a particular review collection strategy as discussed within the side conversation 1051 in the chat or email text as indicated in block 1060 (e.g., detected by keyword search). Also depicted is an additional email that may have matched the same key terms and have occurred during the same time period as the side conversation as indicated in block 1062.

In a further example, the review collection 1070 in FIG. 10D may be expanded even more by the data analysis system. For example, block 1066 may be detected as an outside recipient to whom trader 1 at block 1054 sent email 1052 around the same time period as side conversation 1051. However, as depicted by FIG. 10D, the data analysis system may limit the number of items in a review collection based on a configurable limit, or limit expanding the review collection to a certain number of iterations.

As another example, email 1064 may be added on as an additional part of the review collection based on discussions of trade 1060 within email 1064. In this manner, by applying review collection strategies, such as by linking by trader or by time or by finding additional related side conversations, etc., the review collection may be expanded or additional review collections can be created. Once a review collection is created or expanded and finalized, the review collection can be scored.

FIG. 10E is an example user interface that may be used by an analyst or investigator, as displayed on a display screen, to select and investigate review collections. In this example, on the left side of FIG. 10E multiple review collections may appear. The review collection entitled "Malfeasance risk 1" as shown in selectable area 1082 may have an associated score of 0.9. The review collections Malfeasance Risk 1, Malfeasance Risk 2, and Malfeasance Risk 3, may be sorted according to their score, each of which is a review collection that may be selected. In sample FIG. 10E, Malfeasance risk 1, in block 1082, has been selected. In column 1084, the data items making up that review collection may be fully or partially displayed within the user interface. For example, block 1090 displays an email thread from trader 1. The contents of the email thread may be selected and displayed in another user interface pane, for example, in user interface portion 1086 of the display screen.

This portion of the display screen 1086 may display a specific score for that email thread, for example here shown 0.6, the senders and receivers of the email, the subject of the email, and the subject. For example, email thread 1 from trader 1 shows an email from trader 1 to a Google employee thanking that Google employee for a gift and also discussing a new product to be launched at Google.

This email may have been detected based on, for example, a suspect trade of google stock by trader 1 and doing a search near the time period of the suspect trade for all emails from trader 1 and, in some embodiments, contain the keyword GOOG, Google, or have senders/recipients from the Google domain in the email. Thus, this email could be reviewed by an analyst who may make a determination on whether the information in the email should be acted on.

At this point, the analyst or investigator can take any action based on the collections. For example, the analyst could flag, either through an outside system or through the user interface displaying the review collection, as being important and possibly containing fraud. Such a flag may indicate to a supervisor or manager to further review the item.

As can be seen, multiple different types of user interfaces may be created that allow for the selection and analysis of the individual elements inside a review collection, and to rank those review collections by score and in some embodiments rank the data items with the review collection also by score. In some embodiments, a metascore may be displayed that may represent an average or some other calculation performed over related review collections.

XI. Side Conversation Strategies

Figure 11:
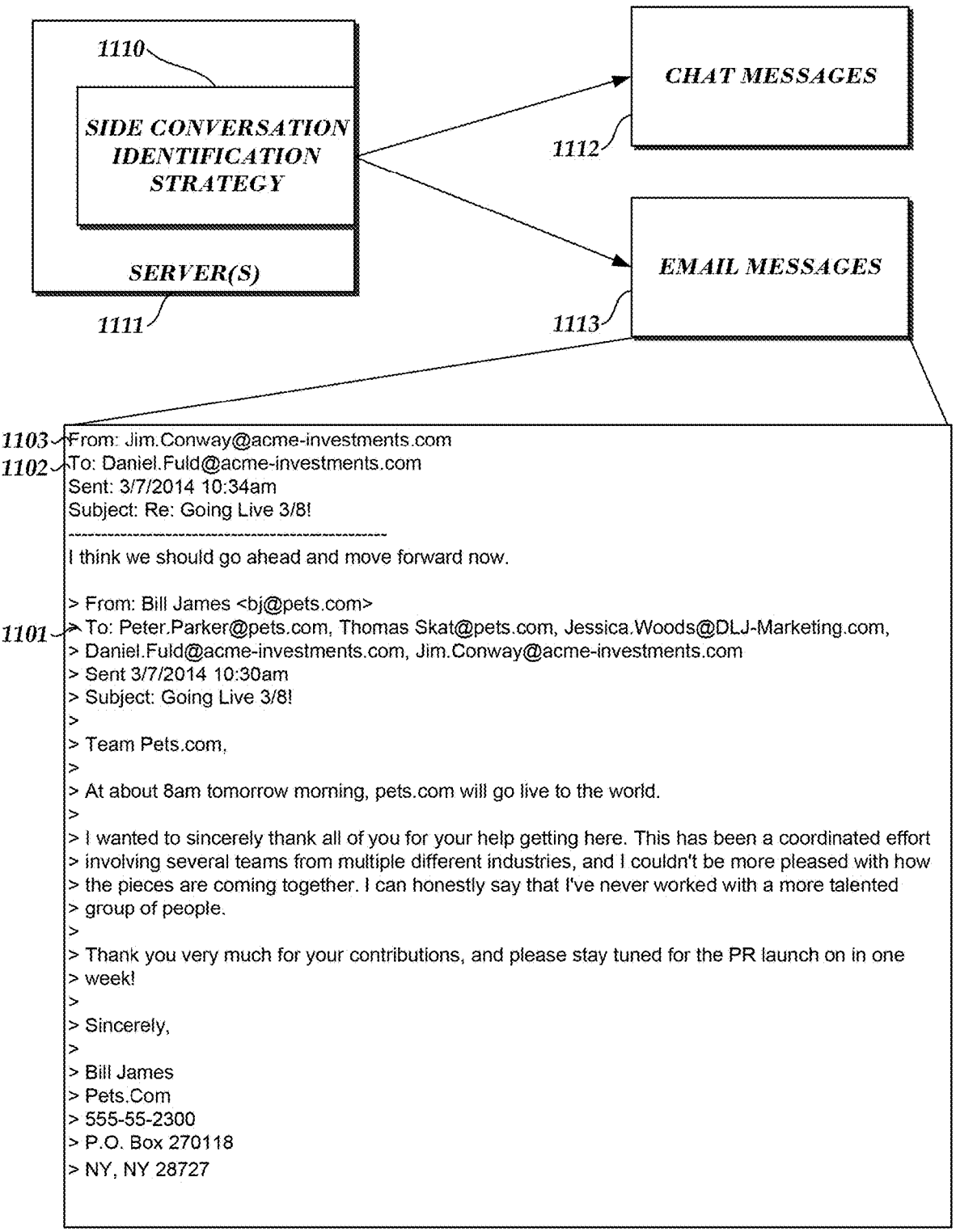
FIG. 11 illustrates an example email thread matching a side conversation identification strategy to assist in detecting financial malfeasance.

FIG. 11 illustrates one possible identification strategy of data items. No matter at what point in the process the strategy is being used (to identify seeds or related data items in a review collection), each strategy may comprise certain rules and procedures that may be used to identify the data items that match that strategy.

For example, block 1110 of FIG. 11 serves to identify side conversations. This side conversation identification strategy (as with all other identification strategies discussed herein) may be executed on hardware processor(s) in server(s) 1111. The identification strategy may operate by analyzing a database of communication messages such as chat message database 1112 and/or email message database 1113. The side conversation identification strategy may operate to analyze all messages within a particular database or a subset of messages. For example, a side conversation strategy could be programmed to identify particular messages that are associated with a certain time period, day, or other subset. Such a strategy may operate to analyze only those email messages or chat messages that are associated with a particular user, a particular domain (e.g., "gmail.com"), a particular financial institution, and/or a particular customer, based on the rules within the particular identification strategy.

A side conversation may be an email thread or chat message thread comprising an initial communication that is sent to a superset of recipients, and then a subset of the recipients initiate a new conversation in response to the email message or chat message. A side conversation strategy may use this definition to identify emails and email threads that match the definition/rule.

Side conversations can sometimes be an indicator of fraud, misrepresentation, inappropriate or deceptive conduct or any unacceptable conduct because the drop of the other individuals on the thread or chat message may indicate that a sensitive topic, such as a topic that those remaining on the email thread do not wish to share with individuals dropped from the email thread, is being discussed.

In FIG. 11, the side conversation identification strategy 1110 may have identified one or more side conversations in the email messages database 1113. This side conversation may be from, for example, jim.conway@acme-investments.com and may be an email that is sent to daniel.fuld@acme-investments.com. This email may have been identified as a side conversation because recipients were dropped after the initial email in the thread 1101 from Bill James to a variety of recipients, including jim.conway and daniel.fuld's email addresses at Acme Investments.

In the depicted case, the initial email contained information about the new pets.com service going live the following day. At this point when jim.conway replies to the thread, he only includes daniel.fuld, not the other recipients, and not the original sender Bill James. Thus, embodiments of the side conversation strategy identify that a side conversation is taking place. Other criteria for a matching side conversation may also be used. For example, a strategy may require that the side conversations being identified are only for side conversations within Acme Investments, or sent and received within a certain time period. In the depicted case of FIG. 11, the email was sent on Mar. 7, 2014 and all recipients of the follow-up emails are within the acme-investments- .com domain. Thus, this email may be used as a seed data item based on identification by a side conversation strategy.

In some embodiments, the side conversation identification strategy can further filter the number of email messages to be sent by requiring that only those email messages that have a thread length greater than two messages should be searched. For example, if an email message was part of a thread that only contained one message, then the side conversation strategy would not further analyze the message (as it cannot be a part of a multi-message thread).

In some embodiments, email threads can be identified by matching the email subject of one email message to an email subject of an earlier or subsequent email message (ignoring other added elements to a subject such as "re:" or "FW:", etc.). For example, in FIG. 11, both the original email and the later email contain the text "Going live 3/8!", thus they can be matched as an email thread and then determined whether or not participants left the thread to result in a determination of a side conversation.

In some embodiments, a minimum or maximum threshold of dropped recipients may be required to identify a side conversation. For example, if there was an initial email having 100 recipients and the second email in the thread having 99 recipients, the drop-in recipients may not qualify as a side conversation because 99 recipients (or some other minimum quantity that may be configurable by the user) may not be considered a secret conversation.

Instead, a side conversation may require less than a threshold number of recipients (and/or a threshold percentage of recipients) to remain in the conversation in order to be considered a side conversation indicative of inappropriate conduct. For example, in some embodiments, the threshold number may be less than 5 recipients remain on a thread in order to identify/qualify that email message as a side conversation.

In some embodiments, subject matter or keywords may also be required to identify an email message or chat message as a side conversation. For example, certain customer keywords, here "pets.com", a client of Acme Investments, could be used as a keyword to further filter down matching email messages as side conversations (e.g., a side conversation strategy could contain a rule indicating that only side conversations mentioning customers should be selected). Other keywords could be complaints, words signifying compliance with procedures/laws or lack thereof, trading key terms "insider trading", etc.

Other keywords may also be used to filter out side conversations instead. For example, email messages that contain in the subject "automatic reply," etc. may indicate messages that are automatically generated and automatically drop other recipients on a thread. Although this may match a definition of a side conversation, a strategy may be configured filter out these messages as they do not usually indicate malfeasance. This filtering may reduce the number of email messages that server(s) 1111 may be required to analyze and thus increase efficiency in analyzing or determining side conversations as a whole.

In some embodiments, metadata may be created about the side conversation, such as indicating a number of recipients in the to:, cc:, and bcc: fields, so that an analyst may refer to the amount of original and dropped recipients from a conversation without having to analyze the email itself. This may assist an analyst or the data analysis system to automatically ignore or review this particular side conversation. Metadata such as the number of recipients in the to:, cc:, and bcc: fields could also be used as a part of scoring strategy. For example, a side conversation that has 99 users and reduces down to a conversation of only two users can be allocated a higher score than a side conversation that has 5 users and reduces down to a conversation of 4 users (e.g., a score based on the ratio of the drop).

In one embodiment, a side conversation may also require that a manager who is on a thread to be subsequently dropped while the thread continues between other participants. This type of detection may require a mapping of managers and their employees (e.g., within an SQL database, etc.) within a financial institution to be accessible so that the data analysis system using such an embodiment of a side conversation can determine the managerial relationships. In such an embodiment, additional filtering for side conversations may be performed that, for instance, detect "assignments" or "tasks" (or the like) keywords issued by the manager.

XII. LIBOR Fix Detection Strategies

Figure 12:
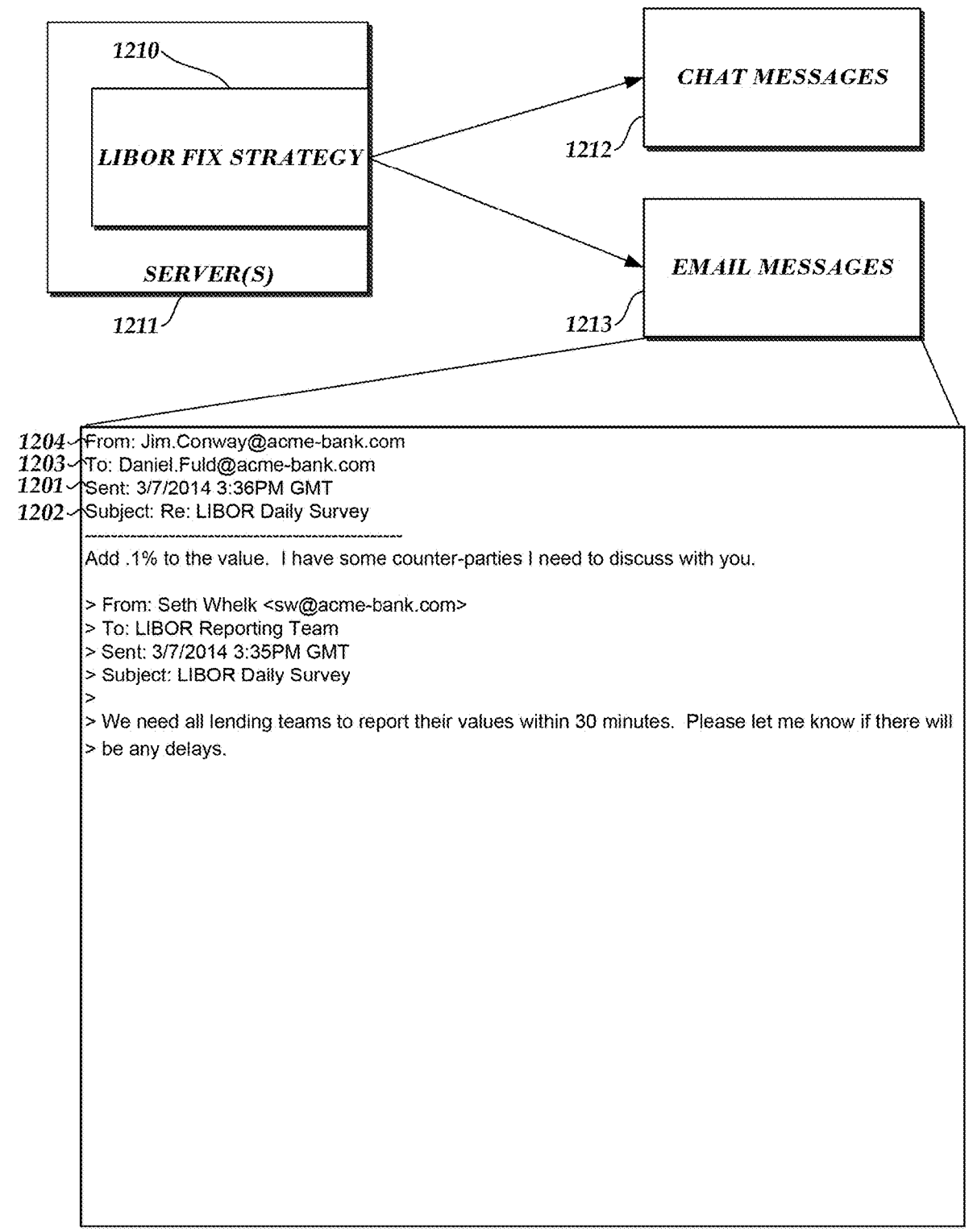
FIG. 12 illustrates an example email thread matching a LIBOR fixing or manipulation identification strategy to assist in detecting financial malfeasance.

FIG. 12 illustrates an example of a possible LIBOR fixing strategy or a strategy to detect the fixing of any standard interest rate or that depends on gathered or surveyed information and/or an interest rate announcement that that regularly occurs at a given time. As known in the industry, LIBOR stands for the London Inter-Bank Offered Rate. This may be the rate of the average interest rate that leading banks in London would be charged if borrowing from other London banks. This rate is often subject to market abuse because it is published daily at 11:00 a.m. London time based on a survey of previous London bank offered rates. Thus, by manipulating the survey rates, the LIBOR rate may be abused, for example in interest rate arbitrage scenarios. Because the LIBOR rate is used by other banks to set their rates or by financial instruments, collusion or financial malfeasance to manipulate the LIBOR rate can result in money earned for the manipulators.

Thus, a strategy to detect the fixing of LIBOR rates, such as the one executed in block 1210 of server(s) 1211 may search and filter chat messages and/or email messages or other communications for communications that have potential indicators for altering or manipulating the LIBOR. For example, communications by financial spot traders taking place around 3 to 5 p.m. Greenwich Mean Time may indicate a possible fix of the LIBOR rate or improper influencing of the LIBOR rate. Such a time period may be configured in the LIBOR fix strategy. This time may be used as a possible time window where survey or input is gathered to determine the next LIBOR to be published. Thus, a communication taking place within a time period associated with LIBOR may contain evidence of improper influencing of the LIBOR, and would be useful as a seed in a review collection. For example, in FIG. 12, the LIBOR fix strategy may analyze email messages and chat messages based on the rules in the LIBOR fixed strategy. Here, in this example, the rules may match the time the depicted email was sent on (Mar. 7, 2014 at 3:36 p.m. GMT) and the subject of the email includes the word LIBOR. Thus, some combination of time, keyword searching, and searching based on the sender, for example here jim.conway@acme-bank.com, may indicate that the sender is a spot trader, and the email would match the criteria of the LIBOR fixed strategy used in this example.

An identified email as matching the LIBOR fix strategy may then be reviewed by an analyst in association with other related emails and chats in a review collection. These emails and chats can be added to the review collection by matching the sender, Jim Conway, and/or the recipient, Daniel Fuld, to emails/chats messages that were sent or received by either of these users within a time period associated with LIBOR (and possibly match other criteria, such as containing the keyword LIBOR in the subject or text of the message).

Similarly, chat messages may be analyzed, for example, a chat message sent from Jim Conway that contains the word LIBOR based on keyword searching and sent within a time period associated with LIBOR could be a chat message that may match the LIBOR fix strategy.

In some embodiments, the time period may be configurable based on the amount of email to be analyzed, or the timing of the release window of a surveyed interest rate. For example, any time period around collection or announcement of the LIBOR may be used.

Any keywords indicating the LIBOR or any other survey rate may also be used as matching criteria for a LIBOR fix type of strategy, for example the term prime rate or basis points could also be keyword indicators for this type of detection strategy.

XIII. Disclosure of Confidential Information Strategies

An initial financial risk identification strategy may determine whether an email or communication message may have a higher likelihood to be a communication that contains a disclosure of confidential information, and thus may be used as a seed or initial data item to build a review collection. Strategies to detect confidential information may be useful to an analyst or investigator because they may reveal, after further manual review, possible impermissible sharing or use of confidential or material nonpublic information from inside an organization, especially where that organization may have a duty to keep information confidential secret or to prevent insider trading based on confidential information.

Figure 13:
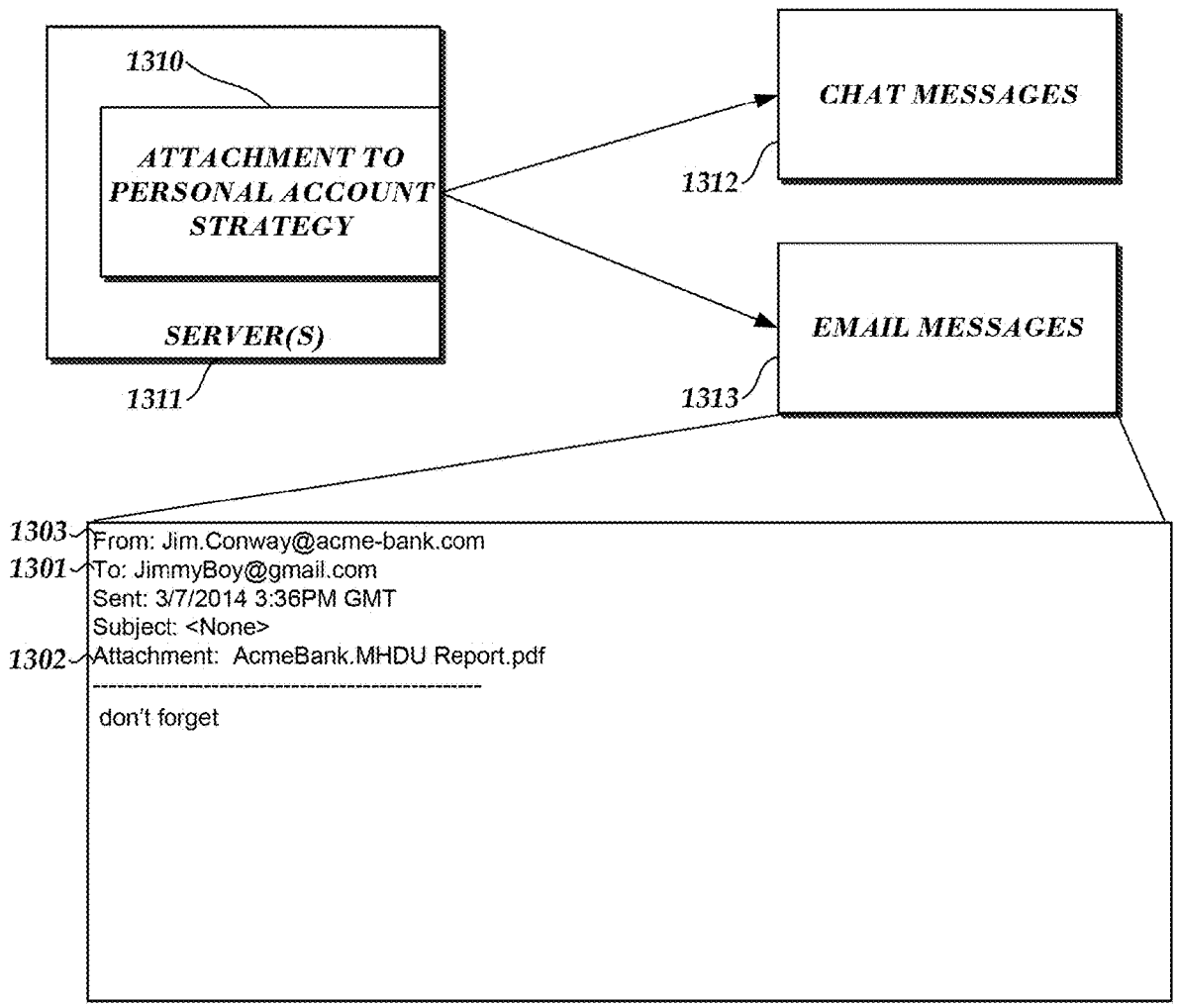
FIG. 13 illustrates an example email thread matching an example disclosure of a confidential information identification strategy to assist in detecting financial malfeasance.

As an example of a particular strategy that may detect confidential information disclosures, FIG. 13 illustrates a strategy specific for detecting the dissemination of confidential information to personal accounts. Often times when employees send information from their place of employment, they will send it from an employee email address to their own private email address. A strategy to detect this behavior may be useful to identify such candidate emails for review by an analyst.

For example, in block 1310, the strategy may search chat messages and email messages for any communications from a person within a firm to an outside email address (for example, as depicted in FIG. 13, jim.conway@acmebank.com who may be a trader at Acme Bank, sending an email to JimmyBoy@gmail.com, an email address with a different domain than acmebank.com).

In some embodiments, a strategy may further detect whether an employee's personal account, rather than their work account, is the destination of an email. For example, there are well known outside email addresses such as gmail, yahoo, hotmail, and any other ISP that is not directly associated with a specific company, that provides free email services. These email addresses may be specified within a strategy to result in the identification of an email message. For example, FIG. 13 depicts an email to JimmyBoy@gmail.com. Sending an email message from an internal email address to a gmail domain itself (or any other known free or non-corporate domain), in some embodiments, may indicate identification of a seed. In some embodiments, the strategy may require a match of not only a free or outside email domain, but also a permutation of identifiable information about the sender. For example, Jim Conway may be an employee at acme-bank. Due to having access to internal employee information, the data analysis system may create permutations of his first, middle, and last name that may be used for comparison to outside email addresses. Here, the outside email address sent to is JimmyBoy@gmail.com. Jimmy is a well-known nickname of Jim's first name. Thus, because Jimmy is a substring of JimmyBoy, a confidential information detection strategy may be configured to require such a substring match in an outside email address for the strategy to identify the email message to be a seed (or add to a review collection). In some embodiments, this type of email address match, using a permutation of employee information when matching the outside email address, may instead raise the score of any review collection if the seed contains such a match.

Further, strategies that detect confidential information being disclosed improperly may also make a determination based on any attachments included in an email. For example, in FIG. 13, attachment 1302's filename is Acme-Bank.MHDU Report.pdf. A confidential information strategy analyzing such an email may specifically have a keyword filter that looks for email messages with attachments. Keywords may include, for example, "report," "AEO," "Attorneys Eyes Only," "confidential," or "privileged" or any other word or abbreviation thereof that may indicate a sensitive or confidential attachment. As shown, the email message described in FIG. 13 matches such a filter ("report").

Additional indications may also trigger rules under a confidential information detection strategy. A rule/filter in the strategy may possibly count how many attachments are being sent from an inside address to an outside address over a period of time. For example, Jim Conway may frequently send messages from his account 1303 to an outside address (e.g., jimmyboy@gmail.com). Sending one or two messages every so often may not be a strong signal indicating that confidential information is likely to have been sent. However, an abnormally high amount of emails to an outside email address (e.g., 10 a day) may indicate an activity that should be flagged or set as one or more possible seeds to create review collections for further review by an analyst.

Likewise, the volume of personal email attachments being sent from internal to outside a bank or company or financial institution may also impact the scoring of review collections. For example, a scoring strategy may be configured to score as higher a volume of email messages being sent that match indications of confidential information, and may score certain indicative review collections higher on this basis.

In addition, other indicators could possibly assist a confidential information detection strategy to better determine which email messages likely disclose confidential information improperly. For example, if a personal email account is CCed or BCCed on an email message to other parties, this may further indicate that confidential information is leaving an enterprise. In other words, if a message is being sent from an internal email to another internal email address, but there exists a BCC to an outside email address, or an email address that possibly matches a personal account as described above, then such an email may further reveal messages that contain confidential information being sent outside the company in a secretive manner.

Another indicator may be a rule that detects whether the title of an attachment or subject does not match the domain where an email or chat message is originating or being sent to. For example, if the subject of an email (or the sender's email address domain, etc.) has the keyword "Acme Bank"

or matches the domain of Acme Bank, but the attachment has "Wall Street Bank" in its title instead, then the wrong report may have been sent or disclosed (either accidentally, or on purpose). In this case, a matching email or chat message with such an indicator may be chosen as a seed or be added to a review collection (or scored higher).

Using a combination of rules designed to detect confidential information disclosures may heighten the signal of matched email messages or chat messages versus the false positives that an investigator or analyst may have to look through.

XIV. Customer Information Leak Strategies

Figure 14:
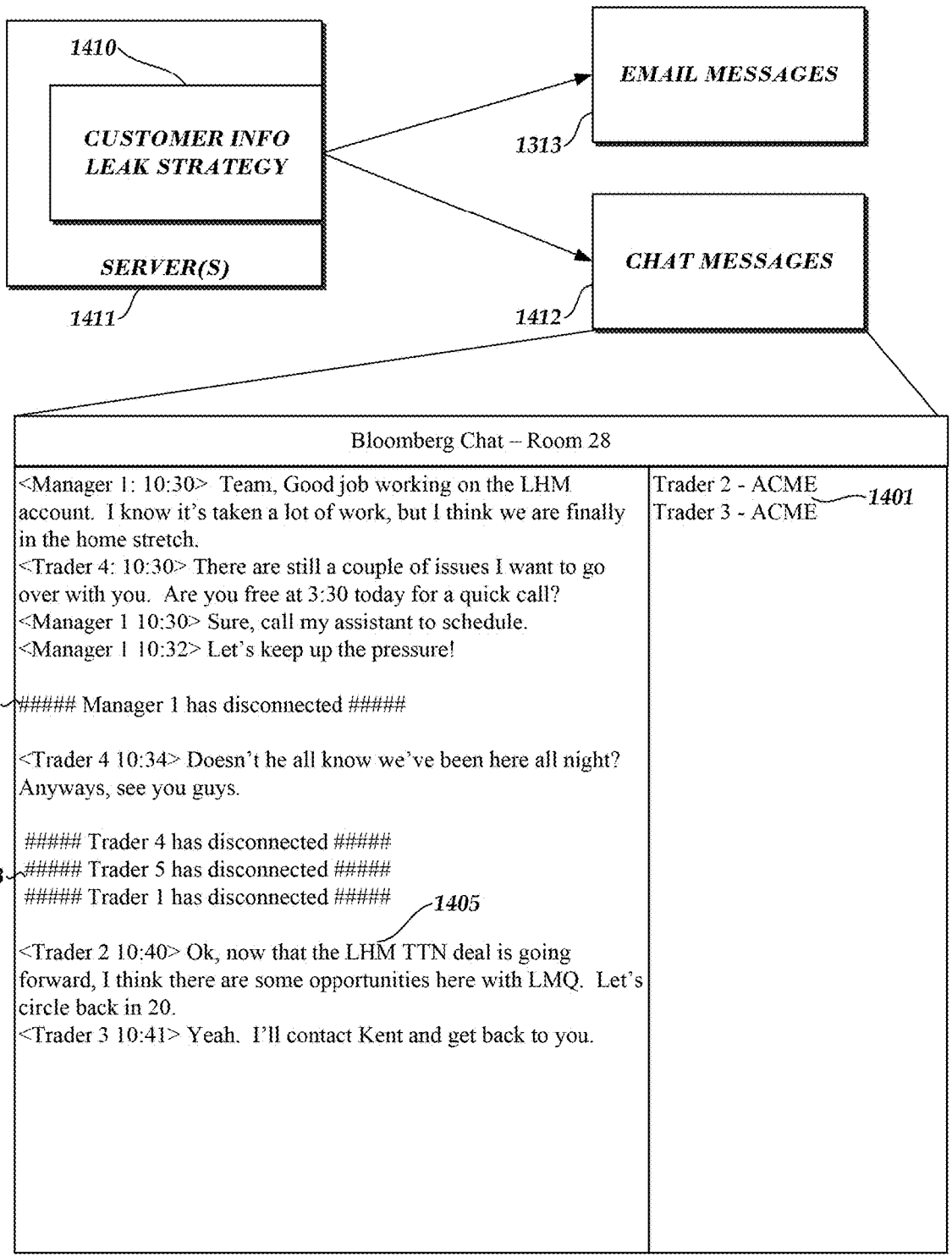
FIG. 14 illustrates an example chat message thread matching an example disclosure of a customer information leak identification strategy to assist in detecting financial malfeasance.

FIG. 14 illustrates a strategy designed to detect customer information leaks. Detection of customer information leaks may be similar to detection of dissemination of confidential information. Thus, many of the same techniques described for a detection of confidential information strategy may be applicable to detecting improper dissemination of customer information. A customer information leak may indicate impermissible sharing or use of the confidential information and/or a material nonpublic information being disclosed.

A financial firm's client information may occasionally be leaked by an employee or trader either on purpose or inadvertently. The data analysis system described herein may be configured to analyze email messages and chat messages to determine if there is any risk of disclosing customer information to a party who is not supposed to receive it. Like other strategies, a strategy designed to detect possible leakage of customer information may involve analyzing one or more email messages or chat messages (or any other communication message) to determine likely candidates of messages where customer information may have been leaked so that an analyst can review. Thus, customer information leak strategy 1410 may comprise a set of rules and/or filters to determine communication messages that may act as an initial seed value or as criteria to add a message to a review collection.

The example in FIG. 14 shows a sample chat room that contains messages that may have been sent and received previously, and stored in a chat message database 1412. The messages illustrated in FIG. 14 may be Bloomberg chat messages (or any type of chat message), which exemplary of a chat service that traders or employees within a financial institution may use (e.g., Bloomberg chat, IRC, instant messaging chat, etc.). A customer info leak strategy may include a rule to detect a mentioning of a customer in chat, where the mentioned customer is not a participant. For example, in FIG. 14, Bloomberg chat room 28 contains various messages. For example, manager 1 at 10:30 discusses with the team the LHM account. Later at 10:40 trader 2 also discusses the LHM account. As seen at 1401, the users in the room when the final message is received are traders 2 and 3. These traders may be affiliated with different employers. For example, trader 2 may be affiliated with Acme and trader 3 may be affiliated with a separate financial institution (e.g., "Wall Street Bank"). Who is in a chat room may be determined by analyzing who received a chat message, or, if unavailable, determine a listing of recipients of a chat message based on tracking of "enter" or "connect" and "disconnect" or "leave" messages in a chat room.

The example chat messages in FIG. 14 shows that the "LHM" account is being discussed 1405, however, employees from the LHM customer are not present. Therefore, if LHM is a customer of the Acme financial firm, and employees of Acme are discussing LHM's private customer information, but no employees of LHM are present when LHM is being discussed, then this may cause the customer information leak strategy to indicate that the communication messages within the chat around the time of when LHM is being mentioned, for example, 10:30 and 10:40 for message 1405, be flagged as initial seeds or initial financial indications of risk that may be used to create review collections.

A review collection built off of a detection of leaked customer information in this example could comprise all the trades by trader 2 or trader 3, or the trades of any of the recipients that received the discussions of the LHM information. A filter could narrow down these trades to just LHM trades. In addition, the traders mentioning LHM around the same time period in email may also indicate communications messages to be added to a review collection based on the seed chat message.

According to the example in FIG. 14, the detection strategy may indicate that LHM information may have been impermissibly disclosed throughout the Acme organization without LHM being present. Such detection may require building a list of customer names. For example, the Acme financial firm may have a database (e.g., an internal database based on customer/client list information or a directory listing of customer contacts, etc.) of customers that are affiliated with Acme. For example, the term LHM which appears in message 1405 may be looked up in the database of customer names, and if the data analysis system determines that LHM is a customer, then the chat message may be flagged if all recipients of the message were not affiliated with LHM (e.g., do not have an LHM IP address, chat name, email address, etc.).

For example, the chat message containing LHM 1405 may be flagged as a seed, or added to a review collection, or scored higher, because the customer info leak strategy detects that 1) LHM is present in the list of customer names for Acme and/or 2) there is no employee of the customer is in the chat room.

The same concept may also be applied to email. For example, the mention of a customer in an email to another third party without the mentioned customer being on the email may cause the customer information leak strategy to mark the email as a seed, etc. In some embodiments, if an email was sent to an external address or the BCC field indicates an external address, and the email contains a customer name, and that customer name is not listed as a recipient on the email, then the email may be flagged.

In some embodiments, in order to improve performance, some messages may be filtered out from any analysis of customer names. For example, an email that is only BCCed to undisclosed recipients, or any email that is a mass market email, such as an email to thousands of individuals, may not be analyzed for customer name detection, as these appear to be spam or other mass market emails.

Other types of suspicious emails or chat messages may also be determined based on the recipients. For example, messages to a nytimes.com (or other new outlet domains) may be flagged as a seed, and require more investigation by an analyst, due to the risk of impermissible sharing or use of confidential or nonpublic information being sent to the press.

Similarly, customer information leaks may also be detected when a financial broker such as Acme Bank reveals counterparty information about a trade. For example, if a sentence appears in an email that Company X is buying or selling or otherwise putting in an order that may change their position with respect to a financial instrument, then it is likely improper to reveal that order to any other party besides traders internal to Acme Bank or other individuals within Company X. Emails that match such criteria may be used as a seed to generate a review collection for further review.

In some embodiments, a combination of strategies may be used. For example, if a trade of Company X appears close in time to a communication message about Company X, and no one from Company X is on the communication, but there is an unaffiliated external party on the communication, the communication may be considered a leak of confidential information and thus may be flagged (along with the trade) as seeds for a review collection.

Other possible rules may detect anomalies over multiple chat messages. For example, chat messages or email messages to external parties that exceed a threshold based on average activity may indicate some collusion. For example, if a trader typically emails to outside entities 10 times a day, but one day emails to outside entities 90 times, then those emails to outside entities may be considered abnormal and identified as possible seeds in order to build review collections for review.

Likewise, individual checking of attachments in emails may also be performed. For example, if an attachment is labeled confidential or for use only by certain parties, then that email may be reviewed by the system to make sure that no one outside of the financial institution or a customer is receiving that email. If someone else received that email, then it may be flagged as a seed.

XV. Escalation of Worry Strategies

Figure 15:
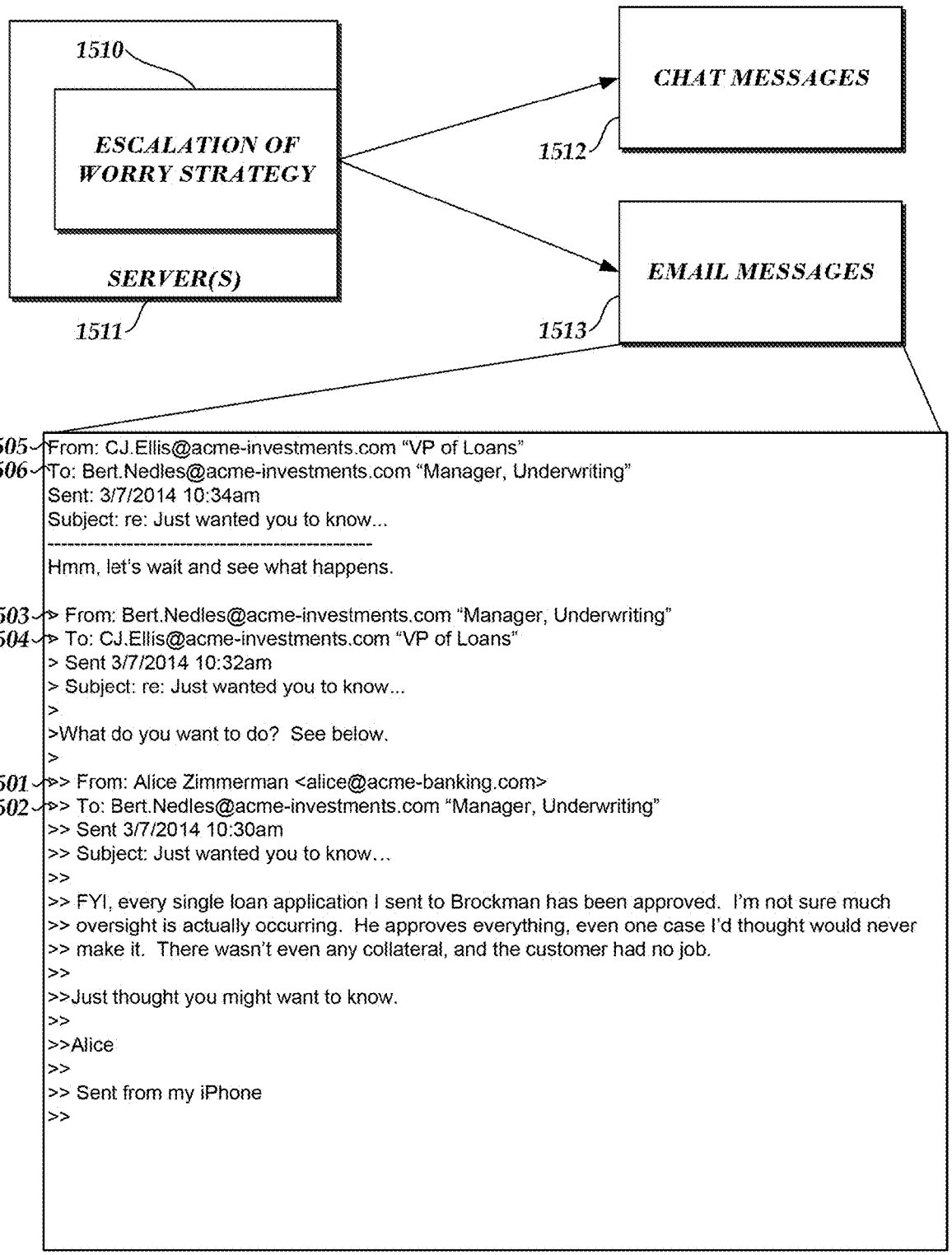
FIG. 15 illustrates an example email thread matching an escalation of worry identification strategy to assist in detecting financial malfeasance.

FIG. 15 illustrates an escalation of worry strategy for identifying initial financial risk data items or seeds or possibly adding on to a review collection. The escalation of worry strategy may search and analyze chat messages and email messages, or other type of communication messages to determine whether a message has been elevated up the chain of command inside an organization.

For example, FIG. 15 illustrates an email message thread that includes an original email message from Alice Zimmerman 1501 to Bert Nedles 1502 regarding loan application review. The next message in the thread, from Bert Nedles 1503 to CJ Ellis 1504 includes the previous message in the thread. Finally, a third message from CJ Ellis 1505 to Bert Nedles 1506 completes the three messages in the thread, and quotes the original two messages.

Based on the interrelations of these messages, from the first message from Alice Zimmerman in the From: line of 1501 and the To: line 1502, it can be seen that various employees forwarded the message. In the first message the employee Alice Zimmerman 1501 of Acme Bank sent the message. In the second message it was Bert Nedles 1503 who sent the message.

Various employee relationships may be used by an escalation of worry strategy in comparison to the senders and receivers of the chat messages and email messages analyzed. For example, the data analysis system may lookup who is Alice Zimmerman's supervisor by querying a directory or table listing or mapping of user names/email address (or other identifier of a user) to employee information (e.g., by using a data binding). If the supervisor matches Bert Nedles, then the escalation of worry strategy may determine that the original email was sent from an employee to a supervisor.

The escalation of worry strategy may be configured to then determine how other later message in the thread were handled. For example, starting with the second message in the thread, the message from Bert Nedles 1503 to CJ Ellis 1504, the same message was forwarded to CJ Ellis, who, based on the stored employee relationship information, may be Bert Nedles's supervisor. Thus, it can be determined that the email went from Alice Zimmerman to Bert Nedles, the first supervisor, then from Bert Nedles to CJ Ellis, the second supervisor up the chain of command.

Emails that are forwarded up the chain of command often are representative of sensitive information that could contain subject matter regarding fraud, misrepresentation, inappropriate or deceptive information, or other unacceptable conduct because supervisors typically review, oversee, and rectify such conduct. Thus, an organization may desire to identify such emails as warranting further review compared to other emails.

In some embodiments, an escalation of worry strategy may identify emails as seeds where an email was forwarded up the chain of command as little as two times. Some embodiments may have additional requirements for identifying a communication message under an escalation of worry strategy. For example, it may not be sufficient to identify an email based purely on an email being sent from an employee to his supervisor, and then from his supervisor to the supervisor's supervisor. In some embodiments, it may also be required that the supervisor's supervisor had their own supervisor (e.g., the supervisor's supervisor's supervisor), but that supervisor did not choose to send the email further up the chain of command. This may indicate that the "worry" was not escalated all the way up the chain of command, and thus the email may warrant investigation, and be marked as a seed or otherwise added to a review collection.

In some embodiments, it may be required that emails are forwarded up the chain multiple times, such as 3, or 4 times or more, to be flagged as a seed. Such a serious escalation could also impact how a review collection is scored (e.g., increasing scores based on how many times an email was forwarded up the chain of command).

In some embodiments, the escalation of worry strategy may require various key words to also appear in an email. For example, in FIG. 15, the original email contains the word "oversight". A keyword matching on the word "oversight" may reveal the email message in FIG. 15 and trigger a further analysis of the email thread by the escalation of worry strategy. Once it is determined that that email message has been forwarded to multiple supervisors, for example, more than two supervisors or more than one supervisor, then, based on the rules in the particular embodiment of the escalation of worry strategy, the strategy may flag it as a seed or as a message that should be added to a cluster.

Similarly, but not shown, email messages that contain, in the body text or subject, the name of a manager in the sender or recipient's reporting hierarchy, such as Alice Zimmerman's boss, Bert Nedles, but which are not sent to that manager, might indicate an issue that should have been reported to the manager. Thus, this type of email may require additional review by an analyst. Therefore, an escalation of worry strategy that identifies messages where a manager has been mentioned, but left off the recipient list, may indicate potentially bad conduct and financial malfeasance, and trigger this type of message to be flagged. Similarly, but not shown, in some embodiments, an email that is sent a supervisor, and then is not sent to any employees that work in compliance, may indicate also be flagged for review. Such an email may indicate that a specific problem is not resolved, or may contain hidden fraud misrepresentation, inappropriate or deceptive or unacceptable conduct or financial malfeasance that is being kept from compliance officers. A determination that an email was not sent to employees in a compliance role or compliance department may be made by querying an employee information database that comprises various departmental affiliations or roles of employees.

XVI. Suspect Trade Strategies

Figure 16:
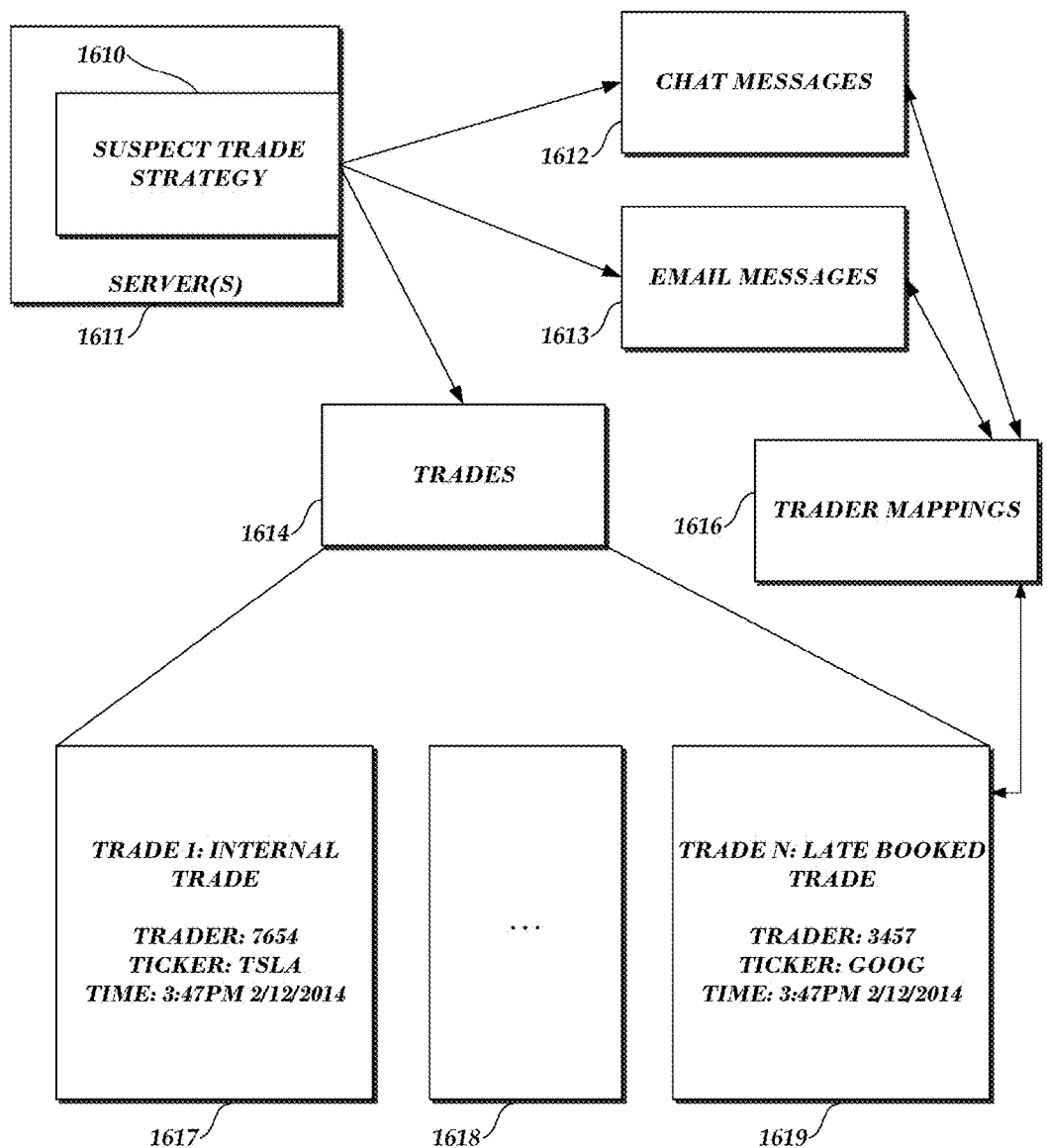
FIG. 16 illustrates example trades matching a suspect trade strategy to assist in detecting financial malfeasance.

FIG. 16 illustrates a suspect trade strategy as used in some embodiments of the data analysis system. Trades of financial instruments (e.g., stock shares, mortgages, commodities, futures, etc.) may be analyzed to determine whether the trade itself is inherently suspect based on a variety of criteria. Such a suspect trade may be flagged as a seed to build a review collection, or as an additional data item to add to an already established review collection (or may be used for scoring purposes, e.g., any suspect trades in a review collection contribute more to a score of a review collection).

For example, based on the data within a particular stock trade, trades may be identified as having abnormal information contained within them that will be known to those working in the financial instrument trading arts, such as: RMO flag applied, ERC breaches, unapproved trades, internal trades, late booked trades, mark violations, sensitivity breaches, canceled trades, settlement fails, actual PNL missing, important CnCs, lightening events, short flag breaches, long flag breaches, Dept PNO variance, multiple CnCs, absent trading, after hours trades, sensitive movers, DK trades, economic CnCs, VAR breach, block leave trades, flash PNL, and unmatched trades. Each of these types of trade exhibit properties that are typically not present in normal trading activity. Thus, these types of trades may be flagged for further review so that an analyst or investigator can determine based on the trade (along with any additional contextual information included in the review collection) whether any improper conduct is occurring. In other words, these types of trades are more likely to comprise financial malfeasance than trades that do not meet any of the criteria of the suspect trade strategy (e.g., not a canceled trade, sensitivity breach, etc.).

In some embodiments, properties within a trade or order object may indicate the trade or order is an unapproved trade/order. For example, a trader who also sits on a board of a particular corporation may not be able to make trades of that particular corporation's stock. Thus, a trade that is requested/performed by that trader on the board for the stock ticker associated with the board's corporation may be considered an unapproved trade. The detection of such a trade simply requires access by the suspect trade strategy to a database containing a list of financial instruments (e.g., by type of instrument, or by name/specific instrument) that particular traders are allowed or disallowed from trading.

As another example, an internal trade may be identified by a trade with properties that indicate that the two traders involved (e.g., a buying trader and a selling trader) both work for the same financial institution, for example Acme Bank. If both sides of the trade have been determined to originate within the same financial institution, then the trade may be considered a suspect trade, and be flagged to act as a seed, etc.

As another example, a trade may be a canceled trade. This type of trade may be detected when a trader lists a stock for sale at a certain price and then later delists it from sale.

In other types of trades, a trade may be considered to be made absently by a trader (e.g., an absent trade). For example, a trader may not be logged into his computer where a trade is executed. This means the trade may have occurred, either automatically or without that trader knowing, on his behalf. As another example, a trade may be performed just before the closing bell, for example at 3:54 p.m. This may be considered a late booked trade.

In FIG. 16, the variety of types of suspect trades is illustrated. Block 1617 which shows an internal trade by trader 7654 of Tesla and many other trades in the trade database going to trade N 1619, which is maybe a late booked trade by trader 3457 at Google. All of these trades may reside in the trade database and suspect trade strategies may use the properties described above to identify specific trades, which may be flagged as a seed data item or added as a related data item in a cluster/review collection.

For example, late booked trade 1619 may have a trader property value of 3457. Based on that trader property value, which indicates an identifier of the trader who actually made that trade, the trade may be looked up in a trader mapping database which may be accessible via a data binding to find the trader's chat message and email messages during the time period of the trade. For example, when putting together a review collection based on suspect trade 1619, the email messages and chat messages that are around 3:47 p.m. on Feb. 12, 2014 may be added to the review collection centered around suspect trade 1619. In this way suspect trades may be analyzed in their full context along with all email messages by the trader around the same time period that may be related to the trade. Using the review collection, the analyst or investigator may make a determination about whether there is collusion or any other financial malfeasance that may be going on based on a particular suspected trade.

XVII. Data Analysis System Example Based on Suspect Trade Strategy

As an example of one embodiment of the data analysis system, Acme Bros., an investment brokerage, wishes to analyze the 24 Terabytes of trade, email, and chat data each week. In order to analyze their data, they deploy a data analysis system employing the techniques described herein to gather information for review by their internal compliance investigators. For example, they create a suspect trade strategy that may identify trades that sell a stock, and then buy the same stock, within quick succession. This strategy may identify a seed. Acme Bros. has also created a review collection strategy that will search for any emails or chat messages that were sent around the same time period (e.g., within 30 minutes), and sent or received by any trader involved in the transaction. Further, Acme Bank may have created a scoring strategy to score the review collection where the score is based on a formula that scores the review collections based on: 1) the transaction amount of the traded stock that is acting as a seed (e.g., 1 point for every million traded), 2) the volume of email messages and chat messages located around the same time period (e.g., 1 point per 10 messages found), 3) whether any of the email messages or chat messages contain references to the stock traded (e.g., 2 points for each keyword found), and 4) the rank of the trader involved in the trade (e.g., 2 points for a senior trader, and 1 point for a junior trader).

The computerized data analysis system may then begin analyzing the week's trading data by accessing its database of trades, analyzing each trade to see if any match the suspect trade strategy's rules. The data analysis system identifies two trades (Trade 1 buying $2 million in Ford stock at time 3:30 p.m. and, and Trade 2 selling $2 million at time 3:32 p.m.). The data analysis system automatically selects these two trades (which, taken together, are suspect trades), as seed trades for a review collection.

The data analysis system then executes its review collection strategy for this type of stock trade seed. Based on a property of the trade (and possibly a data binding with access to a Trader database), the data analysis system determines that Trader: Daddy Warbucks is responsible for making both trades. Using data bindings (or other method of querying a data repository based on an object property(ies)), for example, all of the email or chat messages sent or received by Daddy Warbucks within 30 minutes of Trade 1, or 30 minutes of Trade 2, may be added to the review collection. Accessing Acme Bank's email repository, the data analysis system identifies 10 such emails, and no chat messages. One of the emails contains the keyword "Ford".

The data analysis system then executes a scoring strategy for the review collection comprising 2 trades and 3 email messages. Based on the scoring criteria specified in the scoring strategy, the data analysis system awards 4 points for $4 million in trades in the review collection, and 4 additional points due to each trade being executed by a senior trader (Daddy Warbucks). Due to the 10 messages found, 1 point is awarded for each email message, and additional 2 points are awarded because the keyword "Ford" (which is a keyword that may be searched for based on the company traded) is found within one email. The total number of points is then 11. Other trades may be found, but their scoring may be lower, depending on the review collection. Once scored, the data analysis system may sort and rank the review collections scored based on their score. The data analysis system may then display the review collections from highest to lowest score, and/or eliminate any set of review collections that did not meet a minimum score for review by an analyst.

XVIII. Keywords and Machine Learning

As describe above, in some embodiments, keyword analysis may also be used to optimize analysis of communication messages by any strategy. For example, keywords such as "confidential" or "fraud" or "misleading" or "insider", etc., or any keywords that match or have to do with financial malfeasance, may be useful to use in combination with the above strategies.

Adding keyword filters to various strategies has a number of advantages, including, but not limited to, eliminating various messages and trades from analysis of more costly rules/criteria (e.g., analyzing whether or not an email thread was escalated properly through the entire chain of command) and thereby saving execution time, increasing the quality of seeds or review collection materials found by the data analysis system and thereby reducing the number of review collections to review by an analyst, or enabling the data analysis system to better score, based off of keyword, the review collections, and thereby better differentiating each review collection, and more appropriately rank the review collections to be reviewed by an analyst.

Additionally, machine learning algorithms, and/or any feedback gathered from an analyst about past review collections created by the data analysis system (e.g., identifying true positives, false positives, etc.), may be used as additional initial item identification, review collection, or scoring strategies. For example, trades by a trader with an identifier of "7876" may often be identified as suspect trades by a suspect trade strategy operating in a data analysis system. However, the trades by that trader have never resulted in any further indication of financial malfeasance after review by an analyst. If the analyst provides feedback to the data analysis system (e.g., by indicating a false positive result to each review collection reviewed based on trader 7876's trades that had no indication of financial malfeasance), then the data analysis system and/or suspect trade strategy may take the large volume of false positive indicators into account when identifying future trades by trader 7876 to review (e.g., by reducing the score applied to a review collection based on such a trade's seed, or by ignoring all future identifications of trader 7876's trades by the suspect trade strategy, etc.).

XIX. Additional Embodiments

While the foregoing is directed to various embodiments, other and further embodiments may be devised without departing from the basic scope thereof. For example, aspects of the present disclosure may be implemented in hardware or software or in a combination of hardware and software. An embodiment of the disclosure may be implemented as a program product for use with a computer system. The program(s) of the program product define functions of the embodiments (including the methods described herein) and may be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., hard-disk drive or any type of solid-state random-access semiconductor memory) on which alterable information is stored. Each of the processes, methods, and algorithms described in the preceding sections may be embodied in, and fully or partially automated by, code modules executed by one or more computer systems or computer processors comprising computer hardware. The processes and algorithms may alternatively be implemented partially or wholly in application-specific circuitry.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "comprising" as used herein should be given an inclusive rather than exclusive interpretation. For example, a general-purpose computer comprising one or more processors should not be interpreted as excluding other computer components, and may possibly include such components as memory, input/output devices, and/or network interfaces, among others.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention may be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A computer-implemented method comprising:
   determining a user identifier associated with a transaction data item;
   determining a first electronic communication that was sent or received by a user associated with the user identifier;
   accessing a keyword filter configured to detect sensitive or confidential information transmitted through electronic communications, wherein the keyword filter comprises one or more keywords indicative of sensitive or confidential information;
   applying the keyword filter to the first electronic communication;
   determining that the first electronic communication comprises one or more keywords associated with the keyword filter;
   in response to determining that the first electronic communication comprises one or more keywords associated with the keyword filter, identifying a plurality of transaction-related data items from one or more databases, wherein the transaction-related data items are related to one or more of: the transaction data item, the user associated with the user identifier, or the first electronic communication;
   generating a data item cluster from the plurality of transaction-related data items; and
   generating user interface data usable for rendering a user interface configured to display a summary of the data item cluster and at least a portion of the plurality of transaction-related data items.

2. The computer-implemented method of claim 1, further comprising:
   determining a volume of electronic communications sent or received by the user over a period of time, the volume of electronic communications including the first electronic communication and one or more other electronic communications;
   determining a volume score for the volume of electronic communications based at least in part on an extent to which the one or more keywords are present in the volume of electronic communications; and
   generating the data item cluster based at least in part on a determination that the volume score exceeds a predetermined volume threshold.

3. The computer-implemented method of claim 1, further comprising:
   identifying at least one property associated with a first data item of the data item cluster, wherein the first data item comprises a second data item;
   identifying at least one property associated with the second data item of the data item cluster;
   comparing the at least one property associated with the first data item with the at least one property associated with the second data item;
   determining a mismatch is present between the at least one property associated with the first data item and the at least one property associated with the second data item; and
   scoring the first data item based at least in part on the presence of the mismatch.

4. The computer-implemented method of claim 3, wherein the at least one property comprises a domain name associated with a recipient of the electronic communication.

5. The computer-implemented method of claim 3, further comprising:
   determining that a direct recipient and a sender of the first electronic communication comprise a same domain name, and an indirect recipient of the first electronic communication comprises a different domain name; and
   scoring the data item cluster based at least in part on the determination that the direct recipient and the sender of the first electronic communication comprise a same domain name, and an indirect recipient of the first electronic communication comprises a different domain name.

6. The computer-implemented method of claim 1, further comprising:
   determining that the first electronic communication comprises an external personal account of the user or an account of a participant that is associated with the external personal account of the user; and
   scoring the data item cluster based at least in part on the determination that the first electronic communication comprises the external personal account of the user or the account of the participant that is associated with the external personal account of the user.

7. The computer-implemented method of claim 6, further comprising:
   determining a volume of electronic communications that comprises the external personal account of the user or the account of a participant that is associated with the external personal account of the user;

determining a volume score for the volume of electronic communications based at least in part on an extent to which the volume of electronic communications comprises the external personal account of the user or the account of a participant that is associated with the external personal account of the user over a period of time; and generating the data item cluster based at least in part on a determination that the volume score exceeds a predetermined volume threshold.

8. A non-transitory computer-readable storage medium storing computer-executable instructions that, when executed by a computer system, configure the computer system to perform operations comprising:

determining a user identifier associated with a transaction data item;

determining a first electronic communication that was sent or received by a user associated with the user identifier;

determining a keyword filter configured to detect sensitive or confidential information transmitted through electronic communications, wherein the keyword filter comprises one or more keywords indicative of sensitive or confidential information;

applying the keyword filter to the first electronic communication;

determining that the first electronic communication comprises one or more keywords associated with the keyword filter;

in response to determining that the first electronic communication comprises one or more keywords associated with the keyword filter, identifying a plurality of transaction-related data items from one or more databases, wherein the transaction-related data items are related to one or more of: the transaction data item, the user associated with the user identifier, or the first electronic communication;

generating a data item cluster from a plurality of transaction-related data items; and generating user interface data usable for rendering a user interface configured to display a summary of the data item cluster and at least a portion of the plurality of transaction-related data items.

9. The non-transitory computer-readable storage medium of claim 8, wherein generating the data item cluster further comprises:

assigning a score to the first electronic communication based at least in part on an extent to which the one or more keywords is present in the first electronic communication; and generating the data item cluster based at least in part on the score assigned to the first electronic communication exceeding a predetermined threshold.

10. The non-transitory computer-readable storage medium of claim 8, wherein applying the keyword filter to the first electronic communication further comprises:

identifying a subset of keywords from the keyword filter based at least in part on properties associated with the first electronic communication.

11. The non-transitory computer-readable storage medium of claim 8, further comprising:

determining a plurality of electronic communications sent or received by the user over a period of time, the number of electronic communications including the first electronic communication;

determining that the plurality of electronic communications comprises a number of keyword instances that exceeds a predetermined threshold; and generating the data item cluster from the plurality of transaction-related data items based at least in part on the electronic communications including the first electronic communication.

12. The non-transitory computer-readable storage medium of claim 11, further comprising:

determining a subset of electronic communications from the plurality of electronic communications, the subset including one or more electronic communications from the plurality of electronic communications that have a number of keyword instances that exceed another predetermined threshold; and generating the data item cluster based at least in part on the subset of electronic communications.

13. The non-transitory computer-readable storage medium of claim 8, further comprising:

determining that the first electronic communication is being sent to or received from an external account external; and scoring the data item cluster based at least in part on the determination that the first electronic communication is being sent to or received from the external account external.

14. The non-transitory computer-readable storage medium of claim 13, further comprising:

determining that the first electronic communication has occurred proximal to a transaction-related event, wherein the first electronic communication comprises keywords associated with the transaction-related event; and scoring the data item cluster based at least in part on the determination that the first electronic communication has occurred proximal to the transaction-related event.

15. A computer system comprising:

one or more computer readable storage devices configured to store:

a plurality of transaction-related data items, wherein a data item of the plurality of transaction-related data items comprises information associated with at least one of: a user, an electronic communication, a transaction, or an institution, and a keyword filter configured to detect sensitive or confidential information transmitted through electronic communications, wherein the keyword filter comprises one or more keywords indicative of sensitive or confidential information; and one or more hardware computer processors in communication with the one or more computer readable storage devices and configured to execute computer executable instructions in order to cause the one or more hardware computer processors to:

determine a user identifier associated with a transaction data item;

determine a first electronic communication that was sent or received by a user associated with the user identifier;

apply the keyword filter to the first electronic communication, the keyword filter configured to detect sensitive or confidential information on a computer network;

determine that the first electronic communication comprises one or more keywords associated with the keyword filter;

in response to determining that the first electronic communication comprises one or more keywords associated with the keyword filter, identify a plurality of transaction-related data items from one or more databases, wherein the transaction-related data items are related to one or more of: the transaction data item, the user associated with the user identifier, or the first electronic communication;

generate a data item cluster from the plurality of transaction-related data items; and generate user interface data usable for rendering a user interface configured to display a summary of the data item cluster and at least a portion of the plurality of transaction-related data items.

16. The computer system of claim 15, wherein the one or more hardware computer processors are further configured to:

determine that the first electronic communication is being sent to or received from an external account; and assign a score to the data item cluster based at least in part on the first electronic communication being sent to or received from the external account.

17. The computer system of claim 15, wherein the one or more hardware computer processors are further configured to:

apply an abnormality rule based at least in part on the first electronic communication to determine an existence of an abnormality associated with the user; and generate the data item cluster based at least in part on the abnormality.

18. The computer system of claim 15, wherein the one or more hardware computer processors are further configured to:

apply a mismatch rule to the first electronic communication, the mismatch rule indicating that content of the electronic communication does not match a domain where the first electronic communication is originating or being sent; and assign a score to the data item cluster based at least in part on application of the mismatch rule.

19. The computer system of claim 15, wherein the one or more hardware computer processors are further configured to:

determine a false positive match for a transaction-related data item; and remove the false positive match from the data item cluster.

20. The computer system of claim 15, wherein the one or more hardware computer processors are further configured to:

dynamically update the keyword filter based at least in part on transaction-related events that are associated with the user.

* * * * *